(12) United States Patent
Culver et al.

(10) Patent No.: US 11,978,019 B2
(45) Date of Patent: May 7, 2024

(54) COLLABORATION TOOL

(71) Applicant: iLiv Technologies Inc., La Malbaie (CA)

(72) Inventors: Andrew Culver, Montreal (CA); Karen Tucker, Montreal (CA); Jean Gagliardi, Montreal (CA); Sergei Rybakov, Montreal (CA)

(73) Assignee: iLiv Technologies, Inc., Quebec (CA)

( * ) Notice: Subject to any disclaimer, the term of this patent is extended or adjusted under 35 U.S.C. 154(b) by 0 days.

(21) Appl. No.: 17/879,221

(22) Filed: Aug. 2, 2022

(65) Prior Publication Data
US 2023/0061905 A1    Mar. 2, 2023

Related U.S. Application Data

(63) Continuation of application No. 17/524,291, filed on Nov. 11, 2021, now Pat. No. 11,443,281, which is a (Continued)

(51) Int. Cl.
*G06Q 10/10* (2023.01)
*G06F 16/95* (2019.01)
(Continued)

(52) U.S. Cl.
CPC .......... *G06Q 10/103* (2013.01); *G06F 16/95* (2019.01); *G06F 30/13* (2020.01); *G06Q 10/067* (2013.01);
(Continued)

(58) Field of Classification Search
CPC .. G06Q 10/103; G06Q 10/067; G06Q 10/101; G06Q 20/123; G06F 16/95
See application file for complete search history.

(56) References Cited

U.S. PATENT DOCUMENTS

| 6,718,535 B1 | 4/2004 | Underwood |
| 6,922,701 B1 | 7/2005 | Ananian et al. |

(Continued)

FOREIGN PATENT DOCUMENTS

CA    2485952    10/2003

OTHER PUBLICATIONS

Notice of Allowance dated Mar. 6, 2014 in connection with U.S. Appl. No. 13/097,895 (13 pages).
(Continued)

*Primary Examiner* — Kristie D Shingles
(74) *Attorney, Agent, or Firm* — Woodard Emhardt Henry Reeves & Wagner

(57) ABSTRACT

A method for enabling collaboration between individuals to design, construct and maintain a building. The method comprises providing a network based computer system including at least one server and multiple clients. The multiple clients allow respective individuals to interact with the server. The server includes a machine-readable storage, which is encoded with software for execution by a CPU for allowing individuals at the respective clients to create, execute and manage projects associated with at least one of a design phase, construction phase and maintenance phase of the building. Each project comprises one or more events that are related to time. The method also comprises storing in the machine-readable storage events as they occur during execution of each project to create a building project database spanning at least the design phase and the construction phase and optionally the maintenance phase of the building.

20 Claims, 15 Drawing Sheets

Related U.S. Application Data continuation of application No. 17/104,043, filed on Nov. 25, 2020, now abandoned, which is a continuation of application No. 16/578,564, filed on Sep. 23, 2019, now abandoned, which is a continuation of application No. 15/817,928, filed on Nov. 20, 2017, now abandoned, which is a continuation of application No. 14/317,565, filed on Jun. 27, 2014, now abandoned, which is a continuation of application No. 13/097,895, filed on Apr. 29, 2011, now Pat. No. 8,788,590.

(60) Provisional application No. 61/329,890, filed on Apr. 30, 2010.

(51) Int. Cl.
| | | |
|---|---|---|
| *G06F 30/13* | (2020.01) | |
| *G06Q 10/067* | (2023.01) | |
| *G06Q 10/101* | (2023.01) | |
| *G06Q 20/12* | (2012.01) | |
| *G06F 111/02* | (2020.01) | |

(52) U.S. Cl.
CPC ......... *G06Q 10/101* (2013.01); *G06Q 20/123* (2013.01); *G06F 2111/02* (2020.01)

(56) References Cited

U.S. PATENT DOCUMENTS

| | | | |
|---|---|---|---|
| 7,043,486 B2 | 5/2006 | Cope | |
| 7,069,234 B1 | 6/2006 | Cornelius et al. | |
| 7,100,195 B1 | 8/2006 | Underwood | |
| 7,167,844 B1 | 1/2007 | Leong et al. | |
| 7,305,392 B1 | 12/2007 | Abrams et al. | |
| 7,330,821 B2 | 2/2008 | Wares | |
| 7,360,202 B1 | 4/2008 | Seshadri et al. | |
| 7,373,612 B2* | 5/2008 | Risch | G06F 16/9038 715/713 |
| 7,496,487 B2 | 2/2009 | Wakelam et al. | |
| 7,529,650 B2 | 5/2009 | Wakelam et al. | |
| 7,685,013 B2 | 3/2010 | Gendler | |
| 7,716,244 B2 | 5/2010 | Abrams et al. | |
| 7,735,018 B2* | 6/2010 | Bakhash | G06F 16/951 715/767 |
| 7,769,794 B2* | 8/2010 | Moore | G06F 16/168 707/831 |
| 7,822,808 B2 | 10/2010 | Caplan et al. | |
| 7,860,807 B2 | 12/2010 | Kaneko et al. | |
| 7,925,568 B2 | 4/2011 | Cullen, III et al. | |
| 7,991,680 B2 | 8/2011 | Livesay et al. | |
| 8,004,397 B2 | 8/2011 | Forrest et al. | |
| 8,004,821 B2 | 8/2011 | Oh | |
| 8,015,113 B2 | 9/2011 | Petersen et al. | |
| 8,249,906 B2 | 8/2012 | Ponce de Leon | |
| 8,566,194 B2 | 10/2013 | Livesay et al. | |
| 8,788,590 B2 | 7/2014 | Culver et al. | |
| 9,253,430 B2 | 2/2016 | Levine et al. | |
| 9,299,039 B1 | 3/2016 | Wang | |
| 11,443,281 B2 | 9/2022 | Culver et al. | |
| 2002/0059132 A1 | 5/2002 | Quay et al. | |
| 2003/0187766 A1 | 10/2003 | Akashi | |
| 2005/0096926 A1 | 5/2005 | Eaton et al. | |
| 2005/0222862 A1 | 10/2005 | Guhde et al. | |
| 2007/0244740 A1 | 10/2007 | Desenberg | |
| 2008/0072261 A1 | 3/2008 | Ralston et al. | |
| 2008/0077593 A1 | 3/2008 | Abrams et al. | |
| 2010/0153520 A1 | 6/2010 | Daun et al. | |
| 2010/0223128 A1 | 9/2010 | Dukellis et al. | |
| 2010/0268941 A1* | 10/2010 | Pahlavan | H04L 67/148 709/229 |
| 2011/0113363 A1* | 5/2011 | Hunt | G06F 3/0481 715/800 |
| 2011/0264483 A1 | 10/2011 | Nezhad et al. | |
| 2012/0110087 A1 | 5/2012 | Culver et al. | |
| 2018/0075413 A1 | 3/2018 | Culver et al. | |
| 2020/0065509 A1 | 2/2020 | Ojha | |
| 2020/0074406 A1 | 3/2020 | Culver et al. | |
| 2021/0081897 A1 | 3/2021 | Culver et al. | |
| 2021/0118031 A1 | 4/2021 | Beaver, III et al. | |
| 2022/0076207 A1 | 3/2022 | Culver et al. | |

OTHER PUBLICATIONS

Office Action dated Jul. 15, 2013 in connection with U.S. Appl. No. 13/097,895 (9 pages).
Office Action dated Sep. 24, 2012 in connection with U.S. Appl. No. 13/097,895 (5 pages).
CA 2738428 Examiner's Report dated Jan. 22, 2020.
CA 2738428 Examiner's Report dated Mar. 1, 2021.
CA 2738428 Examiner's report dated Mar. 2, 2018.
CA 2738428 Examiner's report dated Mar. 6, 2017.
Canadian Examination report dated Jan. 10, 2022 in CA 2738428.
U.S. Appl. No. 14/317,565 FOA dated May 18, 2017, 11 pages.
U.S. Appl. No. 14/317,565 FOA dated Nov. 13, 2015, 10 pages.
U.S. Appl. No. 14/317,565 NFOA dated Apr. 24, 2015, 7 pages.pdf.
U.S. Appl. No. 14/317,565 NFOA dated Jan. 13, 2017, 8 pages.
U.S. Appl. No. 14/317,565 NFOA dated Jun. 3, 2016, 8 pages.
U.S. Appl. No. 15/817,928 NFOA dated Mar. 22, 2019, 13 pages.
U.S. Appl. No. 16/578,564 NFOA dated May 29, 2020, 5 pages.
CA 2738428 Examiner's report dated Nov. 16, 2022.
Non-final action dated Feb. 1, 2022 in U.S. Appl. No. 17/524,291.
Non-final action dated Feb. 3, 2022 in U.S. Appl. No. 16/578,564.
Notice of allowance dated May 11, 2022 in U.S. Appl. No. 17/524,291.

* cited by examiner

Figure 13C

Project Roles

General Architect: Allen Brown  [*Unassign*]
This is the architect responsible for the general design of the building.
Accepted – 01/02/10    [Details]

Landscape Architect:  [*Invite*]
This is the architect responsible for the design of the areas surrounding the building, including parking and public spaces.
Unassigned

⋮

Architectural Modeller:  [*Invite*]
This is the person responsible for creating a physical or 3D model of the building and generating 3D model fly-throughs.
Unassigned Take the role            ○
Choose from the community ⊙
Choose a group           ○
Invite a person to join  ○

( INVITE )   ( CANCEL )

User name:

Member of Named group

Previous Project

Location (miles/KM)

Skills required

Experience required

Professional Certification

Recommended by?

COLLABORATION TOOL

CROSS REFERENCE TO RELATED APPLICATIONS

The present application is a Continuation of U.S. patent application Ser. No. 17/524,291 filed Nov. 11, 2021, which is a Continuation of U.S. patent application Ser. No. 17/104,043 filed Nov. 25, 2020, which is a Continuation of U.S. patent application Ser. No. 16/578,564 filed Sep. 23, 2019, which is a Continuation of U.S. patent application Ser. No. 15/817,928 filed Nov. 20, 2017, which is a Continuation of U.S. patent application Ser. No. 14/317,565, filed Jun. 27, 2014; which is a continuation of U.S. application Ser. No. 13/097,895, filed Apr. 29, 2011, which claims the benefit of U.S. Provisional Patent Application No. 61/329,890 filed Apr. 30, 2010, all of which are hereby incorporated by reference.

FIELD OF THE INVENTION

The invention generally relates to a network based collaboration tool used to enable communication and collaboration between people working on industrial, commercial or residential construction projects.

BACKGROUND OF THE INVENTION

Residential, commercial and industrial construction and building projects can involve many different people and organizations, such as architects, contractors, electricians, accountancy firms, plumbers, painters, and material supply firms, among others. Although each person or group of people may not be known to each other beforehand, they may all collaborate at some time in order to design, construct and maintain the intended building.

Unfortunately, it is rare to achieve the level of collaboration needed in order to facilitate the design, construction and maintenance operations. This can lead to time delays and/or cost overruns, which are fairly commonplace in the construction industry. Substandard workmanship and/or materials may sometimes be used to make up for these delays and overruns, which may not be discovered until years afterwards and require expensive and/or lengthy corrective action.

While other industries have improved collaboration between people and organizations through use of electronic communications and computer software, these gains have not yet been fully realized by the construction industry. Therefore, there is a need in the construction industry for an improved collaboration tool.

SUMMARY OF THE INVENTION

As embodied and broadly described herein, the present invention provides a method for enabling collaboration between individuals to design, construct and maintain a building. The method comprises providing a network based computer system including at least one server and multiple clients. The multiple clients allow respective individuals to interact with the server. The server includes a machine-readable storage, which is encoded with software for execution by a CPU for allowing individuals at the respective clients to create, execute and manage projects associated with at least one of a design phase, construction phase and maintenance phase of the building. Each project comprises one or more events that are related to time. The method also comprises storing in the machine-readable storage events as they occur during execution of each project to create a building project database spanning at least the design phase and the construction phase and optionally the maintenance phase of the building.

BRIEF DESCRIPTION OF THE DRAWINGS

A detailed description of examples of implementation of the present invention is provided herein below with reference to the following drawings, in which:

FIG. 13C is a non-limiting example of a user interface that could be used to search for prospective candidates to fill particular roles on the project team;

Figure 1:
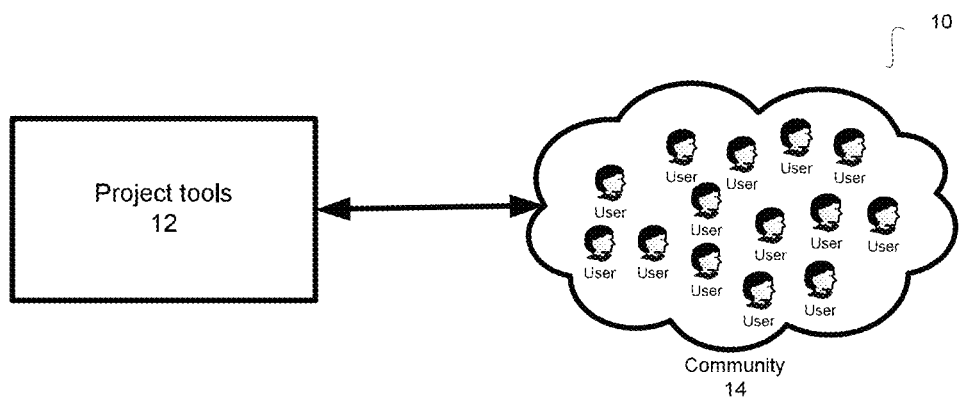
FIG. 1 is a high level representation of a collaboration system in accordance with a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a collaboration system 10 that includes two main components, namely a suite of building project tools 12 and a community of users 14 that is functionally linked to the suite of project tools 12.

Figure 2A:
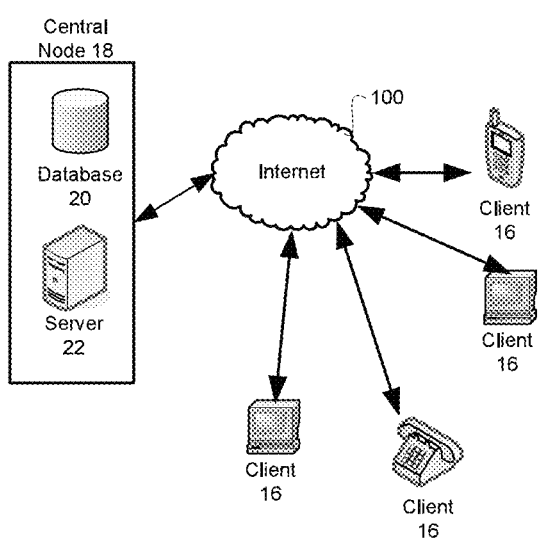
FIG. 2A is a high level block diagram of the collaboration system illustrated in FIG. 1.

FIG. 2A shows one possible non-limiting form of implementation of the collaboration system 10. The system 10 that is represented in this figure includes clients 16, a central node 18 and a network 100 that serves to interconnect the clients 16 and the node 18. Although four clients 16 are illustrated in FIG. 2A, it should be understood that any number of clients 16 could be included within the system 10.

Figure 2B:
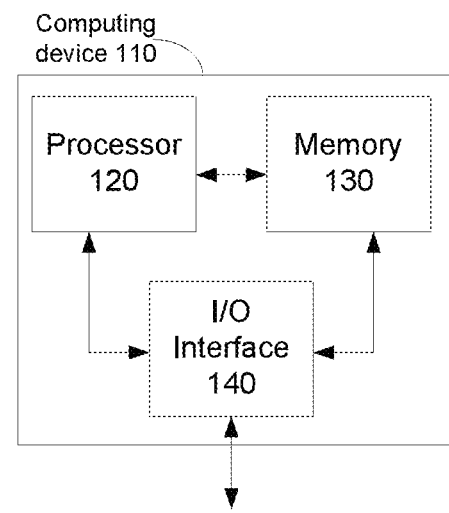
FIG. 2B is a more detailed block diagram of the components of one of the clients in the collaboration system illustrated in FIG. 1.

Each of the clients 16 may be in the form of a computing device 110, of which an example is provided in FIG. 2B. The computing device 110 may be equipped with a processor 120, a memory 130 and an input/output (I/O) interface 140. The aforementioned components of each computing device 110 may be connected via an interconnection system such as copper or optical connection.

The processor 120 within each of the computing devices 110 allow it to execute program code that may be available from the memory 130, which is in the form of machine-readable storage. Executing the program code provides certain software services, some of which will be described in more detail below. The memory 130 stores the program code, input and/or output to/from the processor 120, as well as the I/O interface 140.

The I/O interface 140 provides each of the clients 16 with the ability to communicate with the network 100, among others. Where one or more of the clients 16 are non-mobile devices (e.g. computer workstations), their ability to communicate with the network 100 can be provided using a wired connection, such as through the public telephone network. Where one or more of the clients 16 are mobile devices, their ability to communicate with the network 100 can be provided using a wireless connection, such as via a WiFi, WiMAX or cellular connections. For example, a mobile laptop computer with a WiFi connection or an iPhone™ or iPad™ with a cellular connection to the network 100 may be instances of the clients 16. Other modes of connection between the clients 16 and the network 100 (e.g., satellite links) are possible and would fall within the scope of the present invention.

Because the clients 16 and their potential configurations are believed to be well-known in the art, further details regarding them will not be provided here.

The central node 18 is a computing device (or set of computing devices) that is in communication with the clients 16 via the network 100. The central node 18 is itself comprised of a server 22 and a series of databases 20.

Each server 22 in the central node 18 may itself be another instance of the computing device 110 comprised of the processor 120, the memory 130 in the form of machine-readable storage and the I/O interface 140 that are interconnected via connections. Since the architecture of the computing device 110 for the server is otherwise substantially similar to each of the clients 16 (which has been described with respect to FIG. 2B), further details about central node 18 will not be provided here.

However, it is worth noting that the I/O interface 130 associated with the central node 18 allows the server 22 (and therefore the central node 18) to communicate with the network 100, and subsequently with each of the clients 16 that are also connected to the network 100. In particular, the I/O interface 130 in the server 22 may provide it (and/or the node 18) with the ability to communicate with the network 100 via a wired or wireless connection similar to those described with regards to the clients 16.

The resulting relationship between the clients 16 and the one or more servers 22 within the node 18 is generally similar to that of a client-server relationship that is well-known in the art. As a result, no further details regarding the connection and/or relationship between the clients 16 and the server(s) 22 will be provided here.

It is worth noting that the central node 18 may comprise one or more servers 22. Each server 22 may run program code to provide the functionality of the software, or provide certain specialized services, such as authentication services for clients 16. When the servers 22 within the node 18 are configured this way, it is worth noting that the general functionality of the software provided by the node 18 to the clients 16 is generally determined by the program code when it is collectively executed by each of the servers 22. As a result, the functionality provided by the node 18 is not limited to (or by) the number of servers 22 comprised within it.

In the case where the central node 18 contains more than one server 22, each of the servers 22 may be located at the same geographic location or distributed geographically. Therefore, although FIG. 2A shows the central node 18 as a single entity, it is possible that the structure of the node is more distributed, such that the servers 22 within this central node 18 may in fact closely resemble that of the clients 16. In such a case, the servers 22 comprising the central node 18 may be interconnected via a public network (such as the network 100) or a private network (not shown) such as a dedicated local- or wide-area network.

The central node 18 also comprises at least one database 20. Although only one database 20 is shown in FIG. 2A, it is likely that the central node 18 comprises multiple databases 20. The databases 20 are provided for data storage and are in communication with the servers 22 within the node 18. The contents of and functionality provided by the databases 20 will be described in more detail later.

The databases 20 may be stored on machine-readable storage that is accessible to the processor and/or memory within the servers 22. In certain cases, the databases 20 may be stored in the local memory of the servers 22, while in other cases, the databases 20 may be stored remotely to the servers 22, such as on machine-readable storage of a hard disk or similar device.

Like the servers 22, the set of databases 20 within the central node 18 may be co-located at the same geographic location, which may be the same location as the one or more servers 22. Alternatively, the databases 20 may be located at different geographic locations. Therefore, although FIG. 2A shows the central node 18 as a single entity, it is possible that the structure of databases 20 within this entity may in fact closely resemble that of the clients 16. In such a case, the databases 20 comprised in the central node 18 may be interconnected via a public network (such as the network 100) or a private network (not shown), such as a dedicated local- or wide-area network.

The network 100 that serves to interconnect the clients 16 and the central node 18 in a client-server relationship may be any suitable network including, but not limited to a global public network, such as the Internet, a private network and a wireless network. In certain circumstances the network 100 may comprise certain elements of all three aforementioned networks, but the network 100 may be thought of as the Internet or any other equivalent network.

Figure 3:
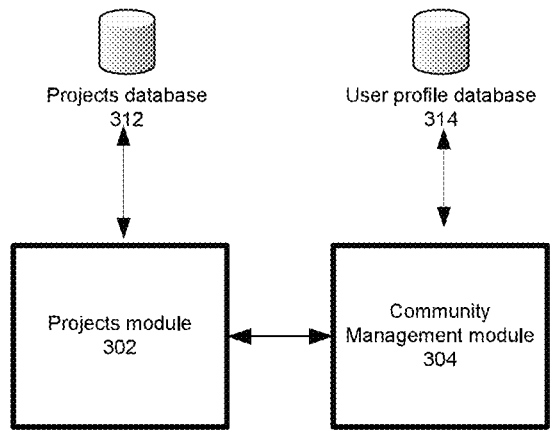
FIG. 3 is a more detailed block diagram of the software which determines the functionality of the system of FIG. 1.

FIG. 3 shows a high-level block diagram of software components of the collaboration system 10 that result from the processing and execution of certain program code by the processors in the servers 22 of the central node 18. The software components shown include a projects module 302 and a community management module 304. A building projects database 312 and a user profile database 314 communicate with the projects module 302 and the community management module 304.

The projects module 302 provides certain functionality typically related to managing individual projects, which may be related to building or construction projects, among others. The functionality provided by the projects module 302 may include among others:
 creating and storing project-related data, such as activities, tasks, timelines and work assignments related to a particular project;
 managing access to project-related data to ensure that project-related data is kept secure;
 managing permissions for individual users to create, modify and/or delete such data;
 processing project-related data to derive certain information related to a project as a whole, such as the overall project status; and/or
 processing project-related data to derive certain information related to a particular aspect of the project, such as a list of tasks or activities that must be performed on a certain date (and/or the persons assigned for those tasks).

The community management module 304 provides certain functionality related to the user community 14, and more particularly to assisting one or more individual users within this community to work on a building or construction project. More specifically, the community management module 304 can assist individual users to communicate with other users and obtain information relating to a construction or building project. The functionality provided by the community management module 304 may include among others:
 managing user profiles for individual community members, which may include the creation, maintenance and deletion of such profiles;
 providing facilities for enabling private communications between two or more user community members, such as via email, text/chat or Voice-Over IP (VoIP) telephone calls;
 enabling public communications between one or more members of the user community 14 and a group of such members, such as by posting to (and/or replying to a post) a forum or community of practice;
 allowing searches of the user community 14 to be performed by a member in order to find members that meet or fulfill certain criteria, such as being within a certain distance of the member who initiated the search; and/or
 enabling searches of the forums/communities to be performed in order that a member can find all public communications that fulfill certain criteria, such as posts regarding the installation and/or maintenance of a certain piece of equipment.

It will be appreciated that the functionality listed for the projects module 302 and the community management module 304 is non-exhaustive as other possibilities exist and would fall within the scope of the present invention.

FIG. 3 also illustrates that the modules 302 and 304 are interconnected, such that information from the projects module 302 can be passed to the community management module 304 and vice-versa. In certain non-limiting embodiments, this relationship may establish or support a particular hierarchy between the modules 302 and 304. For example, the community management module 304 may support the projects module 302 by allowing project-specific data within the projects module 302 to be shared between users of the user community 14 involved in this project via their user profiles, which are provided by the community management module 304.

Alternatively, the projects module 302 may support the community management module 304 by allowing certain project-related information about projects that involved a particular user community member to be viewed by other members of the user community 14 who were not involved with such projects. For example, it may allow individuals of the community 14 to identify other individuals within the community 14 who have certain valuable expertise.

During execution, the projects module 302 and the community management module 304, communicate with and process data that is stored in the databases 22. In particular, the project module 302 communicates with the (building) projects database 312 that stores project-related data. Likewise, the community management module 304 communicates with the user profile database 314 that stores user profiles for the user community 14.

Figure 4:
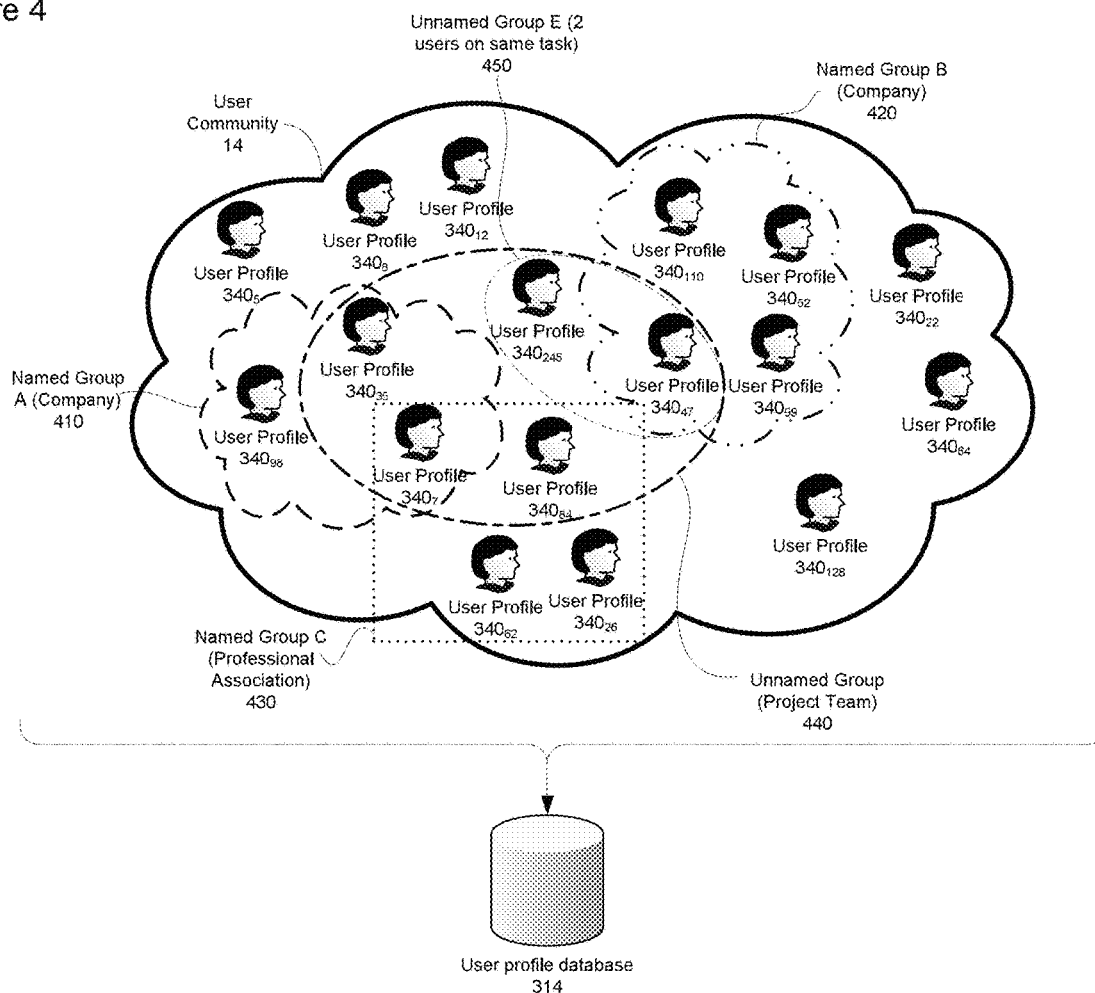
FIG. 4 is a block diagram illustrating different user groups of the user community of the system illustrated in FIG. 1.

FIG. 4 shows a relationship between the user community 14 and the user profile database 314 that is accessible to the community management module 304.

In particular, the user profile database 314 may be seen as being comprised of user profiles $340_N$, wherein the database 314 at any point in time contains a set of user profiles $340_1$ to $340_{N-1}$. Each profile in the set of user profiles $340_1$ to $340_{N-1}$ is typically unique and encodes information related to a corresponding user of the user community 14. This set of user profiles can be organized within the collaboration system 10 in certain ways that will be described shortly.

Figure 5:
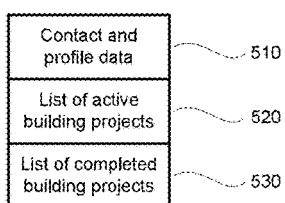
FIG. 5 is block diagram illustrating different data categories of a user profile database.

FIG. 5 shows a non-limiting embodiment of a user profile in the set of user profiles $340_1$ to $340_{N-1}$. In this embodiment, the user profile is comprised of contact and profile data 510, a set of links to the user's active building projects 520 and a set of links to the user's completed building projects 530, among others.

The contact and profile data 510 includes personal and biographic information related to the user that is not necessarily related to a particular project. For example, the data 510 may include a particular user's:
 contact details (e.g., name, address and phone numbers);
 authentication details (e.g., email address and password) that can be used by the system 10 to authenticate the user;
 an external email address to which the user wishes communication to be directed and which may also function as an authentication detail (e.g., the user's email address); and/or
 a photo of the user.

The contact and profile data 510 may also include a 'profile' section that includes, among others:

information related to the user's education (e.g., the educational level reached by the user);

any professional associations to which the user currently belongs or has belonged;

groups to which the user is a member, such as named groups (which are described below);

a list of relevant work experience;

any external or professional certifications received by the user;

information relating to any special skills and/or abilities possessed by the user;

an indication of any particular types of work the user prefers; and/or a list of references who could be contacted to validate information in the user's profile.

The set of links 520 and 530 provide additional information related to the contact and profile data 510, and namely the work experience within the user profile section. In particular, the set of links to active building projects 520 and the set of links to completed building projects 530 serve to show projects in which the user is either currently involved, or has been involved in the past, both of which are also likely listed in that user's work experience.

The term 'links' in the set of links to active building projects 520 and a set of links to completed building projects 530 should be interpreted in a broad functional sense, rather than a hyperlink to a particular URL. For example, a particular link to a completed building project within the set of links 530 may be a link to the contact details for a certain person involved with that project, rather than to information related to that project.

Because each profile of the set of user profiles $340_1$ to $340_{N-1}$ likely contains the same or similar type of information, the user profile database 314 can be queried to identify and/or organize users in the user community 14 according to certain relationships. In the context of a building project for example, certain users in the community may be members of professional associations, such as users who are architects or civil engineers.

Optionally, the collaboration system 10 may not attempt to organize the user community 14 beyond providing certain facilities to search the community 14. For example, the system 10 may provide a search tool that allows a first user to find user profiles for other members of the community 14 that meet certain criteria, such as belonging to the same professional association or being located at a somewhat proximate distance to each other. Such search tools will be described in more detail below.

However, members of the user community 14 may organize themselves into groups, which may be named or remain unnamed. For example, all of the users who are collaboratively working on a project form a group, although this is more generally referred to as a "team" or as a "project team". In such cases, the group itself typically remains unnamed but its members are known to each other through their involvement in the project.

Alternatively, members of the user community 14 may organize themselves into so-called 'named' groups that may represent formal affiliations of users within the community. The affiliations represented by named groups may represent certain personal and non-personal affiliations, including:

corporate- or business-related affiliations, such as those represented by businesses, corporations or other non-governmental organizations (e.g., Habitat for Humanity);

professional affiliations, such as members of professional associations (e.g., members of the Green Building Initiative);

educational affiliations, such as members who attended the same university, trade school or training course;

geographic affiliation, such as members who are located in the same city, region, state, province and/or country; and/or personal affiliations, such as members who play a particular sport (e.g., golf or hockey) or who share a particular hobby, among others.

It will be appreciated that the above list of affiliation types that can be used to form named groups in the user community 14 is non-exhaustive. Other types of affiliations may exist and would fall within the scope of the present invention.

It may be appreciated that users within the community may simultaneously be affiliated with one or several named and/or unnamed groups, such as members of multiple project teams, corporate organizations and/or professional associations, among others.

For example and with respect to FIG. 4, it may be seen that an instance of the user community 14 (as embodied within the user profile database 314) contains a plurality of user profiles $340_i$, some of which are affiliated through the following named and unnamed groups:

Named group A 410 represents a first company comprising the user (profiles) $340_7$, $340_{35}$ and $340_{98}$;

Named group B 420 represents a second company comprising the user (profiles) $340_{47}$, $340_{52}$, $340_{99}$ and $340_{110}$;

Named group C 430 represents members within a professional association comprising the user (profiles) $340_7$, $340_{26}$, $340_{62}$ and $340_{84}$;

Unnamed group D 440 represents a project team comprising the user (profiles) $340_7$, $340_{35}$, $340_{47}$, $340_{84}$ and $340_{245}$.

Unnamed group E 450 represent two (2) users who are members of the same project team who are both working on the same task.

Based on the above, it will be appreciated that the user represented by user profile $340_7$ is affiliated with three (3) groups in the user community 14: the named group A 410 (as an employee of his or her company), the named group C 430 (as a member of a professional association) and the named group D 440 (as a member of the project team). Similar affiliations exist for certain other users in the community 14, as is shown by FIG. 4.

In addition to professional associations and/or business organization, profiles in the set of user profiles $340_1$ to $340_{N-1}$ may be grouped such as to be searchable by other types of relationships between members of the user community 14 including, among others:

users who perform similar tasks (e.g., Heating, Ventilating and Air Conditioning (HVAC) maintenance engineers or CAD technicians);

users who have the same educational background (e.g., went to a particular university or college);

users who have similar skills and/or work experience (e.g., maintenance experience with a particular building system); and/or users who are living (or working) within certain geographic locales (e.g., those living and/or working within 100 km of Montreal, Canada).

In addition to the user profiles being searchable according to the above relationships, the community management module 304 may create (or facilitate the creation of) sub-groups or sub-communities that are based on the above relationships. For example, the user profiles of a group of users that have experience with a particular HVAC system may be automatically grouped by the module 304 to form a particular sub-group. The sub-group may then be provided with certain communications means (e.g., a forum) that allow members to communicate in order to share information and/or store relevant information for future use. Advantageously, provision of such forums may allow useful, yet 'tacit' information that resides with a single person to be shared among the larger sub-group.

Alternatively, a group of users in the user community 14 could use the community management module 304 to form a sub-group that would be based on their own custom criteria. For example, users within the community 14 who are alumni of a particular school (e.g., architects who graduated from the McGill University Faculty of Architecture) could form their own sub-group in order to stay in touch, network and/or arrange social functions, among others.

Figure 6:
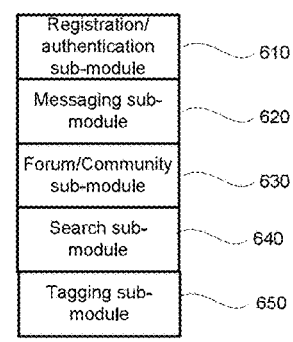
FIG. 6 is a more detailed block diagram of the community management software module.

FIG. 6 shows the components of the community management module 304. The community management module 304 is typically comprised of a registration/authentication sub-module 610, an email management sub-module 620 a forum/community sub-module 630, a search sub-module 640 and a tagging sub-module 650.

The registration/authentication sub-module 610 is invoked when a member of the user community 14 wishes to create, manage or delete their user profile within the set of user profiles $340_1$ to $340_{N-1}$. For example, in the case where a user wishes to create a new profile, the registration/authentication sub-module 610 presents a user interface (UI) to request that the user provide some basic information about himself or herself (e.g., name, email address) as well as a password in order that the new user profile can be created.

Once a user profile exists within a set of user profiles $340_1$ to $340_{N-1}$, the registration/authentication sub-module 610 may also be invoked in cases where the user may want to change the information within his or her particular profile. For example, the sub-module 610 may prompt the user to enter his or her password in order to confirm any substantive changes to the user profile. The same sub-module may also be invoked when a user decides to remove their user profile from the set of profiles $340_1$ to $340_{N-1}$, such as in the case where they retire or change industries.

The email management sub-module 620 is invoked when a user wishes to see email communications sent to him or her by other members of the user community 14 via the collaboration system 10. The sub-module 620 may provide the user with a UI (to be described below) that allows them to browse, read, reply and/or forward individual emails, among other functionality.

The email management sub-module 620 may also allow the user to organize his or her email communications, such as by organizing certain emails into related folders or establishing rules that automatically categorize incoming emails. In such a case, the sub-module 620 may also enable communications between the user and any communities to which the user belongs, such as allowing the user to send an email to a community and/or organizing replies from the community into a particular folder.

In certain cases, communications between members of the user community 14 enabled by the collaboration system 10 may include types of communications other than emails, such as online chats, voicemails or recordings of VOIP calls. In such cases, the email management sub-module 620 may also provide the user with the ability to review and/or organize such communications in addition to email.

The community/forum sub-module 630 is invoked when a user chooses to participate in a sub-group forum. The sub-module 630 may present a UI to the user that is likely similar to that provided by the email management module 620 but is tailored for forum communications. For example, the community/forum module 630 may provide a separate interface so that a user can more easily search and/or follow threaded email discussions that have occurred within a particular sub-group forum.

The community/forum sub-module 630 may also be used in the case where a particular sub-group maintains a website or knowledgebase for the user community 14 in general. For example, a particular sub-group related to an open-source building maintenance system may operate a Wiki that lists useful commands, tips and tricks that are not provided in the system's user manual. In a case, the sub-module 630 may provide functionality for a member of the sub-group to update the Wiki in case of new material and/or corrections to existing Wiki content.

The search sub-module 640 may be invoked when a user performs a search of the set of user profiles $340_1$ to $340_{N-1}$ in order to locate members of the user community 14 that meet certain criteria.

The search sub-module 640 provides a UI (to be described later) that allows a user of the collaboration system 10 to identify and further define certain attributes of the user profile upon which the set of profiles $340_1$ to $340_{N-1}$ is to be searched. For example, a user may wish to identify other members of the user community 14 that belong to a professional organization and have experience with a certain type of elevating device, such as an elevator, escalator or moving sidewalk.

The search sub-module 640 may provide certain so-called 'default' searches that allow a user to search based on pre-determined criteria, such as proximity to the user's recorded (or current) location. For example, the sub-module 640 may allow a user to locate other user community members 14 that are within 5, 10, 15, 25, 50, or 100 km of his or her current location.

The search sub-module 640 may also provide a user with the ability to create more advanced searches that search multiple, customized criteria. For example, the sub-module 640 may allow a particular user to identify all other users who are within 15 km of his or her location that have between 5 and 10 years of experience installing and maintaining storm water maintenance systems manufactured by a particular company who have also been involved in the design phase of a construction project.

In a non-limiting embodiment, the tagging sub-module 650 may be used to perform certain functions that relate to two or more entities within the projects database 312 and/or the user profile database 314, as well as between these databases. In another non-limiting embodiment, the tagging sub-module 650 may also be used by a first user to 'tag' or assign a certain rating that indicates his or her satisfaction with the work of a second user. Both embodiments of this module will be described below.

In one non-limiting embodiment, the tagging sub-module 650 can be used to assign a 'tag' to one or more items in the projects and/or user profile databases 312 and 314. This tag typically is used to remind a user of a relationship between a first item and a second item that is somehow related to the first item but is otherwise separate from it.

For example, assume that a building project for an office building on which the user is collaborating includes a three-dimensional (3D) mockup of the building that will be available on the building's website. It is expected that users will travel in (i.e., walk or fly through) the building represented by avatars so that they can simulate what visiting and/or working in the building may be like.

Further assume that production of the 3D mockup may involve several different members and/or groups within the user community 14, such as the architect working on the project, a group of draftsmen working under the architect who are responsible for creating the 3D mockup, an interface designer who is working to create the interface that will allow the users to manipulate their avatars, a web designer who is creating the necessary code to run the simulation, and a systems administrator who will install and maintain the servers used to run the simulation.

Each of these users may create a tag (which may be in the form of a text string or icon) that when applied to some element in the projects database 312 and/or the user profiles database 314, relates that item to the tag. A tag can be viewed at a later time so as to allow the user to review one or more of its associated elements.

For example, the architect may create a tag titled "3D-Simulation" for this particular aspect of his office building project. The architect may then apply this tag to the following in the system 10:
the user profile $340_i$ of each team member involved in the 3D mockup;
the named group representing the draftsmen working on the project;
all communications (e.g., email messages or embedded video clips) regarding this aspect of the project;
all tasks and other events related to the 3D simulation, such as scheduled planning meetings and/or testing of the mockup by selected so-called 'beta users'.

It will be appreciated that the above list is non-exhaustive as other elements in the system 10 could be tagged by the author that would fall in the scope of the present invention.

Once an item is tagged with the 3D-Simulation tag, certain of its information (such as metadata) is updated to indicate that this particular tag has been applied to it. At a later time, the system 10, and more specifically the tagging sub-module 650 (or alternatively, the search sub-module 640) may search for and display these items based on its tag.

For example, assume that a dispute arises between the architect and the web designer about the background image(s) that should appear when an avatar looks out of a window in the office building. Rather than search through the entirety of items in the projects database 312 and/or user profile database 314, the architect can review the items that were tagged with the 3D-Simulation tag. Assuming that the architect was diligent in his tagging, viewing these tagged items may allow him to identify the particular item (such as an email exchange or an uploaded set of images) that identify the correct images that an avatar should 'see' when looking out of a window.

A set of tags relating to a project that is stored in and/or used by the tagging sub-module 650 may exist at an individual user level, at a project level and/or at a system level. In general, each user has the ability to create tags that are particular to his or her own projects. This allows the user to create and organize his or her own tags based on whatever organization scheme is most useful to them. For example, the architect who is working on the 3D mockup may call his tag "3D-Simulation" whereas the web designer working on the same project may use a "100 Bank St. Building flythrough" as her tag.

If the project team members wish to collaborate, however, a set of project tags may be implemented through the tagging sub-module 650. This set of project tags may be available to all project team members and used to tag items for others on the project team to view. For example, the project tags may include the names of all companies (i.e., named groups) as tags.

For example, assume that a particular building project involves two major contractors, namely ABC Corp. and XYZ Ltd. who each are responsible for different aspects of the construction. Further assume that each contractor is supplying 5 people to the project and that each person's profile is tagged with that contractor's tag. If the project team displays a simple list of the project team, each user from each contractor can be further tagged to identify his or her company. Therefore a person viewing the tags for each contractor will be able to identify the 5 particular users from that company.

Although the above example is simplistic, it shows the value that a common set of tags implemented for a project may have to enhance collaboration. For example, if a third contractor was brought in to work on yet another aspect of the project, he or she could quickly identify which person on the project team was from each contractor via their tags. This may allow the third contractor to identify the person on the project team who may be responsible for a certain contractor's tasks or activities that relate to or interface with his or her activities on the project.

A set of system-level tags may also be provided by the tagging sub-module in addition to those at the individual user and/or project levels. Such system-level tags may include common terminology or acronyms that are used throughout the industry. For example, a set of system-level tags that may be used in the building construction industry may include:
HVAC (acronym for Heating-Ventilation-Air Conditioning);
Charette (term used to identify meetings between a building's designer and those responsible for its construction); and/or
LEED® (acronym for Leadership in Environmental and Energy Design).

Of course, it will be appreciated that the above list of prospective tags is non-exhaustive as other entries exist and would fall within the scope of the present invention.

It will be appreciated that although all users may be able to access and add content to a set of tags provided by the tagging sub-module 650, the management of such tag sets may differ depending on the level at which the tags are provided. More particularly, management tags other than those at the individual user level may be restricted from individual users. For example, a certain project team member may be responsible for all project tags, and only he or she can create or remove tags from this set.

System-level tags may be further restricted in that only certain members of the user community 14 can effect management of these tags. For example, members of the user community 14 may need to request additions, modifications to, or deletions from the set of system-level tags from certain other members of the community 14; no modifications could be done by the user himself or herself. Furthermore, the requested additions or modifications may need to be considered, debated and approved by a group of members (e.g., a tag editorial board) before additions, modifications and/or deletions to the system-level tags are effected. In this way, sets of tags designed for use by a plurality of users can be managed in a way that ensures that these users will be able to recall and/or collaborate using these tags.

It may be recalled that the concept of a 'tag' in the tagging sub-module 650 was two-fold in that a tag could be used to identify content for later recall and/or collaboration, as well as using a tag to rate the work of members in the user community 14. The above description of the tagging sub-module 650 has described a non-limiting embodiment that provided for the recall and/or collaborative aspect of a tag. The description below presents a non-limiting embodiment of the tag that provides for a 'tag' to be applied in order to rate the work of a user for the user community 14.

In particular, the tagging sub-module 650 may allow the work of a first member in the user community 14 (and more specifically, his or her user profile stored in the community database 314) to be rated by and/or have comments from other members of the community 14 be seen. For example, if a particular engineer or technician is known to do very good work, this user's clients, colleagues and/or co-workers may 'tag' this user's profile to indicate this to other users in the community 14 that have not worked with this engineer or technician.

It will be appreciated that a "tag" may include any indication or rating of a particular user's past or current work by other users, including:
- graphical indicia (e.g., checkmarks, stars, thumbs-up/thumbs-down);
- textual comments (e.g., "Very thorough and corrected mistakes early." "Very easy to work with—would use again.", and/or
- a numeric score, which may be calculated based on certain factors, including the indicia and/or textual comments and act as a proxy for satisfaction, among others.

The tagging module 650 provides a UI that allows one or more members of the user community 14 to apply such tags to the user profile of another member. These tags may allow the community 14 as a whole to identify particularly good members and therefore reward them for their efforts through recognition. (Alternatively, the tags may also allow the community 14 to identify particularly bad people who should be avoided.)

For example, assume that a freelance landscape architect named Bob Smith is a member of the user community 14 and performs work on a project with other users in the community. During his work on this project, Bob is seen by his fellow co-workers as both easy to work with, as well as someone who shares his knowledge freely with other architects and engineers. When Bob's work on the project is finished, his fellow co-workers use the UI provided by the tagging module 650 to indicate their satisfaction with his work, such as by using visual indicia (e.g., gold stars), by leaving comments (e.g., "Bob was outstanding in our project! We would love to work with him again . . . ", and/or by providing input to a scoring system that improves Bob's overall 'satisfaction score' within the community.

It will be appreciated that the formula used by the tagging sub-module 650 to calculate a numeric score that provide a proxy for the level of satisfaction with a user's work may be based on one or more inputs. In a simple example, the sub-module 650 may simply compare the number of positive satisfaction indicators (e.g., thumbs-up icons) against the number of negative dissatisfaction indicators (e.g., thumbs-down icons) to calculate a general satisfaction index.

Alternatively, the sub-module 650 may provide a UI that allows other members of the user community 14 to rate a particular user's work along several different dimensions, such as his or her punctuality, efficiency and/or quality. Such rating may be based on a scale, such as a 5-point scale where 1 represents total dissatisfaction and 5 represents total satisfaction (or vice-versa). The values for each dimension contributed by one user may then be averaged with similar values contributed by other users to generate an average value for each dimension individually, as well as to generate a total satisfaction value for the user as a whole. Such an approach can allow the work of a certain user to be viewed by other users along a range of different dimensions, such as punctuality, efficiency, quality, general perceived value and/or a desire to work with again.

Besides the ability to register the user community's 14 satisfaction (or dissatisfaction) with the work of a particular user, the tagging sub-module 650 may also provide so-called 'social networking' functionality for the collaboration system 10. In a non-limiting embodiment, the sub-module 650 may provide indications of which users in the community 14 have worked together in the past. Such indications can be shown as a social-network map that indicates the relationships between any two (2) users via a visual connection (e.g., a line or arc). In addition, the connection in the social-network map could indicate the frequency in which the two users have worked together, such as by showing a frequency calculation along the connection between two users. This could indicate a preference between certain users in the community 14 to work together on projects, which may assist in the formation of teams.

It will be appreciated that certain outputs generated by the tagging sub-module 650 may be used with other sub-modules, such as the search sub-module 640. For example, a general architect may need to find a landscape architect for her upcoming commercial office building project. Because this office building is intended to be a showcase project, she wants to select from the best landscape architects possible. To do this, the general architect uses the UI provided by the search sub-module 640 to identify landscape architects within the user community 14 that are highly rated and/or recommended by others. In certain case, she may search according to a general satisfaction rating (e.g., show those landscape architects with a general score of at least 4 out of 5), or in cases where a user's work is rated according to several dimensions, she may search based on a particular dimension (e.g., show those landscape architects whose work quality is rated at least 4 out of 5). By using the search sub-module 640 in this way, the general architect can quickly create a short-list of possible landscape architects for her showcase project.

Output(s) from the tagging sub-module 650 may also be used by the email management sub-module 620 to alert other users and collaborate work in general. For example, assume that the system 10 is configured in such a way that the completion of a task by a first user in a project (e.g., a worker or junior employee) must be satisfactorily rated by a second user (e.g., a supervisor or senior employee) before the task may be considered complete and/or 'signed-off'. The tagging sub-module 650 may be used by the second user to rate the work of the first user and determine whether the task is indeed complete and may be therefore considered signed-off. When the tagging sub-module 650 indicates that the task has been signed-off by the second user, the email management sub-module 620 may send a certain indication (e.g., an email, an update to an RSS feed or a 'tweet') to other members of the project team that a particular task has been completed and that any dependent tasks may now commence. In this way, the sub-modules 620 and 650 may be used to co-ordinate work between team members.

Figure 7:
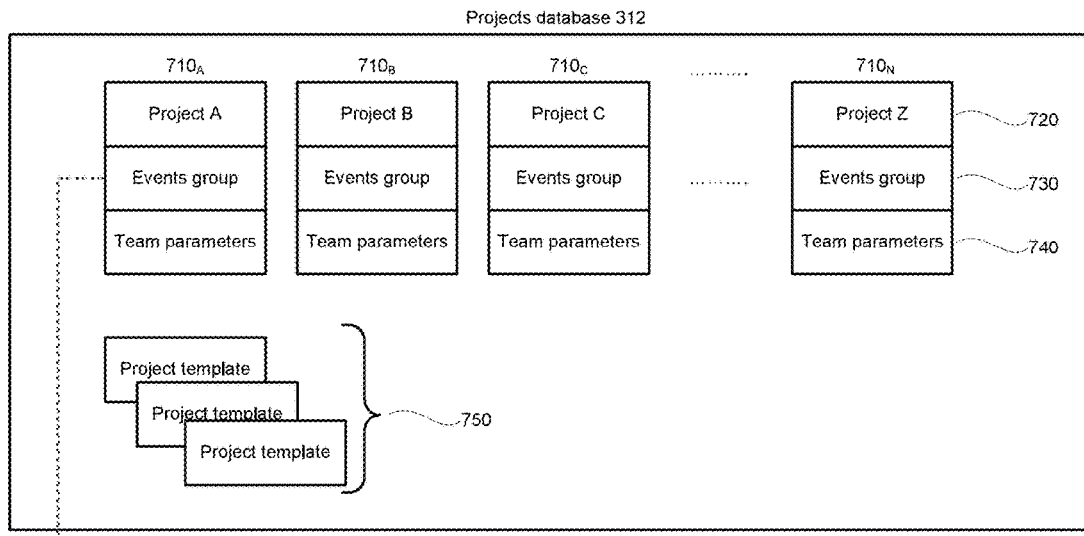
FIG. 7 is more detailed block diagram illustrating different data categories of a projects database.

FIG. 7 shows the components of the building projects database 312 that is generally used to store project-related information accessed by the building projects module 302. The database 312 is comprised of a set of projects $710_1$ to $710_N$, as well as a set of project templates 750.

The set of projects $710_1$ to $710_N$ within the building projects database 312 includes all projects that have been added to the collaboration system 10 by members of the user community 14. As a result, the set of projects $710_1$ to $710_N$ includes completed projects, ongoing projects that are not completed and future projects on which work has not yet begun.

In one specific example of implementation, a project may be conceptually viewed as a combination of activities (referred to here as events), as well as a general group of people and specialized sub-groups of people (teams) that carry out these events. As a result, each project in the set of projects $710_1$ to $710_N$ include a project identifier 720, a group of events 730 (also referred to as an 'events group') and a set of team parameters 740. Therefore, a project $710_i$ would contain a project identifier $720_i$, an events group $730_i$ and a set of team parameters $740_i$ that may be distinct from other projects in the set of projects $710_1$ to $710_N$.

The project identifier 720 allows the project to be uniquely identified within the building projects database 312, as well as be identified by potential users who may become involved with the project. This allows the system 10, as well as its users, to find different projects within the building project database 312.

The project identifier 720 is typically a numeric or alphanumeric value generated by the collaboration system 10 (and more specifically, the projects module 302) at the time when the project is created in the building projects database 312. For example, the module 302 may create a generated unique ID string or GUID (e.g., GUID_125S729fD546dF4587d15) to ensure that the project identifier 720 for newly created project will be unique in the database 312.

The identifier 720 may also include an alphanumeric value that can be defined by the user who creates the project. For example, a user may assign a common name, such as:
- a building's name (e.g., "High Holborne Mall")
- a building's address (e.g., "785 Bay Street"); and/or
- a code word or phrase that represents a proxy for its name (e.g., "Project Phoenix Ascendant.

In such cases, the project identifier 720 may be separate from the commonly-known name of the project, or the commonly-known name may be included in the identifier 720. In the former case, the building projects database 312 may provide a field or other placeholder that associates the project identifier 720 with its commonly-known name.

The events group 730 defines a set of events that are associated with each project in the set of projects $710_1$ to $710_N$. As used here, the generic term "event" refers to an occurrence related to the project that happens in time and has time values associated with it as a result. Depending on the current time, certain events in the event group $730_i$ may have already occurred, other events in the group may be presently occurring, while yet other events in the same group may have yet to occur in the future.

Events in the event group $730_i$ typically also have an 'action' component that defines a general goal or objective towards which the event is aimed. For example, a particular event may aim to enable or encourage communications between one or more persons or groups on a particular topic, either in a synchronous manner (i.e., an event relating to a meeting) or asynchronous manner (i.e., an email thread or discussion relating to a topic).

It may be noted that the action embodied by an event may be itself dependent on one or more activities related to one or more other events that have their own time periods and objectives. For example, the event described above to encourage communications between persons may depend on certain other events occurring, such as travel arrangements being made and met for a face-to-face meeting, or telephone or videoconference connections being established in the case of a teleconference or video conference.

The events group 730 may comprise several different types of events that can include, among others:
- timelines: a timeline is an event that acts as a parent to at least one other child event;
- tasks: a task is an event with starting and ending times during which the activity the task represents is expected to be started and/or performed, and may be considered a child of the timeline event;
- milestones: a milestone is an event with an end time but no start time, thus defining a point by which the activity the milestone represents is expected to be completed;
- To-dos: a To-Do is an event that temporarily has no specific times associated to it that can be used to create freeform lists of activities to be performed;
- Messages: manipulation of a message, such as the creation, sending, reading, editing or deleting a message is an event; accordingly, a single message may have a number of events associated with it; and/or
- Documents (which may also be called document version events): manipulation of a document such as creation, deletion or modification of a document is an event. Accordingly, a document may have a number of events associated with it. For example, the circulation of a particularly important document may be reflected as a task where users are required to initially accept responsibility and then identify when the task is complete (i.e., the document has been reviewed).

Although further details for these events will be provided below, it may be seen from the above that the inclusion and completion of certain events within a project are likely to cause a cascade of resulting actions. For example, the completion of a document event by one user may cause a messaging event to occur, which indicates to other users that the document related to the document event is ready for their perusal or review. Additionally, the completion of a document event may close the time window assigned for a task, milestone or To-do event related to the document event.

It will be appreciated that other project-management systems and applications may also include events similar to those described above for the event group $730_i$. However, the events in these systems typically include either an action component or a time component, but not both. For example, typical project management systems may provide a documentation-related event that defines the time during which a document should be created (i.e., an event time component). However, the event does not provide for the storage, circulation and/or archiving of the document that is the subject of the event, which is provided through the system 10.

Similarly, content management systems typically provide events for the storing, circulating and archiving of a document (i.e., an event action component). However, these systems do not provide a time window within which these activities may be scheduled and/or monitored, which is provided through the system 10.

It may be recalled that the events group $730_i$ includes an explicit message event. However, it will be appreciated that other types of events may have communications related to them. For example, a document event may have communications related to the content, format and audience for the document associated with the event.

In another non-limiting embodiment of the system 10, communications related to an event will be stored and associated with the event so that a user can view this information along with details for the event and its status. This allows a user to review related communications for the event in order to understand why the event is in its current state.

For example, assume that a first user creates a task event representing the development of an initial grant proposal for a social housing construction project. The first user may send a message to other project participants in order to generate discussion related to the grant proposal. The resulting discussion may yield many useful ideas relating to the grant proposal itself (e.g., what the proposal should include, how it should be formatted) and/or offers of help for writing, editing and presenting the proposal.

Because both the task event related to the grant proposal and the communication related to this event reside within the system 10, the communications described above can be associated with the grant proposal task event. For example, the representation of the task event in the system 10 may have a 'communications' or 'discussion' control (i.e., a button, tab or icon) that appears when communication related to the event exists. When a user activates this control, a threaded view of all communication relating to the task is displayed, which can be grouped by the user according to subject, author or the time at which the communications was added to the system 10.

Because all of this information is associated with the event, when the time comes to write the grant proposal related to the task, the authors will have a body of information and an ad-hoc team of expertise to draw upon.

By associating communications with an event, the context of the communications becomes immediately apparent to any user who views the event. For example, by associating communications relating to the grant proposal with its associated task event, any user who views the event can infer the context surrounding the associated communication.

This approach may be compared with existing project-management and/or content management systems which are provided here as non-limiting examples and typically do not have a means to associate event-related communications with an event. As a result, events are typically managed in a first application (e.g., a project-management application like Microsoft Project) while communications about the event is typically managed in a second, separate application (e.g., an email application like Microsoft Outlook). Because these two applications are separate, the receiver of an email message with a somewhat cryptic subject line of "How are we doing with the proposal?" must attempt to deduce or infer the sender's intentions, especially in cases where some information relating to the communications is either omitted or is unclear to the receiver. (e.g., in the case of multiple proposals, what particular project that is being referred to by the sender)

According to an embodiment of the present invention, an email message with the subject line of "How are we doing with the proposal?" would be associated by the system 10 with the grant proposal task event. In this case, the receiver need not try to infer what proposal the sender is referring to as it will be obvious from its associated task. Knowing this information may enhance the efficiency of the receiver in responding to the communicated intentions of the sender.

Certain of the events listed above may also comprise one or more so-called 'sub-events', which as used here, may refer to child events related to a parent event. For example, a task event that represents a broad activity may have task sub-events associated with it that describe the steps or processes involved in this activity.

For example, assume that a junior architect who is working on a project is asked by the senior architect to prepare a presentation for the client next week regarding some aspect of the project. To record her work for this activity, the junior architect may create a task event (e.g., a "Prepare Client Presentation" task) in the system 10 with a starting date (e.g., the current date) and the ending date (i.e., the date of the presentation). By creating this event, the junior architect may be able to identify the impact of this event on other tasks for the same project (or other projects) that she may also be responsible for.

Further assume that in order to prepare the presentation represented by the task event, the junior architect must perform certain related activities beforehand, including (among others):

writing text for the presentation;
    generating images of the design of the interior areas and exterior façade from the architectural computer files for the project;
    integrating the text and images for the presentation into a presentation file, such as a Microsoft™ PowerPoint™ file; and
    reviewing the presentation with the senior architect before the scheduled meeting with the client.

To remind herself to perform each of these activities, the junior architect may create a set of sub-events for the presentation task event. In particular, she may create a To-do sub-event that is associated with the presentation task event that contains the above list of activities. As the junior architect completes each related activity, she may remove it from the To-Do sub-event until this list is empty, which also indicates that the presentation is ready to be presented to the client and the task may be deemed finished.

It will be appreciated that events and sub-events are typically visible to everyone working on a project, unless the event is otherwise explicitly designated as private. For example, the aforementioned To-do sub-event generated by the junior architect would be visible to other project participants, such as the senior architect, so that they could assess the status and/or workload of the junior architect.

The visibility of each person's tasks within the system 10 can help break down informational 'silos' that otherwise obscure each user's roles, tasks and workload from others working on the same project. Removing these silos may help improve the efficiency of the overall project since certain participants (such as senior management) can identify potential bottlenecks caused by a particular person's excessive workload assignments. For example, if the senior architect saw that the aforementioned To-do event was the $101^{st}$ event assigned to the junior architect that needed to be completed within the next two (2) days, the senior architect may decide to assign this event to someone else.

It should be appreciated that while events created by a user in the system are typically visible to everyone, events can also be made private to only the user who created them, or to a group designated by the event's originator. Such privacy may be advantageous in that it provides the user with a certain degree of freedom and independence in handling activities that are associated with an event.

For example, the visibility of the To-do sub-event created by the junior architect in the previous example may be restricted only to her; it would not be visible to the senior architect or to other members of the project team. This allows the junior architect to return, revise, amend and reorganize the items in the To-do sub-event, as well as associate other types of sub-events (such as task sub-events) with the parent presentation task as necessary.

In this case, the senior architect and the rest of the project team only see the parent "Prepare Client Presentation" in the system 10. When the parent task is marked as complete (which can be done independently from its associated sub-events), the senior architect and/or project team will know that the junior architect's presentation is ready.

Further information regarding events will be provided below, but it is worth noting that each type of event within the events group 730 may also have a status associated with it. In one non-limiting embodiment, the status of an event may simply indicate whether it is completed or not (e.g., tasks shown as either "Done" or "Not Done"). Alternatively, the status of an event may further indicate to what degree it is complete either numerically (e.g., 47%) or alphanumerically (e.g., "Started", "Ongoing" or "Almost Finished").

In another non-limiting embodiment, the status of an event in the events group 730 may also indicate the reason(s) why an event is incomplete, such as its dependence on an earlier event or on a decision that has yet to be made. For example, a task representing the selection of an HVAC system for an office building may be listed as incomplete because a short-list of HVAC system candidates has not yet been compiled.

In addition to providing an indication as to the general status of an event, in another non-limiting embodiment of the collaboration system 10, users may be provided with the ability to receive notifications when certain activities related to an event occur.

One example of such notifications involve the ability to 'check-in' (or add) documents and to 'check-out' (or remove) documents that are associated with a documentation event in the system 10. The term "document" is used here in a non-limiting sense of any container that is capable of storing information. Therefore, a 'document' may refer to a file generated by a word-processor such as Microsoft Word (e.g., correspondence, reports or memos); emails, SMS text messages or other electronic correspondence; pictures or other images (e.g., JPEG files or TIFs generated by an incoming fax); spreadsheets (e.g., Microsoft™ Excel™ files); audio, video or three-dimensional (3D) files; and any other type of information container that is provided in an electronic format.

When a user views an event in the system 10 that has a document associated with it, he or she will be advised of the general status of this document (e.g., "not started", "in progress" or "complete"), as well as whether the document is checked-in or checked-out of the system. For example, a user viewing a document event associated with a status report may see a message similar to the following: "Currently checked out by Elmo David; checked out on 21-04-2011 at 16:45 GMT."

Although a document may be currently checked out by another user, it can be viewed and/or managed in particular ways. In one non-limiting embodiment, a user can view a read-only version of the document as it was last checked into the system 10.

For example, assume that a document event is associated with a weekly status report for the construction of an office building that identifies potential bottlenecks in the building's construction. Further assume that the latest version of the status report is being generated and is therefore currently checked out. In addition, assume that the general project manager has returned from three weeks vacation and wants to see if the bottlenecks identified in the report she last saw before leaving on vacation are still there. To do this, the project manager would access the document event for the latest status report and then view the version of the status report as it was when it was last checked-in. Although this copy of the status report is obviously incomplete, it may be enough to provide the project manager with information as to whether the bottlenecks before she left on vacation are still affecting the project.

In addition, notification for a document event can be configured such that when a particular action related to the associated document occurs, the user (or other users) would be notified. For example, a user can configure a document event such that the event is "reserved" by a user when the associated document is next checked in. In this case, when the associated document is checked-in and becomes available again, the system 10 sends a notification to indicate to this user that the document has been checked in and reserved for them.

The ability to configure notification upon a particular action related to an event may assist the users of the system 10 because they need not manually check the status of the event to see whether or not a particular action has occurred. In the previous example where a user is notified that their 'reserved' document has been checked in, it will be noted that this user is relieved of: a) having to manually check on the event's status in order to check it out once it becomes available, and b) locating and/or contacting the person who has checked-out the document so that the document can be re-checked in.

Another example of how user notification related to events may occur can be seen when a document is 'pushed' by one user to another. In this non-limiting embodiment, a first user designates a second user as the target for a document associated with an event, which may be currently checked-in or checked-out. If the document associated with the event is currently checked-in, the document event is assigned to the designated second user and the system 10 notifies this user of the new event. Otherwise, the document event is assigned to the designated second user once its associated document is checked-in and notification related to this action is provided to the second user at this point.

It will be appreciated that an event can be pushed to more than one person, either simultaneously or in a particular sequence or chain. The system 10 can be configured to notify users when the document moves between each person in the chain in order that its progress can be monitored.

For example, a document associated with an event can be 'pushed' to a group of reviewers in sequence so that a first reviewer may review the associated document, add his or her comments or edits, and then pass along the document to the second reviewer, and so on. Setting up such a sequence ensures that a) the document is reviewed by each reviewer in the group and b) the document is forwarded from one reviewer to the next without any undue effort on the part of the first reviewer.

When the document moves from one reviewer to another, the system 10 generates a notification to one or more reviewers along the chain. For example, when the document moves from the second to the third reviewer, the system 10 may notify the fourth reviewer so that this reviewer can prepare to review the document (e.g., reserve time in his or her schedule, make sure he or she is in communication with the system to receive the document, and so on). Alternatively, each time the document moves from one reviewer to another, all the reviewers in the chain of reviewers are notified, such that each reviewer is aware of the progress being made by the reviewers.

Although the prior examples regarding event notification have involved document events, it will be appreciated that such notification can be configured for any event, and is not restricted to document events.

Furthermore, initiation of a task event may be dependent on one or more other events in a project. For example, a task involving the electrical wiring of the $7^{th}$ floor of an office building may be dependent on the following three (3) events: a) a document event associated with a purchase order (P/O) for the various materials, such as electrical wire, junction boxes and switches; b) a messaging event that transmits the P/O to a electrical materials supplier; and c) one or more messaging events acknowledging receipt by the supplier of the P/O and an indication as to when these materials will be delivered to the site, which marks the point at which the electrical writing task may begin.

The user creating the task event may configure it such that the completion of each dependency triggers a notification to one or more users who may be directly or tangentially related to the task. For example, the completion of the document event (i.e., the check-in of the purchase order) may trigger a notification to a user who handles procurement that he or she must send the completed P/O to the material supplier. Likewise, the messaging event that sends the P/O to the supplier may trigger a notification to one or more users in the accounting department that a new P/O has been filed with a particular supplier and that they should be expecting an invoice for this P/O from the supplier. The messaging events acknowledging that the P/O has been received and the electrical supply materials are being shipped to the job site may trigger a notification to certain users who are doing the electrical wiring (e.g., electricians and their apprentices) advising them that they will need to start working on the $7^{th}$ floor of the building soon.

It will be appreciated that the use of notifications to indicate actions related to an event may help those involved with the event to identify potential issues or bottlenecks beforehand. For example, assume that notification has been sent to the electricians related to the wiring on the $7^{th}$ floor, but that the status of the task event related to the wiring of the $5^{th}$ floor is marked as "in progress" and the status of the task event for wiring the $6^{th}$ floor is marked as "late". As a result, a user may deduce from these facts that while the task event for the $7^{th}$ floor can be started, it is unlikely to remain on schedule unless additional resources (i.e., electricians) are brought on-board to perform this task.

It is worth noting that particular events in the above non-limiting embodiment are related within a hierarchy, namely timelines, tasks and sub-tasks. When such promotions (or demotions) occur, certain characteristics of the event change but the specific information related to the event (such as its status) remains the same.

Examples of such event promotions and/or demotions, include:
  promoting a task event to a timeline event, which may occur if the original task was defined too broadly and further delineation of its component parts are needed; and/or
  demoting a timeline event to a task event, which may occur if the original timeline was created to account a very specific action for which tasks are, in fact, unnecessary.

For example, assume that a task event titled "Develop project budget" is included with a project for a shopping mall. It will be appreciated that activities related to developing a project budget (especially for a complex development project such as this) may, in fact, be quite a complex and/or protracted procedure and involve more than one person.

Because the activity associated with this event are too broad, protracted and/or complex, the "Develop project budget" task can be promoted to a timeline event. This promotion allows a set of task events to be created that are associated with the timeline event and which may include (among others):
  task 1: determine a budget for the pre-design and design phases of the project;
  task 2: determine a budget for the construction phase of the project;
  task 3: determine a yearly operating budget for the building based on a 50-year estimated lifespan; and
  task 4: review and combine the budgets created in the previous three tasks to create the overall project budget.

In addition, the user who was originally responsible for the promoted "Develop Project Budget" timeline (and likely created the above associated task events) may invite a person who has certain specialized knowledge to assume the responsibility for each different sub-event.

For example, assume that a commercial development project in the above example is using a design-bid-build approach. In this case, the architect responsible for the project's design may be invited to do task 1 (i.e., determine a budget for the pre-design and design phases), the project's general contractor may be invited to do task 2 (i.e., determine a budget for the construction phase) and an accountant may be invited to do task 3 (i.e., determine an annual operating budget). By associating each task event with someone who is best suited to do the task, the possibility that actual budget for the project may more closely resemble that estimated by these individuals can be enhanced.

Each project within the set of projects $710_1$ to $710_N$ has a team associated with it. As used here, the term "team" refers to a particular group of people (who are likely members of the user community 14) that are involved with the particular project.

The team parameters 740 for a project may define one or more roles for each member of the team. A 'role' generally refers to the descriptor for one or more project responsibilities and describes the set of functions that the person assigned the role will contribute towards the completion of the project. For example, in the context of a construction project the "landscape architect" role may be responsible for certain aspects of a building project, including (among others):
  identifying aspects of the area surrounding a building (such as its slope) that may affect the drainage of water;
  designing walkways, signage and lighting systems to ensure that people can enter and exit a building safely and securely via various modes of transportation;
  selecting certain types of trees, plants and other vegetation that reduce water consumption and contribute to sustainable development; and/or
  determining personnel and material requirements for landscape maintenance, which in turn help determine costs associated with the operation of the building.

Advantageously, the use of roles within the team parameters 740 allow the responsibilities for events (and in particular tasks) within a project to be assigned long before it is know who the particular user within the user community 14 will be. For example, and with reference to FIG. 4, assume that Company B 420 represents a group of landscape architects, and the user profiles $340_{15}$, $340_{18}$ and $340_{44}$ represent three (3) of the landscape architects within this company. Further assume that the scope of a newly created project $710_j$ indicates that a landscape architect will likely be required in the future.

To allow events for the landscape architect to be created in an event group $730_j$, a role for 'landscape architect' can be created in team parameters $740_j$. In this way, tasks related to the landscape architect can be assigned to this role in the event group $730j$, even though which of the three landscape architects (i.e., those represented by the user profiles $340_{15}$, $340_{18}$ and $340_{44}$) will undertake the project has not yet been determined.

In addition to roles, the team parameters 740 also allow the identification of those users (via their user profile) to whom roles and/or events have been assigned. For example, assume it is decided that the landscape architect role will be assigned to the architect represented by user profile $340_{18}$. The team parameters $740_j$ will be updated to indicate that user profile $340_{18}$ has been given landscape architect role and therefore is assigned responsibility for those events and tasks associated with this role.

The building projects database 312 can include a set of project templates 750. Each template in the templates 750 represents a project whose event group 730 and set of team parameters 740 are pre-populated based on prior knowledge and/or experience. When a new project $710_a$ is created based on a template 750, the new project's event group $730_a$ and set of team parameters $740_a$ will contain the pre-populated set of events and roles from the template.

Using templates, such as the templates 750, can save a user considerable time and effort during project setup, especially if it is known that certain projects closely resemble each other in terms of their events and team parameters. Using the context of construction projects as an example, assume that the construction of shopping malls with an area of between 5,000 and 7,000 square feet that are built in the south-western part of the U.S. state of Arizona has been seen to include on average 1,278 separate events and 128 different roles within the set of team parameters. By using a template to set up a project for a new shopping mall of this type, the user is relieved of having to create all of these events and roles. In addition, the user could be sure that certain events and/or roles related to the new project were not inadvertently omitted due to oversight or ignorance of their importance.

In addition, the use of the template 750 may allow certain specialized knowledge or techniques to be implemented within a project that would not have occurred otherwise. For example, assume that the group of landscape architects from company B 420 has identified an improved method for estimating rainwater runoff amounts for buildings with exterior asphalt parking lots so that this rainwater can be captured and reused for landscape irrigation. By implementing this method within a template, other landscape architects at the company B 420 (and possibly those not employed by this company) can benefit from this improved method in their projects.

Figure 8:
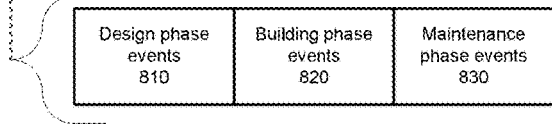
FIG. 8 is a further detailed block diagram illustrating the data structure of an events data category stored in the projects database.

It may be recalled that an event comprised within the event group 730 represents an occurrence or an activity in time. FIG. 8 shows how the events within the event group 730 can be generally classified as belonging to one of three (3) project phases, namely:
  design phase events 810;
  building phase events 820; or
  maintenance phase events 830.

In the context of construction projects, the design phase events 810 comprise both pre-design and design-related events related to all aspects of the design of a building up to the point at which the ground is broken and construction begins. Such events may include, among others:
  evaluating and selecting sites for the building or construction project;
  evaluating and selecting the design (and architectural firm(s)) for the building;
  determining the type of process to be used in running the project;
  conducting an environmental assessment of the selected site;
  identifying the financial outlay and general budget for the construction project;
  conducting a request for proposal (RFP) process to select one or more contractors for the project;
  determining whether the construction project will attempt to achieve a particular certification, such as LEED (and if so at what level);
  drawing up and submitting plans to various bodies (such as professional organizations, governmental bodies and/or certification bodies) for review and approval; and/or
  milestones for when the design phase ends and the construction phase begins.

The construction phase events 820 in an event group 730 comprise events related to the construction of the building for which the project was created. Such events may include, among others:
  site clearance, which may involve demolition, detoxification, topsoil storage and/or the extraction of original vegetation;
  normal activities associated with construction, such as the excavation and construction of foundations, construction of the building's exterior, plumbing- and electrical-related activities and HVAC installation and testing, among others;
  establishment of industrial recycling centers and implementation of recycling services during construction;
  reuse of original building materials, in the case where a building is being substantially demolished and/or the façade is being refurbished;
  installation of sustainable development-related systems such as grey water/wastewater recycling or renewable energy systems (e.g., solar panels or wind turbines);
  monitoring air and soil quality during construction activities;
  restoration of topsoil and/or vegetation during landscaping;
  submission of related documentation to the government and/or certification bodies; and/or
  milestones for the end of the construction phase ends, the occupation of the building and the beginning of the maintenance phase.

The maintenance phase events 830 in an event group 730 comprise events related to the general operation of the building over its expected lifetime, which may be expressed in decades. Such events may include, among others:
  regular preventative maintenance of building systems, such as HVAC systems (e.g., air conditioning/heating) or plumbing systems (e.g., wastewater and stormwater recycling), among others;
  expected replacement of building systems as they come to the end of their useful lives;

expected regular refurbishment of interior spaces, such as the refurbishment of public spaces or interior offices in an office building;

regular regeneration of vegetation for a green roof, where applicable;

collection and review of data related to energy efficiency of the building; and/or review of existing and planned sustainability initiatives in order to maintain or improve the building's certification.

It is worth noting that the maintenance phase events 830 are likely to constitute a large portion of the total events within the event group 730 for a given project. Those skilled in the art will appreciate that although the events comprising the design and construction phase events 810 and 820 may be measured in years, the events comprising the maintenance phase events 830 are likely to be measured in decades.

Furthermore, it will be appreciated that the maintenance phase events 830 allow regular maintenance for certain systems to be planned far (i.e., years or decades) in advance of their execution. By creating these tasks ahead of time, knowledge regarding the most effective methods for maintaining such systems can be transmitted between someone with certain specialized knowledge about that system to someone in the future who will be charged with maintaining the efficiency of that system.

For example, assume that during the design of an office building, a civil engineer chooses a particularly high-efficiency air-conditioning system in order to qualify the building for an environment certification such as the LEED certification. However, in order to keep the selected air-conditioning system operating at peak efficiency, the filters within the system must be cleaned out on a weekly basis, rather than on a monthly or bi-monthly basis as is the case with other air-conditioning systems.

To ensure that this maintenance is performed on a weekly basis, the engineer sets up a recurring filter-cleaning event in the maintenance phase events 830 to ensure that the filters are cleaned on a weekly basis. Otherwise, the technician responsible for cleaning out the system's filters may only perform this task on a monthly or bi-monthly basis, as is the case with other systems he or she may be familiar with. In such a case, the prospective gains in energy efficiency would not be realized, which could put the future LEED certification of the building in jeopardy.

It may be recalled that events within the event group 730 are initially assigned to roles within the team parameters 740. Typically, such roles are used as placeholders until members of the user community 14 can be assigned to fill them.

Figure 12:
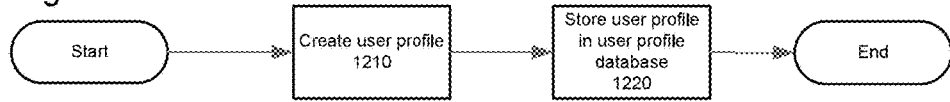
FIG. 12 is a flowchart of a process for performing registration at the community of the system illustrated in FIG. 1.

FIG. 12 shows a flowchart that explains the process by which a person may join the user community 14 by establishing a user profile with the system 10. Once a person has joined the user community 14, he or she may assigned to roles for a particular instance of the project $710_N$ stored within the project database 312, which will be discussed shortly in the context of FIG. 13.

At step 1210, the person who wishes to join the user community 14 (defined here as a 'prospective user') accesses the system 10, and more specifically the community management module 304, in order to create a user profile. For example, the prospective user may click a button or other user interface (UI) element provided by the system 10 to access the community management module 304. Alternatively, the prospective user may follow a hyperlink included within an email sent by an existing member of the user community 14 in order to access the module 304.

The module 304 displays a user interface (UI) that is configured to gather information related to the prospective user, including:

first name and last name;

user profile password;

contact details (e.g., address, telephone number and email address);

related skills and/or abilities of the user (e.g., whether the prospective user is involved in architecture or construction and/or whether they are familiar with reading blueprints);

professional affiliations of the user (e.g., whether the prospective user is a member of a architectural society); and/or privacy settings that define whether the prospective user would want certain information exposed to other users in the community 14, such as their location.

It will be appreciated that a certain minimum amount of information may be initially provided by the prospective user in order to create their user profile in the system 10. For example, the user may only need to enter their first name, last name and email address to create their user profile.

Other user profile information may be added by the prospective user as he or she participates in the user community 14 over time, such as other contact details and/or professional affiliations.

In addition, the UI displayed by the community management module 304 may also prompt the prospective user to agree to certain terms and conditions of use for the system 10 before the user profile can be created. Those skilled in the art will be familiar with such terms and conditions and therefore such details need not be discussed further.

At step 1220, the user-related information entered by the prospective user is added as a new user profile to the user profile database 314. Once the user's profile has been added to the database 314, he or she can be assigned events related to one or more projects in the project database 312.

During this step, the new user profile is assigned a unique ID within in the user profile database 314 so that the user can be identified within the community. The generation of such a unique ID is believed to be well known within the art and therefore need not be explained here.

It will be appreciated that between the steps 1210 and 1220, the community management module 304 may perform certain tasks to check and confirm the identity of the prospective user. For example, the module 304 may compare the entered information against the user profile database 314 to ensure that the prospective user does not already have another user profile.

Once the user profile is created within the user profile database 314, the community management module 304 may then perform certain follow-up tasks to ensure that the entered information for the prospective user is correct, including:

sending a confirmation email to the provided email address(es) (e.g., via an email server) to ensure that the provided addresses work;

calling the provided phone number(s) (e.g., via an Interactive Voice Response (IVR) system) to ensure that the provided phone numbers are correct; and/or require that the new user somehow reply to a confirmation email or phone call, such as by following an embedded hyperlink (in the case of email) or pressing certain buttons on their phone (in the case of an IVR system).

Once a user has their user profile stored within the user profile database 314, they can participate in one or more projects stored within the projects database 312. More specifically, a user may be invited to assume one or more roles on a project. Once the user agrees to assume this role for the project, they are assigned task responsibilities associated with this role and/or can create tasks for which they may be responsible.

For example, the designated architect for a project may be invited to assume the role of "project architect". Once the architect agrees to this role (the process of which is described below), he or she may be assigned responsibility for certain events, such as generating blueprints or creating a virtual fly-through of public spaces. The architect may also create events for himself or herself in addition to those that were assigned previously.

Figure 13A:
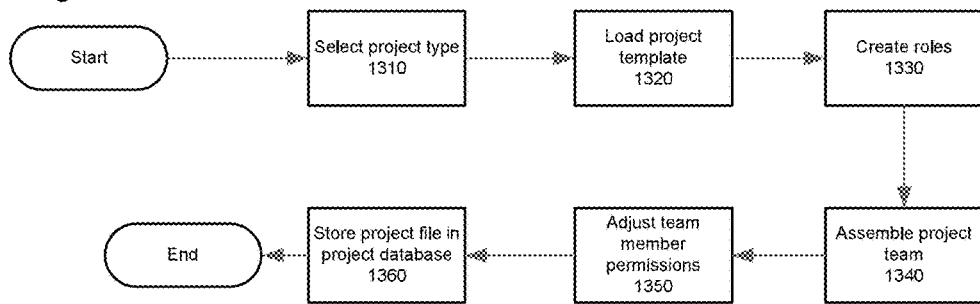
FIG. 13A is a flowchart of a process for creating a project with the system illustrated at FIG. 1.

As indicated above, when a user agrees to assume a role on a project, they may be assigned certain events within an event group $730_N$ for a particular project $710_N$. FIG. 13A shows a flowchart illustrating a process in which a project is created and an invitation to one or more users to assume responsibility for such events may occur.

At step 1310, a first user selects or defines the type of project to be created. The first user makes his or her selection/definition via a user interface (UI), examples of which appear at FIGS. 9, 10 and 11. The UI herein described in these figures may be accessible only once a user has logged into (i.e., had his or her user name and password verified by) the system 10.

Figure 9:
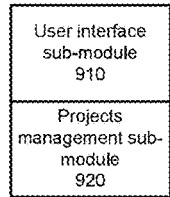
FIG. 9 is a more detailed block diagram of the building project module illustrated in FIG. 3.

In particular, the first user may access a user interface sub-module 910 that is shown in FIG. 9. This sub-module may interface, or otherwise co-ordinate, with a projects management sub-module 920 that may be a part of the projects module 302. Alternatively, the UI sub-module 910 may remain independent of the module 920 (and 302), and only interface with one of these modules when called by that module or sub-module. Regardless of the particular architecture of the sub-modules 910 and 920, it will be appreciated that the UI sub-module 910 can process both the display of interfaces (i.e., displaying them on a screen), as well as any concomitant input resulting from the display of the UI, such as a mouse click, input from a keyboard or the tap of a stylus and/or a swipe of one or more fingers on a touch-sensitive screen.

Figure 10:
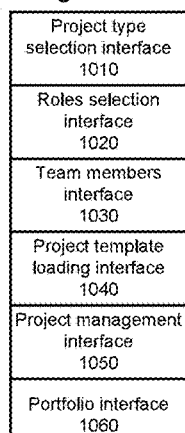
FIG. 10 is a more detailed block diagram of the user-interface sub-module shown in FIG. 9.
Figure 11:
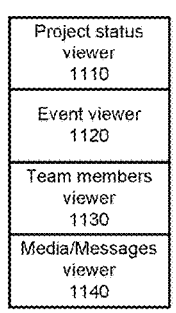
FIG. 11 is a more detailed block diagram of project management interface shown in FIG. 10.

FIG. 10 lists a set of interfaces that can be displayed by the user interface sub-module 910 to the logged-in user. As used here, the term "user interface" (or simply "interface") generally refers to a graphical user interface that allows the user to input information to the system 10, as well as receive information from the system 10. The user interface (such as those displayed by the sub-module 910, among others) is typically comprised of user-manipulatable controls that enable the user to input and/or receive this information. Examples of such controls may include buttons, text fields, checkboxes, drop-down menus, radio buttons and/or hypertext links, among many others.

It will be appreciated that the user-manipulatable controls within a user interface for the system 10 may be manipulated by a user in a variety of ways, including via:
- a pointing device, such as a mouse;
- a keyboard, such as by pressing certain key sequences;
- a finger or stylus applied to a touch-sensitive screen, such as that of a smartphone or tablet computer; and/or
- a voice command where the client 16 or computing device 100 is configured for voice input.

It will be appreciated that the manipulation methods described above comprise a non-exhaustive list as other methods exist and would fall within the scope of the present invention.

In particular, the sub-module 910 can display interfaces, such as:
- a project-type selection interface 1010, which would typically be used to select a type of project at the time of its creation;
- a roles selection interface 1020, which would typically be used to select roles for events within the events group 730;
- a team member(s) interface 1030, which would typically be used to assign an event to a particular team member included in the team parameters 730;
- a project template loading interface 1040, which would typically be used to load a template for a project (and/or some part thereof); and/or
- a project management interface 1050, which would typically be used to view and manage the project as it develops in real-time.

Returning now to step 1310, the first user would access the project type selection interface 1010 via the UI sub-module 920 and then select one or more type(s) of project from those listed in this UI.

In one non-limiting embodiment, the project type selection interface 1010 may list a variety of project types, including:
- the intended type of development (e.g., residential, commercial or industrial);
- whether the project is for a new development (e.g., a project for a new housing development) or for a retrofit/update of an existing development (e.g., a project to improve the energy efficiency of an existing office building);
- the certification level the project is expected to achieve, if necessary (e.g., whether the project is expected to meet LEED certification, and if so, what level of certification); and/or
- the intended design process for the project (e.g., design-bid-build process or an integrated design process).

It will be appreciated that the above list is non-exhaustive as other project types may exist that fall within the scope of the present invention.

Alternatively, the selection interface 1010 may use techniques other than a list to allow the first user to define or select the project type. For example, the interface 1010 could identify certain project criteria by "interviewing" the first user by asking him or her project-related questions, including:
- what is the general type of building (e.g., residential, commercial or industrial) that the project will represent;
- what is the expected duration of the building's design and construction;
- whether achieving a particular certification (or level of certification) is a design consideration for the project;
- what type of design process is planned for the project (e.g., integrated design process, design-build process, design-tender-build process); and/or
- what is the expected lifespan of the building that the project represents.

Based on the first user's responses to these questions (among others), the project type selection interface may be able to make suggestions or recommendations as to the best type(s) of project for what the first user seems to be indicating. For example, a project for a residential development with an expected 10- to 15-year lifespan would likely require different project parameters than a project for a commercial office tower with a 60- to 75-year lifespan.

At step 1320, one or more instances of the project template 750 are loaded for the project type selected by the first user in the previous step. It may be recalled that each template in the project templates 750 represents a project whose event group 730 and set of team parameters 740 are pre-populated based on prior knowledge and/or experience.

Based on this definition, it may be possible that one or more templates from the project templates 750 may be associated with a particular project type. For example, assume that the first user selects a project type for the construction of a 30 to 45 story commercial office tower within the downtown area of a major U.S. city from the project type selection interface 1010. Further assume that the office tower project is intended to achieve a particular level of LEED certification (e.g., silver).

Once this selection has been made, the system 10, and in particular the projects module 302 may identify one or more templates from the project templates 750 that correspond to the project's criteria. For example, the criteria that the building must achieve a particular level of LEED certification may result in the selection of a project template that contains LEED-related events and roles in for the project's event group 730 and team parameters 740.

It will be appreciated that certain templates comprised within the project templates 750 may provide events and team parameters (i.e., roles) for a complete project, while other templates contain events and/or roles for a portion of a project. For example, the events and roles related to achieving LEED certification mentioned in the above example may be contained in a separate template from those used to build projects. In such cases, when the first user indicates that the project for the office building requires LEED certification, the events and roles from the LEED certification template may be applied once the default project has been created.

By allowing templates within the project templates 750 to contain a portion of events and roles in the overall events group 730 and/or team parameters 740, it is possible to create a project dynamically by combining a number of different specialized project templates. Such specialized project templates within the templates 750 may represent different approaches that could be taken to a particular project and/or different aspects therein.

For example, assume that the first user intends to create a project in the system 10 representing a new academic library that is to be built using an integrated design process (IDP). Further assume that the project templates 750 includes a template that contains events and team parameters for IDP construction projects, as well as a template that contains events for applicable to construction of a library.

For example, the template for IDP construction projects may comprise team parameters that provide for the primary stakeholders including the architect, the building owner/operator and the main contractor(s). The template for library construction may include such events as:
  a set of events during the design phase events 810 to ensure that the foundations are reinforced for the substantial weight of books to be housed in the library;
  a set of events during the construction phase events 820 to ensure that the spacing of book stacks is sufficient to allow passage of book trucks, as well as wheelchairs; and
  a set of events during the maintenance phase events 830 to ensure that air filters within the library are cleaned out regularly so that the number of airborne parasites (e.g., mites) that feed on and destroy books are reduced.

When the project for the academic library is created in the building projects database 312, the team parameters from the IDP template and the events from the library-specific template within the project templates 750 may be combined to generate the event group 730 and/or team parameters 740 for the particular project. In this way, the specialized information and knowledge that is contained in each template may be combined to ensure that a project can benefit from the application of such knowledge.

It will be appreciated that the above example showed how two (2) templates from the project templates 750 could be combined during the creation of a project. The number of templates used in this example was provided for the sake of simplicity and projects could be generated by combining two (2), three (3) or more templates from the project templates 750.

It will also be appreciated that the event group 730 created as a result of a combination of one or more templates from the project templates 750 may still be modified by the first user (and/or by subsequent users) so that the resulting events in the event group 730 accurately reflects the expected events in the various project phases, such as the design phase events 810. In this way, the users retain ultimate control over the events in the events group 730 so that these events can be modified to adjust for prior experience and/or changing circumstances.

In a non-limiting embodiment, one or more of the templates within the project templates 750 may be selected automatically by the system 10 based on the first user's responses to questions posed to him or her via the project type selection interface 1010. In this way, the user would not need to know the various templates within the project templates 750 in order to use them within his or her projects.

For example, assume that the interface 1010 included a question relating to the construction management approach for the new project, such as: "What type of construction project management approach do you intend to use?
  a) Design-Bid-Build/Design-Tender-Build
  b) Design-Build
  c) Integrated Design Process (IDP)

Depending on the first user's response to the above question, the template for the appropriate management approach can be selected from the project templates 750. Furthermore, if the project templates 750 contain many such templates to choose from, the system 10 can shield first user from being overwhelmed, confused and/or making an inappropriate choice of template.

In an alternative embodiment, the first user may be provided with a UI that would allow him or her to select templates from the project templates 750 directly. For example, the project type selection interface 1010 could provide a user with a template UI that would list all of the templates within the project templates 750, such as in a collapsible list organized according to type of project, among others. Alternatively, the template UI may provide certain controls (e.g., drop-down lists) to allow the user to identify certain criteria that a prospective template must meet in order to be considered. Criteria that could be represented in such a way include (among others):
  project type (e.g., residential development vs. industrial development);
  project deliverable (e.g., office building, residential home, factory or library);
  expected operating lifespan of the deliverable (e.g., 5-15 years, 10-30 years or 50-75 years);

general project approach (e.g., design-bid-build vs. integrated design process); and/or certification level (e.g., silver LEED certification).

It may also be possible that the first user (and/or other users within the user community 14) can be provided with the ability to contribute and share templates within the project templates 750 with other users of the system 10. This ability may be provided by allowing members of the community 14 to apply and/or modify certain restrictions relating to their templates' privacy. In these cases, removing such restrictions from (or conversely, by enabling the ability to share) one or more of their project templates, the entire community 14 may be provided with access to such templates.

Advantageously, the ability to contribute and share templates may enhance the transfer and sharing of knowledge within the user community 14. For example, assume that a user in the community 14 has knowledge about the operation of a certain type of high-efficiency commercial boiler, and in particular, detailed knowledge of when the heating elements of the boiler need to be changed beyond that available in the documentation and/or training provided by the boiler's manufacturer. Furthermore, assume that this user created a series of maintenance phase events 830 for a particular project that used this boiler within a project template that was found to be particularly helpful.

If this user has the permission to contribute their boiler-related template to the user community 14, he or she could share it by removing any privacy restrictions placed upon it. In this way, other users in the community 14 who are using the same boiler in their projects could adjust their maintenance phase events for this component based on the knowledge contained in the user-contributed template.

In the above described embodiment, a template within the project templates 750 was contributed to and shared freely within the user community 14. Alternatively, user-contributed templates in the project templates 750 may also be offered for sale by their creator(s). In this alternative embodiment, a user within the community 14 may create a template within his or her project templates and then offer it for sale to other users. Users who wish to purchase this template could contact the seller (e.g., via the messaging features in the system 10) and arrange for payment, which may be handled internally within the system 10 itself (e.g., via a shopping cart mechanism) or by an external provider (e.g., via PayPal™). Once the transaction is complete (i.e., the payment has been made to the seller of the template), the system 10 could make the project template available to the buyer immediately.

Those skilled in the art will appreciate that a marketplace for project templates could be developed within the system 10 under such an embodiment. Furthermore, such a development could inspire users in the user community 14 to continue to develop and refine their templates after their initial development so that other users would continue buying them long after the original project for which they were developed was completed.

In the aforementioned alternative embodiment(s), a template within the project templates 750 is either freely offered or sold to the user community 14 by an individual member of this community. However, it is conceivable that a template within the project templates 750 could also be offered freely and/or provided for sale by a named group within the community 14, such as by an equipment manufacturer.

In such a case, the template within the project templates 750 that is provided or sold through the marketplace may contain events (such as tasks and/or document events) that relate to the installation, operation and/or maintenance of one or more models of equipment provided by the named group. For example, the manufacturer of the aforementioned high-efficiency boiler could produce a template within the project templates 750 that comprised tasks in a maintenance schedule needed to keep the boiler working at a high efficiency. This template could be provided freely by the manufacturer to the user community 14 to generate goodwill towards its products and/or to reduce support costs associated with the particular piece of equipment. Alternatively, the template could be sold by the equipment manufacturer through the marketplace in order to generate additional post-sale income for the manufacturer.

Alternatively, the marketplace for project templates may develop partially outside of the system 10. More specifically, a marketplace for project templates 750 may be developed in project templates between suppliers of equipment typically included in a project and the purchasers (or renters or leasers) of such equipment.

In this alternative embodiment, the purchase or lease of a certain piece of equipment from a first party (e.g., an equipment manufacturing company or maintenance company) by a second party (e.g., a contractor or building owner) for a project may include the provision of one or more project templates for that piece of equipment. For example, assume that a project in the project database 312 for a commercial shopping mall development requires the purchase of several large-scale heating/air-conditioning units. These units typically have certain pre-defined maintenance periods, such as during the spring (or fall) when a unit is typically switched from heating air to cooling air (or vice-versa).

During the negotiations to purchase such units with the contractor or building owner, the HVAC equipment manufacturer may offer to provide one or more project templates for these units that include predefined events covering the installation, testing and maintenance of these units over their expected operational life. For example, the project template provided by the manufacturer could include:

document events relating to the integration of the heating/air-conditioning units during the design phase events 810;

timeline, task, milestone, to-do and document events relating to the installation and testing of the heating/air-conditioning units during the construction phase events 820; and/or timeline, task and document events relating to the maintenance of the heating/air conditioning units during the maintenance phase events 830.

Should the contractor or building owner agree to the sale, the manufacturer (who likely has a presence in the user community 14 as a named group) can immediately make available the project templates for the models of heating/air-conditioning units sold to the contractor or building owner. The contractor or building owner can then import these templates to his or her project in order to add the heating/air-conditioning unit-related events to the project, without having requested or paid for the sale via the system 10.

Bundling one or more equipment-related templates within the project templates 750 with the purchase of the associated piece of equipment may provide certain benefits, including:

differentiating the equipment manufacturer from other manufacturers of similar equipment, making his or her products more attractive to prospective clients;

ensuring that the contractor, building owner (or building maintenance company) is in possession of a comprehensive set of documentation for the equipment in advance of the hand-over date;

ensuring that the maintenance tasks associated with a piece of equipment are established according to the manufacturer's recommended schedule, which may decrease the number of support calls/visits needed to maintain the equipment;

providing a method by which the equipment manufacturer can gauge the need for replacement parts or supplies, as the maintenance schedule for the equipment is known to the manufacturer and may be monitored and compared to those of other projects using the same equipment; and/or in the case where the equipment is subject to a recall notice, allowing the manufacturer to more effectively schedule the delivery of replacement parts and/or the activities of staff to install these parts in the equipment.

It will be further appreciated that the templates provided by equipment manufacturers in this way may be identical to those already on sale in the system 10 or may be customized to the specifications and/or location of the project. For example, if the shopping mall in the previous example is located particularly far north (or south) of the equator (i.e., near or within 60° latitude N or S), the manufacturer may adjust the timing of certain events and tasks in the maintenance phase events 830 to account for the relatively longer winter period.

The above alternative embodiments have described possible scenarios involving the provision of templates by different means (e.g., via purchase from an individual or company, as well as bundled with a particular piece of equipment). However, it may also be possible that the system 10 could provide the ability for a user to choose from various versions of the same template that differ in terms of their comprehensiveness and/or level of support. As a result, a user could select a version of a template that best suits his or her needs and/or budget.

For example, assume that a world-renowned energy efficiency expert for large office buildings has created a system that can help improve the energy efficiency in other office building projects. Although the system 10 may provide a basic energy-efficiency template, the expert has decided to offer the following three (3) versions of a template that implements his system:

a) a paid 'professional' template version that provides a comprehensive implementation of the expert's energy-efficiency system, but does not come with any support from the expert;

b) a paid 'professional expert' template version that costs more than the 'professional' version and contains the same version of the energy-efficiency system as in the 'professional' version but provides for a project team member to be trained by the expert to act as a guide or facilitator and includes a certain amount of support provided by the expert to the guide/facilitator; and c) a paid 'enterprise expert' template version that costs more than the 'professional expert' version but includes the expert joining the team in order to consult directly at a certain phase of the project, as well as providing considerably more support from the expert.

Depending on how the efficiency expert chooses to price the above versions of his template, a prospective user could choose the version of this template that best suits their needs. For example, if the user knows that providing better energy efficiency is going to be a major factor in the overall success of his or her office building, he or she might choose the 'professional expert' or 'enterprise expert' versions in order to take full advantage of the leading expert in this field. On the other hand, if the user cannot afford the cost of these versions, he or she may choose to go with the 'professional' version in order to realize at least some of the improved energy efficiencies in their project.

In the above example, the main price differentiator between the included version of a template and the expert's various template versions was a) the implementation of the expert's system in the project and b) the level of support provided by the expert to users of the template. It is conceivable that templates could be differentiated based on other factors, such as the number and type of roles or events in a project (e.g., an expert template provides certain roles not included in the basic template), the sequence of events in a project (i.e., events being sequenced in a particular way to realize certain efficiencies) and/or help content relating to events and roles, among others.

It may be recalled that the system 10 can be used as a marketplace that facilitates both the storage of templates (and/or template versions), as well as their discovery and purchase by users. This allows the seller of a template to realize some remuneration for their time and effort in creating the template. In addition, the system 10 may charge a fee (which may be a flat fee or a percentage of the transaction amount) to the buyer and/or seller for each purchase made. In this way, the cost of providing a fully-featured marketplace can be subsidized and/or recovered from the system's 10 users.

Although the use of templates within the system 10 is intended to assist and simplify the act of creating events and managing projects, it is likely that users (and in particular, new users) will require some assistance as they learn how to use the system 10. In order to provide such assistance, another non-limiting embodiment of the system 10 includes a help system that provides integrated, on-demand help in response to a user request (i.e., by clicking a help button or icon, clicking of a particular tab or use of a particular key such as F1).

The integrated help system may provide access to help content that can originate from different sources and may have very different objectives. For example, the system 10 itself may provide its own help content that aims to help users navigate the UI, identify different UI elements and learn the basic workflow involved with setting up projects and working with events. In addition, each template with which a user interacts may provide its own help content that aims to assist the user with the particular workflow and events included with the template.

For example, assume that a new user has joined the system 10 and has accepted a role working on a project to expand a university dormitory building. This project uses several templates, including an energy-efficiency template, a LEED certification template, and an IDP template used for general construction management. Further assume that the system 10 provides generic help content related to the UI and that each template provides its own help content that is specific to its template (e.g., the IDP template provides help content related to construction projects managed via the IDP approach).

Because the user is new, he or she needs assistance in navigating the UI of the system 10 (which is described below), and so activates the integrated help system via a control (e.g., button, icon or keystroke) to get information related to the purpose and usage of a particular UI element. In this case, the help system retrieves the relevant content from the generic help system for the system 10 and displays it to the user.

With this information in mind, the user then turns his or her attention to a particular event in the energy-efficiency template associated with the project. Since the user is not familiar with the way the template is set up and how this particular event falls into the general workflow, the user again consults the integrated help system. In this case, however, the help system retrieves the relevant content from the help content associated with the template rather than that for the system 10.

Those skilled in the art will appreciate that the system 10 may display help content in various ways, including within a web page (so-called "HTML Help"), in a pop-up window, through tips added to the UI or by playing a video or audio file, among other possibilities. The user may also indicate to the system 10 in what format he or she would like to view help content, which allows the system 10 to deliver help content in a manner which is more effectively retained by the user.

Therefore, it will be understood that no matter how many help content sources are available to a user, the integrated help system provides a single point of access to all of them within the system 10. As a result, the user does not need to be aware of the origin of the particular help content, as the help system handles the retrieval and display of the content to the user.

In another non-limiting embodiment, the integrated help system may provide an expert locator system to help a user access both help content (as described above), as well as to locate and contact one or more external experts who can assist the user should they need further help. For example, assume that the user described above who is working on an energy-efficiency template has reviewed the help content related to a particular event in the template, but still does not understand how this event fits into their project. If the user has access to the expert locator system (which may be provided upon payment of an additional fee or as a licensing option separate from the template itself), he or she could use the integrated help system to contact an expert to answer their question regarding the template. Such contact may be asynchronous (e.g., via an email message) between the user and the expert or synchronous (e.g., a VOIP call) between these two parties.

In the expert locator system described above, the user requiring assistance may locate and contact an external expert. However, it is also possible that the expert locator system may allow the user to search the existing user community 14, and more specifically, the user profile database 314 to locate the desired expertise. This approach may help to connect a user who is seeking assistance more quickly with a user within the user community 14 who is available to provide that assistance.

It should be appreciated that although the expert presented in the example of the expert locator system described above is human, this should not be seen as an absolute requirement. In an alternate embodiment, the "expert" provided by the system may in fact be a software agent that utilizes knowledge based on aggregated usage data generated by the users of the system 10 in order to provide assistance. In this case, the software "expert" may have identified that many prior users of the same energy-efficiency template were confused by this particular event and that a particular workaround helped them overcome their confusion. In this case, the "expert" would suggest implementing the workaround to the user via the integrated help system. A method by which a software agent can generate knowledge based on user interaction with the system 10 will be presented later.

The result of the prior steps 1310 and 1320 is the creation of a new project 710$_i$ within the projects database 312, including the generation of an events group 730$_i$ and a set of team parameters 740$_i$ for the project 710$_i$.

At step 1330, roles for the events within the events group 730 may be selected based on the type of event and/or prior experience, among other factors. During this step, therefore, each event within the events group 730$_i$ is provided with a role to indicate the person(s) who will be responsible for executing the activities associated with the event.

Certain types of events may include default roles for the team member(s) expected to complete those events. These default roles for events may be derived from a set of default roles that is maintained for all projects within the projects database 312 and assigned by the projects module 302. For example, events related to maintenance of an air conditioning system within the maintenance phase events 830 for the project 710$_i$ may indicate a role for an "HVAC Technician" or "Air Conditioning Maintenance Engineer", among other generic terms that could be used for such a role.

It will be appreciated that the association made between a particular event in the events group 730 and its default role from the set of default roles by the projects module 302 may be based on known history or prior experience. For example, certain events in the design phase events 810 (e.g., responsibility for the building's overall external aesthetic design) are typically associated with an architect. As a result, such events would typically be associated with the default "architect" role by the module 302.

Alternatively, certain events in the events group 730 may be associated with roles based on prior history or experience. For example, assume that events within the design phase events 810 that relate to the creation of the physical or virtual model of a building are assigned by default to the role of "architect". However, assume that for past projects, these events were actually assigned to and/or completed by a person with the role of "architectural model maker" who was employed by the architect. Therefore, it is similar events for current and/or future projects should likely be assigned to the "model maker" rather than to the "architect" role.

There are several ways that such role reassignment could take place. In one non-limiting embodiment, a user could manually request that the projects module 302 reassign such roles by extracting them from past projects created by and/or worked on by the current user. In this situation, the modeling events in the design phase events 810 would be initially assigned by the module 302 to the architect role. When the user requests role reassignment to take place (which may include identifying the project from which the module 302 should use as a base for such reassignment), the modeling events would then be reassigned to the 'model maker' role.

In an alternative embodiment, the projects module 302 might learn such role reassignments by extrapolating from an analysis of past projects. For example, certain logic built into the module 302 may review project roles reassigned for each completed project for a particular user. Such logic may determine that in each project, the modeling events within the design phase events 810 were assigned to a 'model maker' role. Based on such history, the module 302 may extrapolate that for future projects created by the same user, such events should be automatically assigned to a default 'model maker' role.

During this step, a list of all of the default roles assigned to the events group 730 for the project may also be compiled for a user's review. The compilation of this list may allow a user to identify and/or manually reassign roles for certain events, such as the reassignment of physical or virtual modeling events in the design phase events 810 from "architect" to "model maker" roles described above.

It may also be possible for the first user to create new roles for certain events in the events group 730 during this step. For example, if the "model maker" role was not part of the default set of roles included in the projects database 312, the user could add it manually and then reassign roles for events to this new role.

The user may be provided with the ability to add new roles (and/or manage existing roles) via the roles selection interface 1020 described earlier. For example, the interface 1020 may include an "Add New Role" control (e.g., clickable button or link) that would display a user interface that would allow a user to define a new role for the project. Criteria that could be defined via such a UI may include (among others):

- name for the new role (e.g., model maker, architectural modeler, virtual modeler);
- a brief description of the new role (e.g., "This role was created by Bob to define events outsourced to Janie at Models-R-Us";
- certain criteria that must be met by those assigned to the role, such as educational criteria (e.g., possess a Bachelor of Engineering), professional criteria (e.g., be certified as a LEED AP), professional experience (e.g., have at least 10 years experience in office building design) and/or other criteria that could be quantifiably measured, such as insurance coverage and/or number of employees.

Once a new role is created, it appears in the compiled list of roles. Typically, role reassignment occurs during the development of the project team, and more specifically, by the acceptance of responsibility for an event by a user whose role is different from the role originally associated to the event. While this process will be described below, it is worth noting that role reassignment may also be performed during this step to ensure that all of events in the new project (as displayed in the compiled list) are covered adequately by a default role.

At step 1340, the project team is assembled from users in the user community 14. The process by which the project team is assembled will be described in more detail below, but in brief, the first user invites people (who may be within the user community 14 or people who are currently outside of the collaboration system 10 entirely) to participate in the project by taking responsibility for a role and its commensurate tasks. The system 10 monitors the acceptance of the invitations until all roles on the project team are filled and the project team is considered assembled.

While further details of the above process will be described shortly, it may be appreciated that the approach towards assembling the project team is unlike those commonly found in similar systems. In particular, prospective members of a project team are invited to join the project and take responsibility for a role, rather than simply being assigned tasks as a so-called "resource" residing within a spreadsheet or Gantt chart.

By approaching the assembly of a project team as a community-building exercise (e.g., through invitations and role-related responsibility), the collaboration system 10 may help develop more open communications between project team members than might otherwise occur. Advantageously, such open communication within the project-related community may serve help to solve problems more efficiently as they arise.

The result of step 1340 is the assemblage of the project team. In the case where a project team member has a user profile within the user profile database 314, the acceptance of the invitation may cause several actions to occur, including:

- updating the member's user profile $340_i$ (and more specifically, the list of active building projects 520) to indicate that he or she is now participating in the project;
- updating the project team parameters $740i$ to indicate that the user has accepted responsibility for the indicated role; and
- updating the events in the event group $730i$ related to the accepted role to indicate the user now responsible for those tasks.

In the case where a project team member is not a member of the user community 14, their acceptance of a role within the project typically results in the member joining the user community 14 and creating a user profile $340_i$ within the user profile database 312. This process was described previously with respect to FIG. 12 and so need not be explained here. Once the team member has obtained a user profile $340_i$, however, his or her profile is updated in a similar manner to that described above.

At step 1350, the permissions for certain project team members may be adjusted where necessary. This step is optional and may occur when a role in the project is changed and/or the original first user fulfilling that role is replaced by a new second user.

Typically, permissions within a project are assigned to roles rather than to individual users in order to simplify the security model and allow turnover in the project. For example, assigning a default set of permissions (e.g., read, write, create, update, administer, execute and delete, among others) to a generic "architect" role allows anyone who assumes this role to also inherit those permissions assigned to the role. Therefore, should Bob Smith (the user originally assigned to the "architect" role) turn over responsibility for this role to Jane Brown (another architect and user in the system 10), Bob does not have to ensure that Jane has the same set of permission that he does before this transfer of role title (and commensurate event responsibilities) takes place. Advantageously, this approach simplifies the transfer of roles between users while continuing to ensure that the permission set restricts what any particular user can do.

In some cases, however, the assigned role does not carry with it all of the needed permissions. For example, assume that team parameters $740_j$ for a project $710_j$ contains an "HVAC trainer" role to indicate the person that will train other users in the operation and maintenance of the HVAC system. Further assume that this role is assigned read permission by default, as it is not expected that the trainer will need to access more than the documentation already stored in an event group $730_j$ (i.e., the documentation tasks within this group).

However, assume that the user who assumes the trainer role realizes his or her tasks include an event for "Developing training videos" and/or "Distribute training documentation for review". Because these permissions entail a wider set of permissions than is currently assigned, the permissions for the trainer are adjusted at this step to include write, create, update and delete permissions as well.

It will be appreciated that once a first user has accepted responsibility for a role in a project, any change to his or her permission set changes the permissions for both the role and user. This is because the user and his or her role are considered identical once responsibility has been assumed. Should the first user be replaced by a second user (i.e., the original person shifts the responsibility for the role to another), the second user will inherit the same set of permissions, while the first user will lose his or her original set of permissions.

At step 1360, information regarding the new project and its assembled project team are stored in the projects database 312. It will be appreciated that this step, and more generally the entire process described above, occurs within the context of changes made to the projects module 302, the project database 312, as well as the user profile database 314 (which is likely accessed via the community management module 304).

Those skilled in the art will realize that although this step states that a project is stored within the databases 312 and 314 at this point, this action is likely occurring continuously during all of the steps in the process outlined above. Therefore, the "storage" action indicated in step 1360 may include:
- a so-called "final commit" action made to the databases 312 and/or 314 that updates their tables on a more-or-less permanent basis; and/or
- the generation of a backup of the new project file and its associated information within the collaboration system 10, such that this information may be recalled or reconstituted in case of database corruption or failure.

The creation of a project, its events and their associated roles as described above has been described as being based on a template within the project templates 750 that is associated with the project type(s) selected at step 1310. For example, assume the first user selected the following project types at step 1310:
- commercial development of a urban medical professional center;
- IDP process is to be used to facilitate the design and construction of the development; and
- an objective of the project is to achieve and maintain LEED certification at a particular level (e.g., LEED NC Silver).

As the process has been described above, the project module 302 would likely choose and/or combine one or more templates from the project templates 750 corresponding to each of the project types identified above in order to develop the events and roles for this project.

It is conceivable, however, that the first user may not want to start a project with a set of events and/or roles from a predefined project template. Instead, the user may wish to start with a project that is completely empty of events and/or roles so that he or she could build these up himself or herself.

For example, this user may be interested in building a template containing the maintenance phase events 830 for a particular piece of equipment, such as a wastewater or stormwater run-off treatment unit. In this case, the user may not need or want to have any events and/or roles generated since these may not exist and/or the project templates 750 may only include this unit as a component of much larger projects for commercial or industrial property development(s).

To provide the first user with the ability to build such a project, the project templates 750 may include a blank project template that is devoid of predefined or preconfigured events and/or roles beyond those needed to establish the project within the project database 312. When this blank template is applied to a project, the user becomes responsible for entering events and developing roles in the process defined in FIG. 13B, rather than adjusting or customizing these pre-defined events and/or roles. In this way, a user can create a project (or project template) from scratch, without having any preset restrictions and/or preconceived notions about what events and/or roles are necessary.

In the above embodiment, a user is likely to use the controls within the system 10 to manually populate the blank project template with events and roles. However, in certain circumstances, the user may already have a file similar to the project template he or she wishes to create. For example, the user may have a file that was created in Microsoft® Excel®, Microsoft® Project or Google™ docs that contains a list of events and/or roles for the project, or portion thereof. Although the user could re-enter information from these files manually to the system 10, it would obviously be preferable that the user could 'import' (i.e., transfer) these events and roles to the blank template.

In a non-limiting embodiment, the system 10 (and more specifically, the projects module 302) may allow the user to import the content of files created with certain applications to a project in the projects database 312. In one specific example of implementation, the user may be allowed to import the contents of such a file to a blank project template in order to populate it with the events, tasks and roles developed in the other software application.

For example, assume that prior to using the collaboration system 10, the user was managing his or her projects based on an Excel spreadsheet. In the spreadsheet, assume that:
- a project event occupied a particular cell (i.e., intersection between a row and column)—
- columns represented time periods or increments (e.g., days, weeks or months); and
- rows in the column represented project roles (e.g., architect, modeler, HVAC contractor) and/or the names of the people typically assigned to those roles.

Therefore, a person viewing the spreadsheet would find the row with his or her name and follow it across to find the task(s) that he or she was responsible for that time period.

Now assume that the user wishes to build a project in the system 10 based on the template he or she already has in the Excel spreadsheet. When the user is creating the project, he or she may select or indicate (e.g., via a control provided by the user interface sub-module 910) that there is a file (namely, the Excel spreadsheet) that contains a template for or example of the project he or she would like to create. The user may also use the controls to indicate where this file is located and/or its type (e.g., Microsoft Excel or Project file).

Upon receiving such an indication, the projects module 302 may create a blank project template and then attempt to load the contents of the file into this template. More specifically, the module 302 may review the contents of the spreadsheet and try to determine certain information about this template, including:
- the probable location of one or more events (i.e., the cells containing the events);
- the type of event at each location (e.g., whether the event is a timeline, task, to-do or milestone);
- the role associated with the events; and/or
- the name of the person associated with each role.

Should the projects module 302 complete this determination process successfully, it will either transfer the information from the file to the project template and/or recreate these events and roles in the blank template. For example, the module 302 may be able to create events and roles in the blank project template based on the entries in the cells, rows and columns of the Excel spreadsheet. The module 302 may also review the names of the people associated with the roles to see if they are members of the user community 14 and offer to invite those who aren't in the community 14.

However, if the projects module 302 is unsuccessful at this determination process, it may request that the user assist it, such as by identifying certain sample events and/or roles in the spreadsheet. Such an iterative process may repeat until the module 302 is able to complete the determination process successfully and import the events and/or roles from the file.

For example, the system 10 may request that the user identify certain events and/or roles in the Excel spreadsheet with particular colors (e.g., red for timeline event, blue for a task, green for a role title). By identifying the colored cells in the Excel spreadsheet and matching it with the event and/or role type, the module 302 may be more successful at importing the events and/or roles from the spreadsheet.

When the projects module 302 performs this importing process, it does so to the best of its ability, which may result in certain mistakes (e.g., missed or incorrect events, roles, and/or incorrectly assigned event types) occurring in the resulting project or template. The user may then review each event and/or role imported and correct it, if necessary.

It will be appreciated that by providing a means by which a user can create a project or project template from an existing file, he or she may save a considerable amount of both time and effort related to this activity. Such savings may allow the user to be more productive in his or her project, thus realizing certain cost-savings and/or efficiencies for the project.

Although a blank template is likely used to create templates for the project templates 750, the blank template could also be used to create a training project for training a new user. For example, the new user could be provided with an empty training project that is based on the blank template. The new user would then be coached (either by the system 10 or by a human trainer) in creating events, inviting and assuming responsibility roles and/or creating and adjusting different types of tasks in preparation for performing the same activities in a "real" project. However, the invocation of the blank project template used to create the training project may be done by the system 10 (in the case where the training is automated) or by a human trainer who is different than the new user, rather than by the new user himself or herself.

Figure 13B:
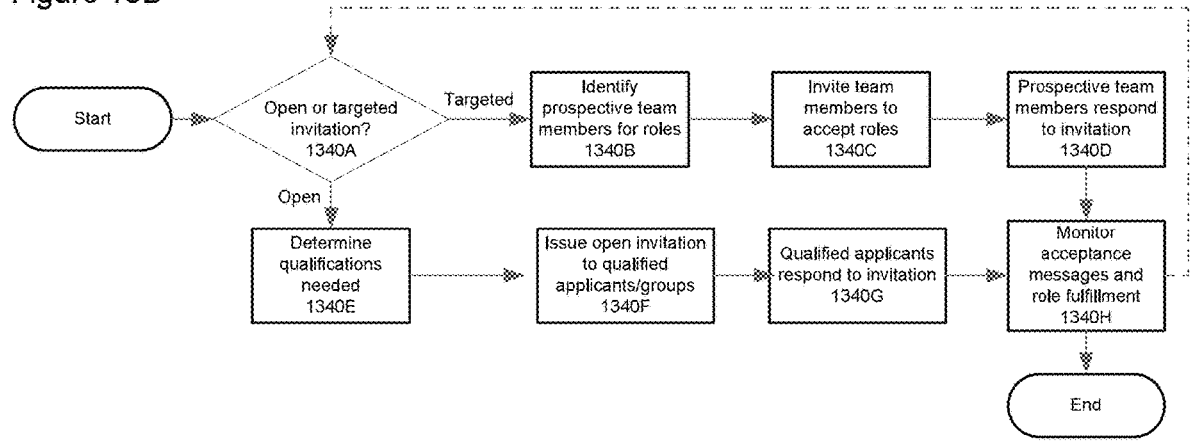
FIG. 13B is a flowchart of a process for assembling a project team that is related to a particular step in the previous figure.

FIG. 13B shows a non-limiting embodiment of a process by which the project team is assembled, which was described briefly with respect to step 1340 in FIG. 13A. In this respect, the steps in FIG. 13B may be seen as sub-steps of step 1340 in FIG. 13A and are numbered as such.

At step 1340A, a decision is made regarding the type of invitation to be extended for the role. More specifically, the invitation extended may be a so-called 'open invitation' or a so-called 'targeted invitation'. Depending on which type of invitation is seen as being intended, certain differences in the team assemblage process may occur, as shown by the branches in FIG. 13B.

An open invitation is extended to all members of a named group (e.g., a company) and/or the user community 14 who satisfy certain minimum qualification criteria and remains available until a first member accepts (or is selected from a group of applicants to accept) responsibility for the role. When such an invitation is issued, the projects module 302 and the community management module 304 may search the user profile database 314 to identify all users in the community 14 whose profile $340_i$ includes these criteria and alert them that such a role is available for a project. Should only a single member from this subset of the user community 14 accept the invitation, he or she assumes responsibility for this role in the project. Alternatively, if more than one member accepts the invitation, the first user may be provided with the opportunity to choose from these applicants as to who will assume responsibility for the role.

In contrast, a targeted invitation is typically extended to only a single member of the user community 14, to a non-member known to the inviter, or to a named group (whose administrator then functions as the inviter and selects a group member to be invited to accept the role). In this case, the first user is generally responsible for selecting the member of the user community 14 to whom the invitation is issued, although he or she may use certain features of the system 10 that will be described below to help identify potential candidates. When a targeted invitation to assume responsibility for a role is issued to a member, the user receiving the invitation has the option to accept or decline the role. If he or she declines the role, the first user must then extend the invitation to another member (who may also accept or decline the role), and continue repeating such iterations until a member chooses to accept responsibility for the role.

To illustrate the difference between the types of invitations, assume that a project 710' in the projects database 312 represents an environmentally friendly residential condominium development. Furthermore, assume that one of the roles in the project is for a 'Green Roof Consultant' who will be responsible for all events associated with the design, construction and maintenance of the green roof for this project. In addition, the consultant will document activities related the design and maintenance of this roof so that the development project may achieve some environmental certification, such as LEED.

If first user who created the project may not have experience with green roofs (and/or consultants in this field), he or she may decide to issue an open invitation to all members in the user community 14 who satisfy the following criteria:
  have at least 5 years of experience in construction;
  have constructed at least one green roof in the past and/or is in the process of maintaining at least one green roof currently; and/or
  have general experience with the LEED certification system, and more specifically with the process of certification where roofing is concerned.

Once the invitation is issued, the projects module 302 and community management module 304 review the user profiles $340_1$ to $340_N$ in the user profile database 314 to identify all members of the user community 14 who satisfy these criteria. Assume that such a search by the modules 302 and 304 reveal five (5) prospective candidates for this role. Each of these five members is alerted (e.g., via a message) that an opportunity to take responsibility for a role as a Green Roof Consultant exists and provide them with the ability (such as via a clickable button, hyperlink or other option) to accept the role. In addition, the modules 302 and/or 304 may provide each of the five prospective candidates with information regarding the project and the ability to contact the first user to find out more information about the role (e.g., location of the development, specifications for the green roof and/or what payment can be offered for the candidate's expertise and services).

Determining who accepts responsibility for the role may depend on how many of the five prospective candidates choose to accept the invitation. If only one of these candidates accepts the invitation, responsibility for the role will typically be assumed by this member. However, if a plurality of candidates accepts the invitation, the first user may be provided with the ability to choose from among these candidates as to who he or she wants to assume responsibility for the role. Once the first user makes this choice, the selected candidate typically assumes responsibility for the role.

Alternatively, consider the case where the first user either has experience with green roofs or knows one or more members who could fulfill the responsibilities of the Green Roof Consultant on this project. In this case, the first user will extend a targeted invitation for this project role directly to his or her preferred candidate rather than issue an open invitation. As with the open invitation, the modules 302 and/or 304 may provide the candidate with information regarding the project, as well as the ability to contact the first user to find out more information about the role (e.g., location of the development, specifications for the green roof and/or what payment can be offered for the candidate's expertise and services).

Once the targeted invitation has been issued, the preferred candidate can choose to accept or decline the proffered role. Should this candidate decline the role (e.g., because the candidate is too busy with other green roofs), the first user may select his next preferred candidate and issue the targeted invitation to this member, who may also accept or decline the role. This process continues until one candidate accepts the role as the Green Roof Consultant.

With this in mind, it will be understood that once a decision has been made regarding the type of invitation(s) to be issued for each role on the project team, the steps involved in assembling the team differ slightly depending on the type of invitation. In particular, using a targeted invitation to fill one or more project role(s) is described in the process branch defined by steps 1340B, 1340C and 1340D. In contrast, using an open invitation to fill one or more project role(s) is described in the process branch defined by steps 1340E, 1340F and 1340G. The two branches of the process merge at step 1340H. All steps in each branch will be described in further detail below.

The steps 1340B, 1340C and 1340D define a process branch whereby a targeted invitation is issued to a member (or named group) in the user community 14. At step 1340B, prospective candidates for each role on the project team may be identified by a first user (or users). Typically, the prospective candidates may already be members of the user community 14 and may also be known to the first user. For example, a user who is a general contractor will likely know other more specialized sub-contractors and may already have an idea of which of these specialized sub-contractors he or she wants participating in his or her project.

In other cases, however, the prospective candidates may not be known to the first user and/or may not be members of the user community 14. For example, a user who is a general architect for a project may want a particular landscape architect he or she is familiar with to take on the landscape architect role for this project, but this person is not currently a member of the user community 14. Alternatively, the general architect may not know any landscape architects and therefore may need to identify prospective candidates in order to decide which one he or she would like to participate in the project.

It may be recalled that the User Interface sub-module 910 described previously can display the roles selection interface 1020, which may be used to identify prospective candidates for roles in a project during this step. FIG. 13C shows one non-limiting embodiment of this interface, presented in the context of a team viewer interface 1130$_i$ (shown in FIG. 11) for a project 710$_i$.

With respect to this figure, the team viewer interface 1130$_i$ may be comprised from the team parameters 740$_i$ for the project, and more specifically, from the role for which each team member is responsible. For example, the interface 1130$_i$ includes such roles as a General Architect 7401, landscape architect 740$_{i2}$ to the role of the last team member 740$_{iN-1}$, which in this denotes an architectural modeler.

Each instance of the team parameters displayed in the interface 1130$_i$ includes the role title, a brief description of its responsibilities and indicates whether the role is currently assigned (i.e., a person is listed for the role) or unassigned (i.e., no person is listed for the role. In the case of a role that is unassigned, the team viewer interface 1130$_i$ provides an Invite option (indicated in italics in FIG. 13C) that allows the first user to identify the person(s) who could be invited to assume the role.

Selecting the Invite option typically causes the roles selection interface 1020 to be displayed, of which a non-limiting embodiment (i.e., the interface 1020$_i$) is shown in FIG. 13C. The interface 1020$_i$ includes a set of selection options 13C01 to 13C04 that may allows the first user to search for, identify and invite prospective candidates from within the user community 14 (as well as those outside of the community) to take responsibility for this role. The roles selection interface 1020$_i$ also includes controls 13C10 and 13C20 that allow the first user to either invite the selected user (or external person) to accept the role or to cancel the selection, respectively. It will be understood that although the interface 1020$_i$ displays four (4) options and two (2) controls, these are provided only as an example, and the roles selection interface 1020 may include more or less options and/or controls than are displayed here.

The selection options (e.g., the options 13C01 to 13C04) within the roles selection interface 1020$_i$ typically allow the first user to identify a prospective candidate for the intended role in a number of ways, including:
- searching the (user) community 14 for one or more user(s) of interest;
- choosing a named person or group within the community 14 that is known to contain one or more user(s) of interest; and/or
- selecting one or more user(s) of interest who are currently outside of the user community 14.

In addition, the selection options may also allow the first user to assign the role to himself or herself. It will be appreciated that the above list of selection options constitutes a non-exhaustive list as other options may exist and would fall within the scope of the present invention.

Should the first user choose the selection option to search the user community, the roles selection interface 1020*i* may display an associated search interface 13C100 that allows the user to view and interact with a list of the user profiles 340$_1$ to 340$_N$ that are stored in the user profile database 314.

In a non-limiting embodiment, the associated search interface 13C100 displayed by the roles selection interface 1020$_i$ may appear in a so-called 'foldout' menu that appears to emerge from and becomes attached one of the sides of the interface 1020$_i$. FIG. 13C displays the associated search menu 13C100 within such a foldout menu that appears to emerge from the right side of the team member viewer interface 1130$_i$.

The associated search interface 13C100 includes various search controls that allow the first user to search the user profiles stored within the user profile database 314 via various criteria or facets. The search controls 13C110 may allow search for user(s) of interest based on criteria that may include, among others:
- a name, which may include the user of interest's first name, last name and/or email address;

membership of the user(s) of interest in a named group that is known to the first user or in which the first user is a member (e.g., a company or non-profit organization);

past projects in which the user(s) of interest and the first user participated in;

a geographic distance within which the user(s) of interest may be located;

any qualifications or skills that the user(s) of interest must possess, such as current accreditation with a licensing body or experience with a particular HVAC management system;

a particular level of experience that the user(s) of interest must have, which may be expressed in a time duration (e.g., years of experience) or as a relative standing (e.g., beginner/intermediate/expert/guru);

any professional accreditation that the user(s) of interest must have, such as being a currently licensed architect with the appropriate board; and/or recommendations regarding the user(s) of interest that are generally positive or negative in nature.

It will be understood that the above list of search controls is non-exhaustive and that other controls and criteria may exist, which would fall within the scope of the present invention.

Those skilled in the art will appreciate that the search controls 13C110 may be provided in a form that is most appropriate to the type of criteria searched. For example, a control to search by user profiles by user name might be provided as a text field and/or drop-down menu, among other options. In contrast, a control to search by level of experience may provide a set of checkboxes or radio buttons that allow a user to filter according to a single experience criteria or by a plurality of such criteria.

In a first non-limiting example, the first user could input the name (or part thereof) of the user(s) of interest in the search controls 13C110, and in particular the User Name control. Should the portion of a name entered in this control match that stored for a user profile in the user profile database 314, the name of the user may be completed in the control. This allows the first user to designate a user of interest immediately from the search controls 13C110 rather than having to search through the entire list of user profiles $340_1$ to $340_N$ in the user profile database 314.

Alternatively, if the name entered in the search controls 13C110 does not match that stored for a user profile in the user profile database 314, a prompt may appear to indicate that no matches were found and/or alternative spellings (which may be identified from the closest possible matches in the database 314) may be provided to allow users with homonymic spellings of their names (e.g., Larry Flynn and Barry Flin) to be considered.

In another non-limiting example, the first user could enter or indicate particular qualifications for the user(s) of interest via the search controls 13C110, and particularly, the Skills Required control, the Experience Required control and/or the Professional Certification control, among others. In this case, the first user enters or indicates one or more qualifications in one of the control(s) and uses the other controls to refine his or her initial selection. As the first user is refining his or her selection (or alternatively, when he or she is done), a database search key or string is generated that is submitted to the user profile database 314, likely by the community management module 304. The search key or string converts the first user's indicated qualifications into a form suitable for processing by the database 314, such as a search query in the SQL language.

The search key or string is then submitted to the user profile database 314 in order to identify those user(s) of interest who possess the required qualifications, which may be expressed as some combination of skills, experience and/or accreditation. The resulting list of user(s) of interest may be displayed to the user in the same interface (i.e., the search interface 13C100) or in another interface provided for this purpose.

In the above example, the first user was responsible for entering and specifying the qualifications required for the role. In an alternative embodiment, the system 10 may handle this function based on known information about the unfilled role. For example, based on prior projects, the system 10 (and more particularly, the projects management sub-module 920) may become aware or are otherwise informed that users who take responsibility for certain roles require certain qualifications. For example, the qualifications for general architect for a project may require, among others:

design, drafting, budgeting, presentation and negotiation skills;

at least 5 years of experience; and current certification from a professional architectural body.

Based on this information, the sub-module 920 may consult the user profile database 314 to identify prospective candidates and generate a potential short-list for the role based on these criteria even before the associated search interface 13C100 is accessed by the first user. In this way, the system 10 can anticipate the need to fill the unassigned roles and assist the first user in identifying prospective candidates. Of course, it will be understood that the first user can still refine this list of prospective candidates further using the other search controls 13C110.

Advantageously, such a manner of identifying prospective candidates for roles may allow certain specialized knowledge encoded within the system to be used to identify candidates for a role. For example assume that the first user indicates that an architect with 3 to 5 years of experience is suitable for a project. However, the system 10 is aware of prior knowledge indicates that an architect with 5-7 years of experience would be a better choice for a project of the type and scale indicated, the first user may be alerted to such knowledge, such as via a prompt or message. A process by which such knowledge can be extracted from user contributions to the system 10 will be described later.

In the above embodiment, the search performed by the first user via the roles selection interface 1020 and the associated search interface 13C100 was undertaken based on all user profiles $340_1$ to $340_N$ stored in the user profile database 314, which represents all users in the user community 14. However, it may also be possible the first user may want to restrict his or her search for one or more user(s) of interest to a particular subset of this population, such as a named group that represents the employees of his or her company.

In such cases, the first user may use the roles selection interface 1020 to invoke a logic that would otherwise restrict his or her search to a particular group within or subset of the population of the user community 14. For example, this user may choose the "Choose from a group" option in the selection controls 13C1 to 13C4. Selecting this option would cause the associated search interface 13C100 to display a somewhat different set of the search controls 13C110 within this interface.

In particular, the search controls 13C110 would allow the first user to select one or more particular named groups from which user(s) of interest are to be searched. For example, the first user may select the named group corresponding to the company or business that he or she works for, and/or the named group defining a particular department in this organization. For example, assume that the first user is a civil engineer in a large engineering firm who is looking for an environmental engineer to work on a project in such a role. Rather than search the entirety of the user community 14 (which may contain user profiles for hundreds or thousands of environmental engineers), the civil engineer chooses to restrict the search to a named group using the option described above.

As before, the associated search interface 13C100 appears as a foldout beside the team parameters viewer 1130i, displaying the search controls 13C110. In this case, however, the search controls 13C110 may provide the option to select by named group(s) rather than by user name(s). To generate the search key or string, the civil engineer first selects the named group for his or her company and/or the named group for the environmental engineering department within this organization. This restricts the search to only those user profiles within the named group(s). As before, the civil engineer can use the other search controls 13C110 in this interface to continue refining the search criteria in order to more closely define the characteristics for environmental engineer that is his or her ideal user(s) of interest for this role.

It will be appreciated that other subsets of the user community 14 may be selected for a search in a manner which is generally similar to that described above. For example, a search could be conducted by the first user on a subset of the user community based on a certain level of experience and/or a particular recommendation level.

In a non-limiting example of the former case, assume that the role selection interface 1020 includes an option based on experience, such as a "Choose based on experience" option. Upon selecting this option, the following may occur:

the projects module 302 and/or the projects management sub-module 920 may employ a certain selection logic to review the user community 14 and identify users who would likely fall within the subset for this role; and the associated search interface 13C100 appears in a foldout as before, but the set of search controls 13C110 provided in this interface might be tailored to allow the first user to better define the level of experience that user(s) of interest for this role must have.

For example, assume that the first user is a general architect who is trying to fill a landscape architect role for his project. The project that the general architect is bidding on is intended as a showcase office tower headquarters for a large multinational organization. Based on this knowledge, the general architect knows that he must choose a landscape architect with considerable experience and so chooses the "Choose based on experience" option in the roles selection interface 1020i.

When the architect makes this selection in the roles selection interface 1020i for the landscape architect role, the projects management sub-module 920, the projects module 302 and/or the community management module 304 may submit a preset search string to the user community database 314 in order to identify the subset of the user community 14 that likely fits the general requirements known for this role (i.e., the user profile 340i indicates that the user is presently a landscape architect and/or is currently accredited as such). Furthermore, the sub-module 920 and/or the modules 302 and 304 may sort the users identified by this preset search by their stated (or inferred) experience, such as by listing the most experienced landscape architects at the top.

It will be appreciated that this preset search is likely executed at the same time that the associated search interface 13C100 is displayed to the general architect. The landscape architects found by the preset search are also likely displayed within this interface, and the set of search controls 13C110 is customized to allow the architect to refine his search of this population further. For example, the general architect may specify via the controls 13C110 that the landscape architect(s) of interest must also have at least 10 years of experience with commercial development projects and/or office buildings, as well as be located within 100 miles/kilometers of the site location in order to facilitate communication and co-ordination during construction.

A similar process may be used to identify user(s) of interest based on a user community-generated general recommendation (or satisfaction) level or rating that can be associated with a user profile 340. In this case, a first user may choose an option in the roles selection interface 1020 similar to "Choose from the most recommended users", rather than options based on groups or experience as have been described previously. However, the general selection logic used by the projects management sub-module 920 and/or the modules 302 and 304 to identify a subset of users from the user community 14 who generally fulfill the role requirements, as well as customizations to the associated search interface 13C100 to allow further refinements of the search, would otherwise be identical.

In certain cases, the user(s) of interest for a particular role in a project may not currently be members of the user community 14. For example, new employees of a company that is using the collaboration system 10 are unlikely to have a user profile 340i unless they previously participated in a project using the system 10.

In such cases, the role selection interface 1020 can provide the first user with the ability to invite the user(s) of interest to join the user community 14 and subsequently assume the project role envisioned for him or her. For example, the role selection interface 1020i provides the "Invite a person to join" option.

When this option is selected, the user is provided with controls to enter the email address of the person being invited to join the community 14. For example, the associated search interface 13C100 may display one or more fields that allows entry of the email address of the intended user of interest, as well as other fields to allow related information (such as a brief message or the name of the inviting user) to be entered.

By providing such options, the role selection interface 1020 allows the first user a variety of search and selection means to identify the best person to fill the available role in the project.

At step 1340C, the system 10 sends the user(s) of interest a message alerting them that they have been selected for a role in the present project and inviting them to accept responsibility for this role. The message may be sent using the projects module 302 or the community management module 304 and may take one of several forms, depending on whether the user is determined to be currently connected with the system 10 or not.

Should the user of interest be determined to be currently connected to (i.e., logged into) the system 10 may issue a message to the user of interest, alerting them that he or she has been selected as a prospective candidate for a role in the project. The user may be alerted to this via a message via an interface provided in a media/messaging viewer 1140 that will be described later.

Alternatively, if the user is determined to be currently disconnected from (i.e., logged out of) the system 10, the message may take one of several forms, including:

- an email message to an email address of the user of interest, either as indicated in his or her user profile or to an email address indicated by the first user, if the user of interest is not currently part of the user community 14;
- a text message (e.g., an SMS or MMS message) sent to the mobile device of the user of interest, such as via an SMS server operated by a network provider (e.g., a mobile telephone company); and/or
- a voice message sent to the telephone of the user of interest via an IVR system.

It is believed that methods for determining whether a particular user (such as the user of interest) is currently connected or disconnected to a computer system and/or network, such as the system 10, are known in the art. As a result, further discussion regarding such determination methods need not be provided here.

It will be further appreciated that in the case where the user profile 340$_i$ contains multiple messaging means of contacting the user, it is possible that the user may establish a priority for these means. In particular, the user may identify certain messaging devices as being preferred over other devices. For example, in the case where a user lists his or her work phone number, cellular telephone number, work email address and mobile email address (among others), the user may indicate that a mobile communications device (e.g., his or her cellphone) may be his or her preferred means of receiving a message.

In such cases, the message sent to the user of interest during this step may follow the priority set by the user. For example, if the user profile 340$_i$ indicates that the user would prefer to be contacted by SMS first and then by email, the modules 302 and/or 304 may try initially sending the invitation via SMS and then wait to see if the user responds via this messaging means. Should the user not respond to the invitation within a certain predetermined time period (e.g., within 24 hours), the next preferred messaging means (e.g., an email message) will then be used to send the invitation.

It may be appreciated that an invitation to assume responsibility for a role is sent to a named group (e.g., a company or department), the invitation may be intended for a particular person in that group. Furthermore it is possible that when the invitation is sent, the person who will fulfill the role from that group may be unknown.

For example, assume that an invitation for the role of "HVAC system technician" is sent during the initial setup of a project to a named group that represents a heating and air conditioning maintenance company. Since the maintenance phase events for this technician are likely set far into the future, the actual technician who will be handling the maintenance of the HVAC system may not be known at the time when the invitation is issued. (In fact, it is possible that the technician who will actually service this equipment in the future may not have been hired yet.)

To handle such situations, a member of each named group may be deemed the 'administrator' of the group. In certain cases, the group administrator may be the user who initially created or set up the group within the user community 14. In other cases, the group administrator's role may be transferred among several users.

Regardless of which user in the group acts as its administrator, he or she may receive messages (such as invitations) on behalf of the entire group and then forward such messages onto other group members as appropriate. In the case of invitations to assume responsibility for a role, the group administrator may forward such messages onto one or more users in the group for consideration.

Continuing the example above, the group administrator for the maintenance company would receive the initial invitation to assume the HVAC technician role for the project. Depending on how far in the future the events related to this role are set, the group administrator could either accept the role himself or herself and transfer it later to another group member (i.e., HVAC technician) who will actually perform the work, or wait until a later time and forward it to the group member who will actually perform the work.

At step 1340D, the prospective user(s) of interest respond to the invitation that was issued in the previous step 1340C. In particular, the user(s) of interest can either accept or decline the invitation.

It will be noted that the ability to accept or decline the invitation may be integrated directly into the message. For example, an invitation sent via email or SMS message may include controls (such as graphic buttons or text instructions) to indicate whether the invitation is accepted or declined. Invitations sent as voice messages via an IVR system may include prompts that allow the user to indicate his or her acceptance or refusal of the invitation via the touchpad of the telephone (e.g., "Press the star key to accept the invitation. Press the pound key to decline the invitation").

As indicated above, an invitation issued to a group is typically received by the group's administrator, who may not be the intended user for the invitation. Therefore, the group administrator may forward the invitation onto one or more group members without needing to accept or decline the invitation himself or herself.

The steps 1340B, 1340C and 1340D define a process branch whereby an open invitation is issued to a member (or a named group) in the user community 14. At step 1340E, the first user defines one or more criteria that a prospective candidate must satisfy in order to be considered for the role on the project. The project module 302 and/or community management module 304 will use these criteria at a later step to identify and invite prospective candidates to accept the role.

It will be appreciated that in order to define the criteria for prospective candidates, the first user may use an interface similar to that which has already been presented in FIG. 13C. In particular, the user may choose the appropriate option from the team member viewer interface 1130$_i$, such as "Send an Open Invitation to the Community". Upon choosing such an option, the associated search interface 13C100 may appear in a so-called 'foldout' that is laterally arranged aside the interface 1130$_i$. In this way, the first user is presented with a set of similar interfaces for issuing open and/or targeted invitations, which allows a user to use these controls more efficiently regardless of the type of invitation being issued.

To reiterate, a significant difference between the open and targeted invitation types is that in the former type the one or more specific users of interest who are prospective candidates are not known to the first user apriori. In fact, the prospective candidates may not be known to the first user until the member of the user community 14 accepts the role. This may be advantageous in cases where potential confidentiality and/or conflict-of-interest issues on the part of the first user make issuing a targeted invitation difficult.

For example, a first user who is a government or military employee or contractor may be restricted by certain conflict-of-interest laws that prevent him or her issuing a targeted invitation to certain preferred prospective candidates. In such a case, the first user can issue an open invitation that would likely include these preferred candidates among others.

Because the first user may not need to know (or, in fact, be prohibited by law from knowing) the identity of prospective candidates for a particular role, the associated search interface 13C100 may display a somewhat modified set of search controls 13C110. In particular, the search controls 13C110 may allow the user to define certain criteria for the prospective candidates but not show the name(s) of the members of the user community 14 who would be included considered users of interest.

For example, the controls that would allow identification of one or more specific users of interest in the search controls 13C110 (e.g., the User Name and/or Member of Group controls) may be absent or unavailable when the first user chooses to issue an open invitation. However, the controls related to qualifications, such as location, skills required, experience required and/or professional certification, may be available.

For example, for the role of a landscape architect, the first user may identify that prospective candidates must possess qualifications including:

5 years of experience as a landscape architect;
    at least two commercial development projects (e.g., office or shopping mall developments); and/or
    located within 150 km of the project site.

As the first user uses the search controls 13C110, in this way, he or she is defining the required qualifications needed by a member of the user community 14 in order to assume responsibility for the role. In the context of a targeted invitation, this would have resulted in the creation of a search string or query submitted to the user profile database 314 that resulted in the display of a list of one or more members in the subset of the community 14 who fulfilled these criteria. However, in the context of an open invitation, the use of these controls does not display such a list, although a search string or query may be similarly generated and submitted to the database 314.

Although the names of prospective candidates are not communicated to the first user in an open invitation, the system 10 may provide some indication of the number of candidates found to this user. For example, assume that a first user uses the search controls to issue an open invitation for the role as a landscape architect and has entered the three criteria above in the search controls 13C110. The community management module 304 submits the search query to the user profile database 314 and determines that over 2,000 users in the community 14 fulfill the first user's criteria. This value may cause a prompt to appear that informs the user that the number of prospective candidates is very high. In turn, this may cause the first user to add or otherwise modify his criteria in the search controls 13C110 to reduce the set of prospective candidates to a more manageable number.

In the above description, the first user is responsible for defining the set of qualifications used to select prospective candidates for the open invitation. However, it is conceivable that the associated tasks related to the unfilled role may themselves define a set of qualifications and/or requirements for prospective candidates. In such a case, the first user may simply review and approve the set of qualification for the open invitation rather than be directly involved in the construction of the set of qualifications.

For example, assume that an unfilled role on a project for an office building development is for a project accountant. Assume also that the current project was created by the first user based on a template from a prior office building development that also included a project accountant role. Further assume that the project accountant role in the previous development project required a certain set of qualifications, including:

3 to 5 years of experience in construction-related accounting;
    located within 50 miles of the building site;
    professional accreditation as a Chartered Accountant (C.A.); and
    experience with planning, accounting for and submitting documentation to support certain LEED certification activities (e.g., providing receipts showing that 100% of the building materials used were sourced locally).

Because the project accountant role in the current project is based on a substantially similar (if not identical) role in a prior project, the set of qualification for the current role may already be defined. In this case, the first user need only review the set of qualifications to ensure that they conform to his or her role expectations before issuing the invitation to the user community 14.

It will be appreciated that even when a role includes a predefined set of qualifications, the first user has the opportunity to adjust this set of qualifications accordingly. For example, if the first user in the above project prefers to have the project team located closer to the building site, he or she could adjust the location-related qualification so that prospective candidates would need to live within 30 miles of the building site instead of 50 miles. This ability to adjust the set of qualifications for an open invitation ensures that the first user has flexibility to adjust the role to match his or her current project's requirements and/or expectations rather than those of the past.

In an alternative embodiment, the first user may use the search controls 13C110 to define a first set of qualifications (such as a level of experience) that is necessary, as well as a second set of qualifications that would be preferable but are not as necessary as those defined in the first set. (These two sets of qualifications are typically referred to as 'must have' and 'nice-to-have', respectively.) By defining these two sets of requirements, the first user may provide the project module 302 and/or the community management module 304 with a method of sorting and ranking prospective candidates. This may allow the modules 302 and/or 304 to indicate to the first user how many prospective candidates meet all of his or her criteria (i.e., necessary and nice-to-have) versus those that meet only some of the criteria (i.e., all must-have and some nice-to-have). This indication may cause the first user to consider whether his or her search conditions are too restrictive or broad.

The result of step 1340E is the generation of a set of qualifications identified by the first user via the search controls 13C110 that prospective users must meet. As in the case of the targeted invitation, the modules 302 and/or 304 convert this set into a search string or query that can be submitted to the user profile database 314. It is worth noting that this conversion (and the submission of the search string to the database 314) may occur simultaneously with the user's interaction with the search controls 13C110 or shortly thereafter. Thus, once the first user indicates that he or she is satisfied with the set of qualifications (i.e., by clicking an 'Invite' button), the modules 302 and/or 304 may already have identified the subset of prospective candidates from the user profiles $340_1$ to $340_N$ in the user profile database 314.

At step 1340F, the open invitation is issued to the set of prospective candidates (or users of interest) based on the result set generated by the search string or query submitted to the user profile database 314 in the previous step. The open invitation may be issued using a number of forms that are substantially similar to those used for the targeted invitation (e.g., message, email or SMS text), and therefore, the explanation of these forms is omitted here for brevity.

It is worth noting that, regardless of the form of the invitation, it would typically contain a control (such as a clickable button or checkbox in the case of a message or email) that allows the prospective candidate to indicate his or her interest in assuming responsibility for the project role, or for declining the role. For example, the invitation may include an "Accept" button and a "Decline" button (or icons representing similar indications) to allow the prospective candidate to indicate whether he or she wishes to assume responsibility for the role in the project.

Like targeted invitations, an open invitation can be issued to named groups as well as individual users. As described above, such an invitation will be received by the group's administrator, who can accept the role on behalf of the group. Alternatively, the administrator may forward or pass along the open invitation to one or more group members without accepting it himself or herself.

It is expected that when an open invitation to accept responsibility for a role is issued, acceptance of the invitation will not be instantaneous. In the context of many industries, prospective users may need time to review their current and future workloads and communicate with the first user to obtain more information about the project, review the expected workload and/or negotiate compensation, all of which may be facilitated by the media/messaging viewer 1140.

To account for such a period, the first user may be provided through the search controls 13C110 a control to establish an 'acceptance period' for the open invitation. For example, the open invitation could be issued to prospective candidates on a Monday but such candidates would be prevented until Wednesday (i.e., 2 days later) to reply in order to give a candidate time to learn about the project and decide whether or not he or she would like to participate. On Wednesday, the acceptance period for the role is opened and the first prospective candidate to signal his or her acceptance can accept responsibility for it.

By providing an acceptance period, the first user can prevent prospective candidates who receive an open invitation from feeling pressured to immediately choose whether to accept or decline the offer without further information about the project, lest they lose it to another candidate. In this way, responsibility for an available role can be filled by a user who is likely genuinely interested in working on the project, rather than someone who jumps at an opportunity and then decides whether or not to participate.

At step 1340G, one or more of the prospective candidates respond to the open invitation issued during the previous step. Responding to the open invitation may be performed by in various ways, which may include:

using a control (such as a clickable button or checkbox) embedded in a message or email to indicate whether the user accepts or declines the role;

sending (or replying) to an text message from a cellular phone (e.g., texting "Accept" or "Decline" to a particular SMS number); or replying to a IVR system prompt by keying in a particular sequence of keys on a telephone, such as the pound (#) key (e.g., Pressing the pound key (#) to accept the invitation or pressing the star key (*) to decline the invitation.

Those skilled in the art will appreciated that other ways of replying to an open invitation may exist that would fall within the scope of the present invention.

At step 1340H, replies to invitations from the previous step are monitored by the system 10 to determine acceptance or refusal of project roles by their prospective team members. In particular, the projects module 302 and/or the community management module 304 receive:

indication of acceptance or refusal from a user of interest for a targeted invitation; or indication of acceptance or refusal from one or more prospective candidate for an open invitation.

In the case where the user accepts responsibility for the project role in a targeted invitation, the projects module 302 can update the projects database 312 to indicate that the user accepted the project role and so has become a project team member. This may cause the team member viewer 1130 to be updated to indicate that the role was accepted and list the user's name associated with the role.

In a similar manner, the community management module 304 may update the user's profile 340' within the user profile database 314 to indicate that the user has accepted responsibility for the invited role and has thus become a member of that particular project. This may cause an interface shown to the user to include the new project on which the user is now going to be working.

In the case where a user accepts responsibility for the project role in an open invitation, the projects module 302 may react differently depending on the number of candidates who accept the role. If only one candidate accepts responsibility for the role, the module 302 is likely to act in a similar way to that described for a targeted invitation. In this case, the projects module 302 and/or community management module 304 would update the databases 312 and/or 314 (and or the team member viewer 1130) to indicate that the prospective candidate accepted the project role and so has become a project team member.

On the other hand, if an open invitation results in a plurality of prospective candidates who indicate that they would like to accept the role, the projects module 302 may use a determination process to decide which of these candidates will assume responsibility for the role.

For example, a list of the candidates who indicated their acceptance of the role may be provided to the first user in a message to allow him or her to make the final choice as to who should be allowed to accept responsibility for the role. When the first user indicates his or her choice for the role (e.g., by clicking a checkbox or radio button), the projects module 302 may communicate this choice to the winning candidate (and/or losing candidates), as well as updates the projects database 312 (and or the team member viewer 1130) to indicate that the winning candidate has become a project team member in the indicated role.

Alternatively, the projects module 302 (or the projects management sub-module 920) could use an automated selection process that compares the prospective candidates based on certain criteria and decides which of these candidates would be the best choice for the role. Criteria that could be used for such a selection process may include (among others):

how well each candidate's set of qualifications match up to the set of qualifications determined for the role;

what the current (and expected future) workload for each candidate is (or is expected to be), based on their involvement with projects in the projects database 312; and/or how satisfied (or dissatisfied) other users have been with the work of each candidate, as indicated by the tagging sub-module 650.

It will be appreciated that the above list of criteria is non-exhaustive as other possibilities exist and would fall within the scope of the present invention.

One possible result of the automated selection process described above may be the identification of a prospective candidate that the projects module 302 (or the sub-module 920) finds is the 'best fit' for the available role. In certain cases, this determination may allow the module 302 to decide on the winning candidate for the role and update the projects database 312 (and team member viewer 1130) accordingly without any further human involvement.

Another possible result of the automated selection process described above may be the development of a so-called 'short-list' of possible winning candidates for review by the first user. For example, the projects module 302 may identify the three (3) best candidates using the selection process and then provide the first user with the ability to choose the winning candidate from among these three. Allowing the automated selection process to review the set of prospective candidates who indicated their interest in the role may improve the efficiency and productivity of the first user in cases where the set of prospective candidates may be large. For example, if an open invitation results in 62 candidates indicating their interest in the role, it may be more efficient for the first user to allow the projects module to identify the three or five best candidates. Otherwise, the first user would have to review all 62 candidate user profiles, which may be an inefficient use of his or her time.

Yet another possible result of the automated selection process described above may involve a run-off process, whereby each prospective candidate who indicated their interest in the role may be invited to demonstrate their level of interest and/or qualifications. For example, the projects module 302 could ask each candidate to indicate their expected level of compensation for his or her involvement in the project. Alternatively, the module 302 could provide each candidate with a sample problem that the candidate must solve. The result of this run-off process may be either the selection of the winning candidate or the development of a short-list of potential winning candidates to be provided to the first user.

Regardless of the type of invitation issued (and/or the way that the prospective candidate was selected), the result of the selection process described above is that the projects module 302 may update the projects database 312 to indicate that the user accepted the project role and so has become a project team member. In a similar manner, the community management module 304 may update the user's profile 340$_i$ within the user profile database 314 to indicate that the user accepted responsibility for the invited role and has become a member of that particular project. This may cause the team member viewer 1130 to be updated to indicate that the role was accepted and list the user's name associated with the role.

On the other hand, if the user(s) of interest decline the invitation to accept responsibility for the role offered in a targeted invitation, another user may be invited by the system 10 to accept responsibility for the role. In particular, when the projects module 302 and/or community management module 304 receive a user's refusal to take responsibility for the project role, one or both of these modules may alert the first user (who had initially selected the invited user) of this development. As a result, a new iteration of the process outlined by FIG. 13B commences with the first user commencing a search to identify another user(s) of interest to accept responsibility for the project role.

The refusal of a role by a prospective candidate for an open invitation may also be noted by the projects module 302 and/or community management module 304. In this case, however, the modules 302 and/or 302 are more likely to deal with conditions of acceptance, and more specifically the situation whereby a plurality of users indicate interest in a role. Should all prospective candidates for an open invitation refuse to accept responsibility for a role, the projects module 302 and/or community management module 304 may indicate this result to the first user. This action may result in a new iteration of the process outlined by FIG. 13B with the first user possibly responding in a variety of ways, including:

issuing a targeted invitation to one or more users; and/or refining the set of qualifications in the open invitation to make it more inclusive (i.e., include more prospective candidates).

It will also be appreciated that the issuance of an invitation to fulfill a role regardless of whether the invitation was targeted or open (and the subsequent receipt of a reply to this invitation) comprises a task event related to the project, not just a message sent between users. In particular, when an invitation is issued by the first user, a related task event is created for him or her that must be completed. More specifically, a task relating to the invitation is created within the event group 730 of the project and remains uncompleted until someone (i.e., the first user or a user of interest) accepts responsibility for the role. Once the invitation is accepted by a user (regardless of how many iterations of the process outlined in FIG. 13B are required to do so), the task is considered completed.

Because the invitation is perceived by the system 10 (and more particularly the projects module 302) as a task event rather than simply as a message, identifying which roles are currently unfilled is considerably simplified, since an unfilled role is seen by the system 10 as the equivalent of an uncompleted task event. This approach helps reduce the possibility that unfilled project roles will remain unfilled due to oversight (e.g., the first user forgets to check that all of the roles are filled) or communication problems between the first user and the user(s) of interest (e.g., email issues prevent the invitation from being received).

It will be appreciated that the above messages relating to the invitation of a member of the user community 14 to assume responsibility for a role, as well as the member's subsequent response indicating his or her acceptance or refusal, are examples of task-related communications. As used here, the term "task-related communications" refers to communications (which may comprise both synchronous and asynchronous forms of communications such as internal messages and/or email) that are associated with a particular activity.

In a non-limiting embodiment, each event comprised in a project in the projects database 312 may have one or more instances of such task-related communication associated with it. For example, a targeted invitation to accept responsibility for a particular role on a project is an event that may be associated with the following task-related communications:

an invitation message advising a user of interest that he or she has been invited to accept responsibility a certain role on a project;

a reply email from the user of interest to the first user requesting certain information related to the project and role;

an SMS text message from the first user back to the user of interest asking him or her to call the first user and suggesting a time for the call;

a voicemail message from the user of interest to confirm the time of the call;

an audio recording of the VOIP conversation between the first user and the user of interest;

an email from the first user confirming the contract terms and compensation for the work of the user of interest on the project; and a reply to the invitation message indicating that the user of interest would accept responsibility for the role.

It will be appreciated that since all task-related communications are typically associated with an event, a user of the system 10 can organize his or her communications according to its associated event. By providing an explicit link between a work activity and the communications associated with that activity, the user may review his or her work related to an event by looking at its related communications. Such an ability to view a work activity as a communications thread between the user and other members of the project team (among others) may realize certain cost- and/or productivity efficiencies.

The result of FIGS. 13A, 13B and 13C is the preparation of a project within the system 10 and the assembly of its associated team from the user community 14. It will be appreciated that growth of the user community 14 may occur from users joining the system 10 by being invited to assume responsibility for roles by existing users within the community 14. It will also be appreciated that once a user is participating in the user community 14 through a role in a certain project, it is becomes more likely that the user will find other like-minded users in the community 14 who will invite him or her to participate in other projects. As a result, the benefits to each user of participating in the user community 14 are advantageously reinforced, as is the interest in inviting other prospective users to join.

Once a user has joined the user community 14 (i.e., they have a user profile in the user profile database 314) he or she can access the system 10 in order to work one or more projects in his or her accepted role. Since there typically is a plurality of projects stored in the projects database 312, each of which having a generally different project team, there is a need to authenticate users of the system 10 in order that each user may see his or her projects (and its associated events and tasks).

Figure 14A:
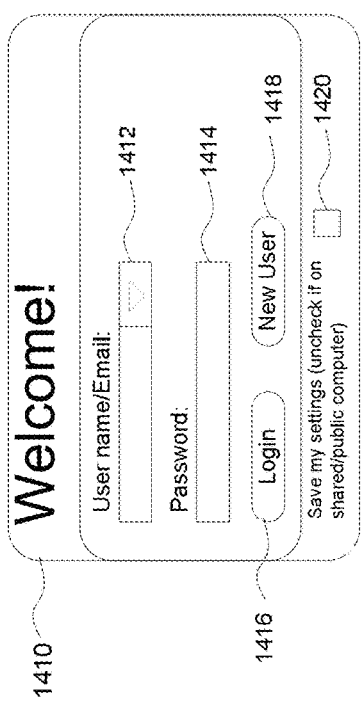
FIG. 14A is a non-limiting example of a user interface that could be used to authenticate users of the system.

FIG. 14A shows a non-limiting example of an authentication UI 1410 that may be used to authenticate users of the system 10. The authentication UI 1410 is comprised of a user name/email address field 1412, a password field 1414, a login control 1416, a new user indicator 1418, and an option to store user settings 1420.

The user name/email address field 1412 and password field 1414 are intended for an existing user to enter his or her authentication details, such as his or her email address (or user name, if different) and password, respectively. The login control 1416 (which can be represented by a clickable button) allows the entered authentication details for a user to be verified by the system 10, and more specifically to be compared by the community management module 304 against such details stored in the user's profile 340. Since such authentication are believed to be well known in the art, further details regarding this process need not be provided here.

The new user indicator 1418 (which may also be represented by a clickable button or checkbox, among other possibilities), allows the user to indicate to the system 10 that he or she is a new user without a user profile. Providing such an indication from the authentication UI 1410 allows the system 10 to immediately follow the process outlined previously in FIG. 12 to create a user profile in the user profile database 314 for the new user.

The option to store user settings 1420 is provided to retain certain entered authentication details within the authentication UI 1410 (such as the content of the user name/email address field 1412 and/or the password field 1414) for future access attempts. For example, enabling this option (e.g., by clicking the checkbox) allows the user to store his or her user name or email address within the field 1412, so that in future login attempts, this information will appear automatically within the authentication UI 1410. Such details may be stored locally with the client 16 (e.g., within a so-called 'cookie' on the user's system) or on the central node 18. Since it is believed that the storage of such authentication details as user names and/or passwords is known in the art, further details regarding this need not be provided here.

Once authentication details entered in the authentication UI 1410 are authenticated by the system against his or her user profile within the user profile database 314, the user may be provided access to a user interface 1430 that provides access to his or her projects and related tasks, gives details about the team assembled for each project, allows the user to contact other users that may be working on the same project(s), as well as provides access to the user community 14 beyond the members of the one or more project team(s).

In particular, the UI 1430 is comprised of a set of UI elements, including:

a projects UI 1440 that lists a user's projects and provides certain details about such projects;

a time UI 1450 that lists tasks related to one or more projects displayed in the projects UI 1440;

a team UI 1460 that lists members of the project team that has been assembled for the one or more projects on which the user is working;

a media/messaging UI 1470 that lists messages sent or received by the user from other users in the community 14 and/or from the system 10 itself; and a community UI 1480 that provides the user with access to the user community 14 as a whole.

Further details about each of these UI elements will be provided below. It will be appreciated that the UI elements displayed above constitute a non-exhaustive list as other elements may exist and would fall within the scope of the present invention.

In addition, the UI 1430 includes a set of navigation controls 1490 that allow the user to navigate between the various UI elements 1440 to 1480. In particular, the navigation controls 1490 (which may be represented as clickable buttons with associated keyboard shortcuts) may allow a user to navigate more quickly and efficiently throughout the various UI elements in the UI 1430.

It will be appreciated that the display device used to display the UI 1430 may be incapable of showing the UI 1430 in its entirety in certain cases. For example, a user viewing the UI 1430 on the smaller screen of a cellular phone may only be able to see a portion of this UI at any time. To assist the user in navigating the UI 1430, the navigation controls 1490 may be rendered in such a way that the user's current location within this UI is indicated.

One example of such an indication may be visual indicators, and in particular, the use of particular shades or colorings to indicate the currently visible portion of the UI 1430. For example, the controls 1490 may show the currently visible portion of the UI 1430 in a darker shade of a particular color, while the non-visible portions of the UI 1430 would be represented by a lighter shade. The use of such visual indicators may allow the user to better identify how much of the UI 1430 they are seeing.

Those skilled in the art will appreciate that alternative types of indicators may be used in a similar fashion. For example, audible indicators could be used to generate a particular sound whenever the user displays a UI element 1430 to 1480. Similarly, tactile indicators could generate a vibration at the boundaries of any of one of the UI elements 1430 to 1480 and/or for the boundaries of the UI 1430 itself. Use of these various types of indicators in combination could allow a user who is visually- or audibly-challenged to utilize the system 10.

The UI 1430 also comprises a set of controls 1495 that provide certain functionality to a user that are independent of the UI elements 1440 to 1480, which will be discussed in more detail below.

The UI 1430 further comprises a logout control 1497 that serves to logout the user when activated, thereby ending the session between the system 10 and the user. When this control is used, it is likely that the login screen 1410 may be re-displayed to the user.

It will be appreciated that the UI elements 1440 to 1480 within the UI 1430 are presented laterally (i.e., beside each other) within the same screen area. Therefore, the navigation controls 1490 can allow a user to switch between the elements in the UI 1430, by making one of the UI elements 1440 to 1480 the primary element on the screen, while making the remaining UI elements secondary. Arranging UI elements laterally in the UI 1430 reduces the need to display each of the elements 1440 to 1480 within a separate frame or window, which may be confusing and inefficient, for the user. Instead, the user may use the navigation controls 1490 to view and quickly navigate between all elements 1440 to 1480 within the single UI 1430.

In addition, interfaces related to or associated with the elements 1440 to 1480 (e.g., foldouts similar to the associated search interface 13C100 described previously) may also be presented in the UI 1430. Typically, associated interfaces are located in lateral proximity to the UI element from which they were called. For example, a foldout for the time UI 1450 that describes one or more events or tasks for a project may be displayed in the UI 1430 beside (i.e., to the left or right of) the UI element 1450.

Furthermore, it will be appreciated that the UI 1430 represents a display with a generally fixed amount of space. Although the navigation controls 1490 allow movement through this space, certain restrictions on the display of associated interfaces (such as foldouts similar to the associated search interface 13C100) may be applied to ensure that the UI 1430 does not become overly cluttered.

For example, the number of associated interfaces displayed at any one time for each of the UI elements 1440 to 1480 may be limited to a particular value, such as three (3) foldouts. For example, the time UI element 1450 could be limited to displaying three (3) foldouts that provide details for, or ancillary information about, a maximum of three events. Should a user attempt to open a fourth foldout, the display of one of the three original foldouts may become hidden and the user may be prompted that he or she is limited to viewing three (3) foldouts at a time for each UI element.

Alternatively, the total number of associated interfaces may be limited for all of the UI elements 1440 to 1480 in the UI 1430. For example, all elements 1440 to 1480 may be limited to a total of three (3) associated interfaces, regardless of which UI element generated the foldout. For example, if two (2) associated interfaces were generated from projects in the project UI element 1440 and the user attempts to generate another two (2) foldouts from events in the time UI element 1450, one of the following results may occur:

one of the project UI related foldouts may be hidden;
one of the time UI-related foldouts may not appear;
the user may be prompted that he or she is limited to viewing three (3) foldouts for the UI 1430 as a whole.

In the above examples, the numeric value defining the upper limit on the number of associated interfaces (or foldouts) for the UI 1430 and/or the UI elements 1440 to 1480 was set at three (3). However, this value is provided as an example only and the actual value defining this upper limit on foldouts may, in fact, be set lower or higher than this value.

When a user displays a plurality of foldouts in the UI 1430, it is conceivable that he or she may be more interested in one particular foldout within this set. In this case, the user may be provided with a particular control, such as but not limited to a button, icon (e.g., a 'pin') or key-combination, that establishes a hierarchy within the set of foldouts for each UI element. More specifically, when the user activates the hierarchy-related control within the UI of a particular foldout, the selected foldout is elevated in the hierarchy and is moved closer to its relative UI element to indicate its new position.

For example, consider the case where a user has opened three foldouts for the UI element 1440 that appear as follows: a first foldout located closest to the element 1440, a third foldout located farthest away from the element 1440 and a second foldout, which is located between the first and third foldouts. Because the user considers the content in the second foldout as more useful or relevant to their work than that of the first and/or third foldouts, the user activates the hierarchy-related control for this foldout (e.g., clicks a 'pin' icon).

When the user activates this control, the relative visual positions of the first and second foldouts are switched (i.e., the first foldout becomes the second and vice-versa), while the position of the third foldout remains unchanged. This allows the user to more easily find, consult and utilize the content of the formerly second foldout for their task(s), while keeping the content in the other two foldouts available for consultation if necessary.

In addition, should the user open another (i.e., fourth) foldout from the UI element 1440 that exceeds the maximum number of foldouts, the system 10 may choose to close one of the foldouts that is lower in the foldout hierarchy. In this case, the system 10 may close the third foldout and make the newly-opened foldout the third foldout.

It will be appreciated that certain restrictions may be placed on the use of the foldout hierarchy control described above. For example, the user may only be allowed to elevate one (1) foldout per UI element in the hierarchy. If the user has already elevated a first foldout and then proceeds to elevate another, second foldout, the previously elevated foldout will be depreciated in the hierarchy and may be hidden or closed.

Figure 14B:
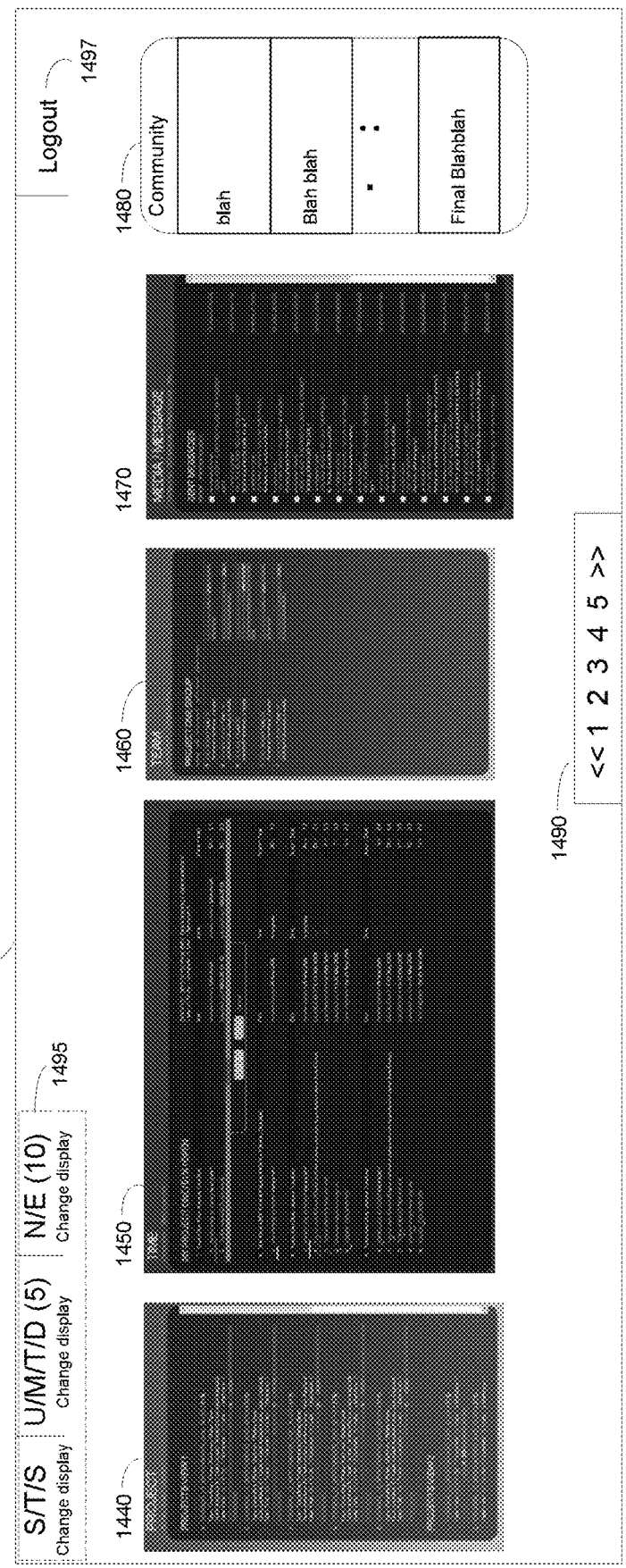
FIG. 14B is a non-limiting example of a user interface that would allow an authenticated user to access various functionality of the system.

FIG. 14B shows that the UI 1430 and its comprising UI elements 1440 to 1480 are generally displayed laterally. However, the UI 1430 (or aspects of this UI, such as one or more of the elements 1440 to 1480) could be presented in an alternative way, such as in a polygon or polyhedron. For example, the UI 1430 could be displayed as a three-dimensional five-sided polygon with each UI element 1440 to 1480 occupying one of its sides. In such a case, the navigation controls 1490 allow the user to control the rotation of the polygon to identify which of elements of the UI elements 1440 to 1480 is facing the user. Those skilled in the art will appreciated that the UI 1430 may appear in other representations and that those would fall within the scope of the present invention.

Furthermore, it will be appreciated that certain interfaces associated with the UI elements 1440 to 1480 (such as the foldout for the associated interface 13C100 described previously with regard to FIG. 13C) may be displayed in a similar fashion as these UI elements. For example, an interface associated with the team UI 1460 may appear as a UI element displayed laterally between the main UI 1460 and the media/messaging UI 1470. Alternatively, the team UI 1460 may appear as a three-dimensional polygon when associated interfaces are displayed for this UI.

Further details of the elements of the UI 1430 described above will now be provided. It will be appreciated that the display of each UI element in the set of elements 1440 to 1480 is typically handled by the UI sub-module 910. Furthermore, it is likely that these elements correspond to one or more of the elements previously introduced with regard to FIG. 10, and more importantly, the project management interface 1050.

Figure 15A:
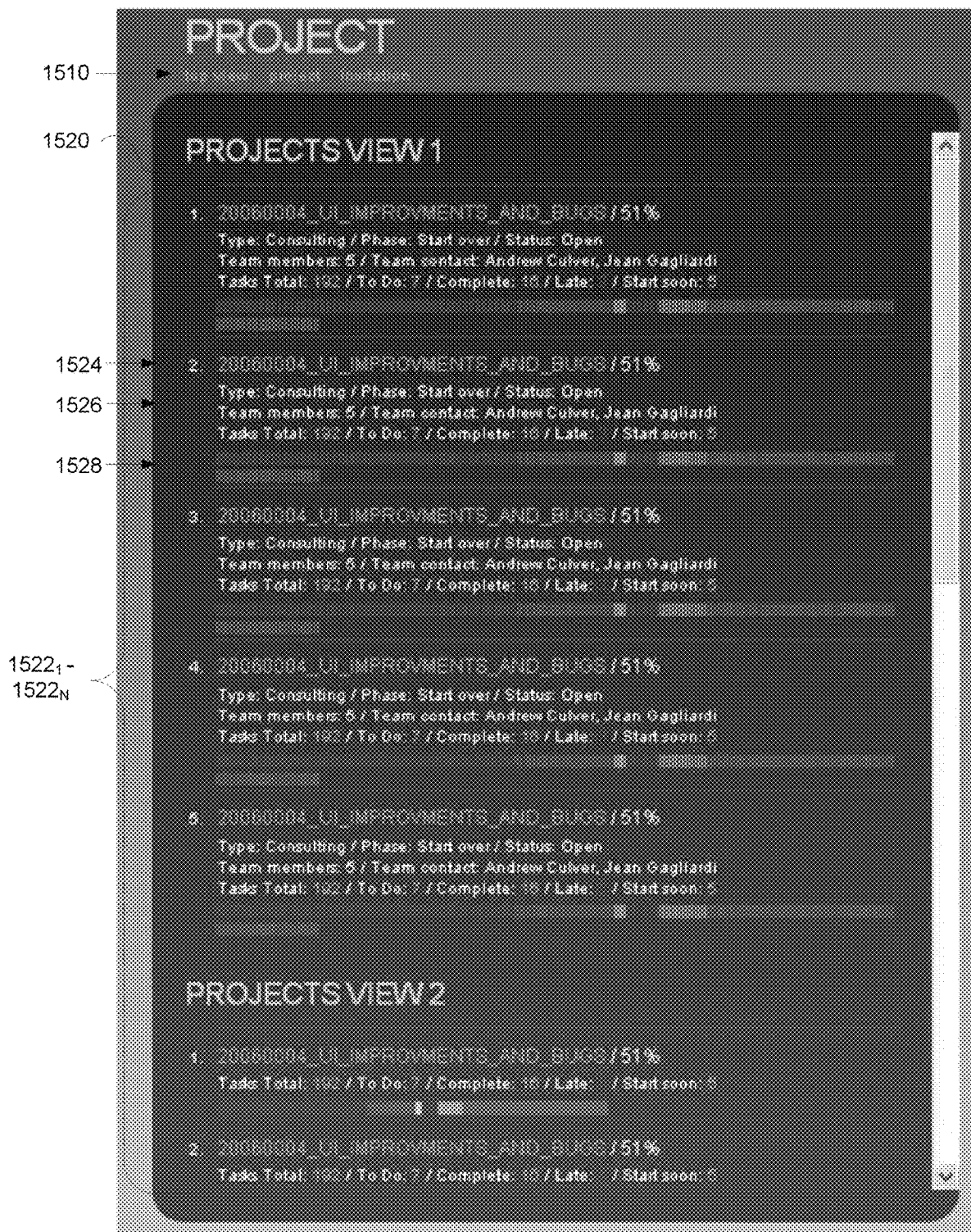
FIGS. 15A to 15H represent other non-limiting examples of user interfaces that may be available to the user.

FIG. 15A shows a non-limiting embodiment of the projects UI element 1440 comprised within the UI 1430. The projects UI 1440 is comprised of a menu 1510 and a so-called "time pod" 1520 that displays current projects for which the logged-in user has accepted one or more roles.

The time pod 1520 is comprised of a set of projects $1522_1$ to $1522_N$ in which the user is participating and/or has participated in the past. A project $1522_i$ within this set may be comprised of certain information, including:
  a project title 1524 that lists the title of the project;
  a summary information section 1526 that provides an overall summary of the project and the user's tasks or events within that project; and
  a graphical information section 1528 that provides similar information to the summary information section 1526 but in a graphical form, such as a chart or graph.

The menu 1510 in the projects UI 1440 provides a set of options (which may be represented as clickable buttons or hypertext links) that may adjust the display in the projects area 1520. More information about this menu will be provided below.

The elements of each project $1522_i$ may also be clickable elements (e.g., clickable buttons or hyperlinks) that cause certain information to be displayed in the UI 1430. For example, clicking the project title 1524 of a particular project may cause its details to appear in an associated interface in a 'foldout' interface that is substantially similar to the associated search interface 13C100 described earlier. This foldout interface may display certain overall information about the project, such as the date it was created, what role(s) the user is assigned in this project, the number of overall tasks in the project (which may also be broken into design/construction/maintenance phases), and overall percentage completion of the project.

The associated foldout interface may also provide the user with options that allow him or her to adjust the amount of information displayed in the summary information section 1526 and/or graphical information section 1528, including:
  the ability to define the tasks displayed in the summary section 1526 (e.g., only show events that are either currently due or are late); and/or
  the ability to adjust the type of graph displayed in the graphical information section 1528, such as changing the bar graph to a pie chart, and/or the ability to change the color scheme used for events, among others.

The summary information section 1526 and/or the graphical information section 1528 may also comprise one or more clickable element(s), such as a hyperlink. In one embodiment, clicking a portion of the sections 1526 or 1528 could display a list associated events within the time UI element 1450, which will be described later. For example, clicking the element in the summary information section 1526 marked "Late" may display late events within the time UI element 1450.

Alternatively, clicking an element in the summary information section 1526 or graphical information section 1528 may display an associated interface (i.e., a 'foldout' interface substantially similar to the interface 13C100 described earlier with regard to FIG. 13C) that lists the events associated with the element clicked. For example, clicking the element in the summary information section 1526 marked "Late" may display late events in the associated foldout interface that appears proximate to the projects UI element 1440.

Typically, the projects listed in the project UI element 1440 for a particular user may be individual projects that are unrelated to each other. Alternatively, one or more of the projects listed in this UI element may belong to a 'portfolio' that defines a relationship between them. As used here, the term portfolio may refer to at least two projects in the projects database 312 that are related by certain criteria, including:
  a shared location, such as a set of buildings on an university campus or those comprising a company campus (e.g., the GooglePlex in Mountain View, California);
  a shared design (e.g., a set of bank branches or coffee shop franchise locations) that, other than their location, are designed in a substantially similar manner to each other and may also be constructed and/or maintained in exactly the same way using the same set of components.

Projects are typically designated as belonging to a portfolio when they are created via the project type selection interface 1010. For example, the interface 1010 could provide a control (e.g., a drop-down list) that allows a new project to be associated with another, existing project and thus become a member of a portfolio. Alternatively, if a new project is created by copying or 'cloning' another current or past project, the new project may be considered to be a member of a portfolio since it is substantially similar to the earlier project.

The project type selection interface 1010 (and/or the projects UI interface 1440) may also provide certain management functionality for a portfolio. For example, a portfolio may be named (e.g., "Shanghai University campus") and/or certain identifying features (e.g., certain icons, colors or fonts) for its member projects could be displayed in the time pod 1520 of the projects UI element 1440.

Besides the above, the projects UI 1440 may provide some functionality to group one or more projects belongs to the same portfolio so that this relationship is more evident.

Although the functionality of the menu 1510 will be explained later, the menu 1510 may allow the time pod 1520 to be appear in a tree/branch format that may include expandable branches for projects and portfolios.

In this way, a user could view a list of his or her projects by expanding the Projects branch and view a list of his or her portfolios by expanding the Portfolios branch. In addition, the list of portfolios included in the Portfolios branch may be shown as their own expandable sub-branches whereby clicking one of these sub-branches can display the projects grouped under the portfolio. As a result, a user can be provided with a way to drill-down and see which projects are included in a particular portfolio.

Figure 15B:
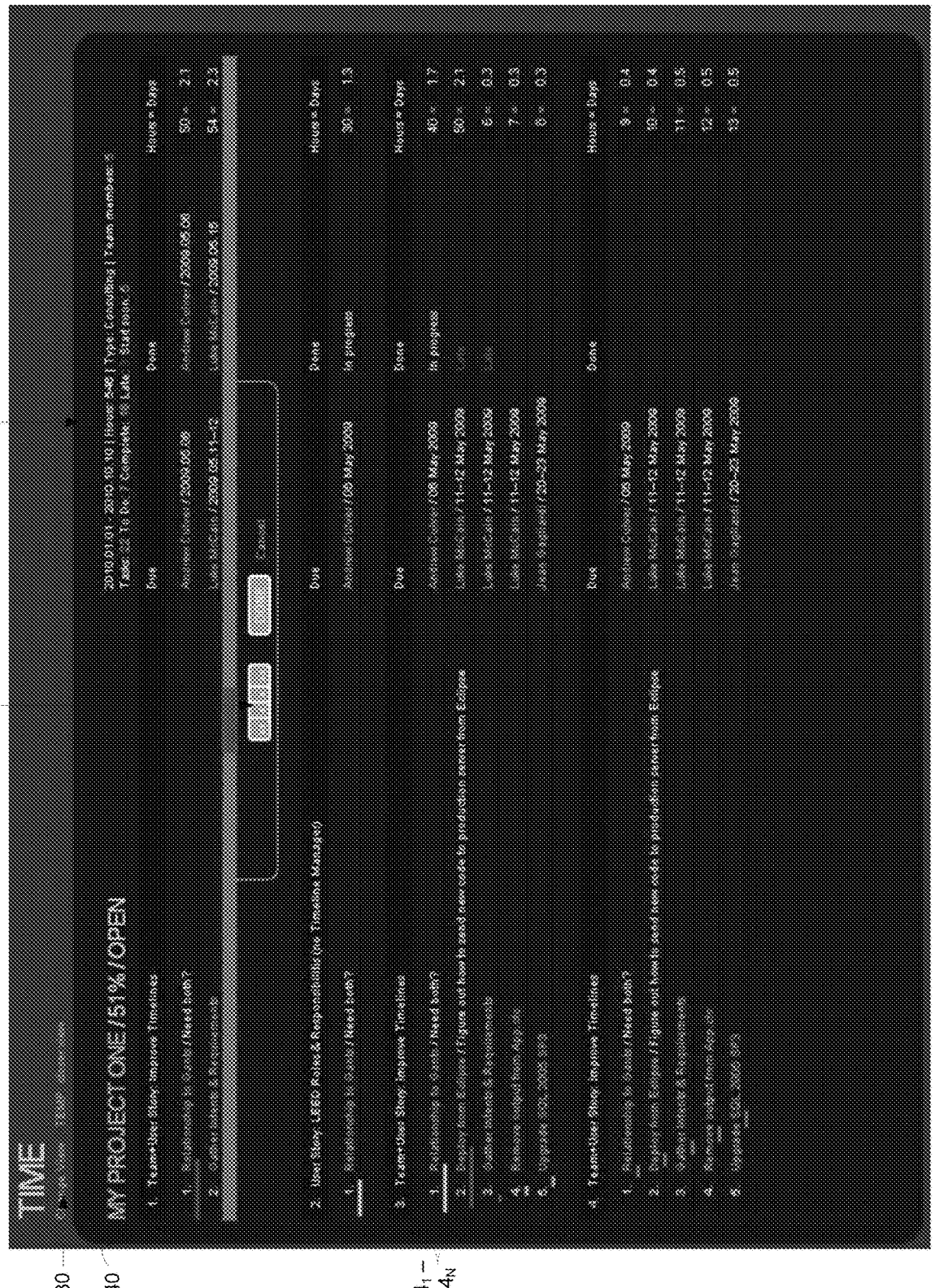

FIG. 15B shows a non-limiting embodiment of the time UI element 1450 comprised within the UI 1430. The time UI 1450 is comprised of a menu 1530 and an events area 1540. The events area 1540 is further comprised of a summary information section 1542 and a set of events $1544_1$ to $1544_N$ that correspond to the tasks and events for which the user is responsible.

By default, the events area 1540 displays all of the tasks $1544_1$ to $1544_N$ for which a user is responsible. In the case where a user has assumed responsibility for a plurality of roles in multiple projects, it will be appreciated that this list may comprise hundreds of events, each of which may represent a task requiring a user's attention at some point. Thus, certain controls must be provided in the time UI 1450 to allow the user the ability to filter and organize the events $1544_1$ to $1544_N$ to prevent him or her from being overwhelmed.

The summary information section 1542 can be used to organize the events $1544_1$ to $1544_N$ in the events area 1540. In particular, this section comprises a list of general event types (such as events that are upcoming and/or late), where each event type is associated with a figure showing the number of events associated with that type. For example, in the illustrated UI, the user has completed 16 events, has three (3) events that are late, and has five (5) events that are due to start soon.

Like the summary information section 1526 described previously, elements in the summary information section 1542 may also be clickable elements e.g., clickable buttons or hyperlinks) that allow the user to display the events associated with a particular event type. For example, the user may click the "Late" event type in the section 1542 to display events that are identified as being late. By using these elements the user may be provided with a degree of control over the display of the events $1544_1$ to $1544_N$ in the events area 1540.

Although the summary information sections 1526 and 1542 display substantially the same information, it is worth noting that the former section 1526 lists events of a certain type for which a user is responsible for a single project. In contrast, the latter section 1542 may display all events of a certain type for all projects in which the user is participating, for a subset of projects in which the user is participating and/or for a single project in which the user is a participant.

The menu 1530 may be similar to the menu 1510 in the projects UI and will be described in more detail below.

Once the user has displayed a certain subset of events from the events $1544_1$ to $1544_N$, certain information about such events may be displayed in the events area 1540. For example, for each event displayed, the events area 1540 may display (among others):
  a brief description of the event;
  the event type (e.g., milestone, document or task);
  the phase to which an event belongs (e.g., the building phase events 820);
  the person(s) responsible for the event's execution, if more than one user is responsible for the event;
  the date and time when the event is due to occur or be performed;
  the status of the event; and/or
  the estimated (or actual) duration of the event, which may be expressed in a certain time period, such as minutes, hours, days, weeks or months.

Depending on the type of event, the status of an event in the events $1544_1$ to $1544_N$ may correspond to one of the following states, including:
  Acknowledged (or Not Acknowledged), such as for an event that includes a message (e.g., an invitation to participate in a project);
  Yes/No, such as for an event that requests the user's opinion on a certain topic (e.g., "Should the building's façade be colored green or aquamarine?");
  Accepted/Declined, such as for an event requesting the user's participation (e.g., a meeting request); or
  Task Started or Done, which is a particular status used for task events and is described in more detail below.

It will be appreciated that the above list is non-exhaustive in nature as other types of statuses may exist and fall within the scope of the present invention.

The Task Started status is reserved for a task which the user is responsible and on which he or she is currently working. The status may be assigned by the user himself or herself (e.g., through a clickable button) or by the system 10 itself through monitoring the activity of the user. For example, assume that a particular event represents a documentation task to develop a PowerPoint™ presentation explaining how the building to be constructed will qualify for a particular environmental certification, such as LEED.

The user creates an initial version of the presentation and associates it with the task, such as by uploading a file entitled "LEED_Presentation_V1_Draft" to the system 10. Through this association, the system 10 may come to realize that the user is currently working on this documentation task, and therefore assign it the "Task Started" status accordingly.

In certain cases, the user may decide that a current or an upcoming event in the events $1544_1$ to $1544_N$ needs to be adjusted in some respect. For example, assume that a certain event represents a timeline during which the user is expected to travel to London, England to oversee initial construction on a new building. However, unforeseen events (such as a family emergency or natural disaster) cause the user to miss his or her flight. In such a case, the user may be able to adjust the expected start date of the task based on when he or she is able to rebook a flight to London.

In particular, a user may be provided with a set of adjustment controls 1546 related to a particular event in the events $1544_1$ to $1544_N$. Such controls may be displayed when the user performs a certain action (e.g., clicking the title of the task) or may be displayed using a keyboard shortcut or the like.

In one embodiment, the adjustment controls 1546 may provide the user with the ability to adjust when an event occurs. For example, the controls 1546 that are illustrated for the task titled "Gather Intents and Requirements" in FIG. 15B may allow the user to move (or 'jog') the event backwards or forwards in time. Returning to the previous example, if the timeline event representing the user's travel to London is due to be start in the near future, use of the adjustment controls 1546 may allow the task to be postponed accordingly to when he or she can rebook a flight.

Alternatively, if an event is scheduled to have begun (or already be completed) and is running late, a user can use the adjustment controls 1546 to jog the event to a time when the event can be performed. For example, assume that a set of tasks are identified as late due to a dependency on another person who has been off sick for a week. To adjust the time when these tasks will be performed, the adjustment controls 1546 can be used by the user to postpone the start times of these events by a week to account for the other person's absence.

The adjustment controls 1546 may also be used to change the status of a task. For example, the controls 1546 may be provided with a button or other graphical element representing different statuses to which the task may belong. For example, the controls 1546 may provide a "Task Started" button so that a user can indicate to other project team members (as well as to the system 10 in general) that he or she has started the task. Once the user has finished the task, he or she may then use the "Done" button in the adjustment controls 1546 to update the task's status to indicate it is complete (i.e., assign the "Task Done" status to the event).

Figure 15C:
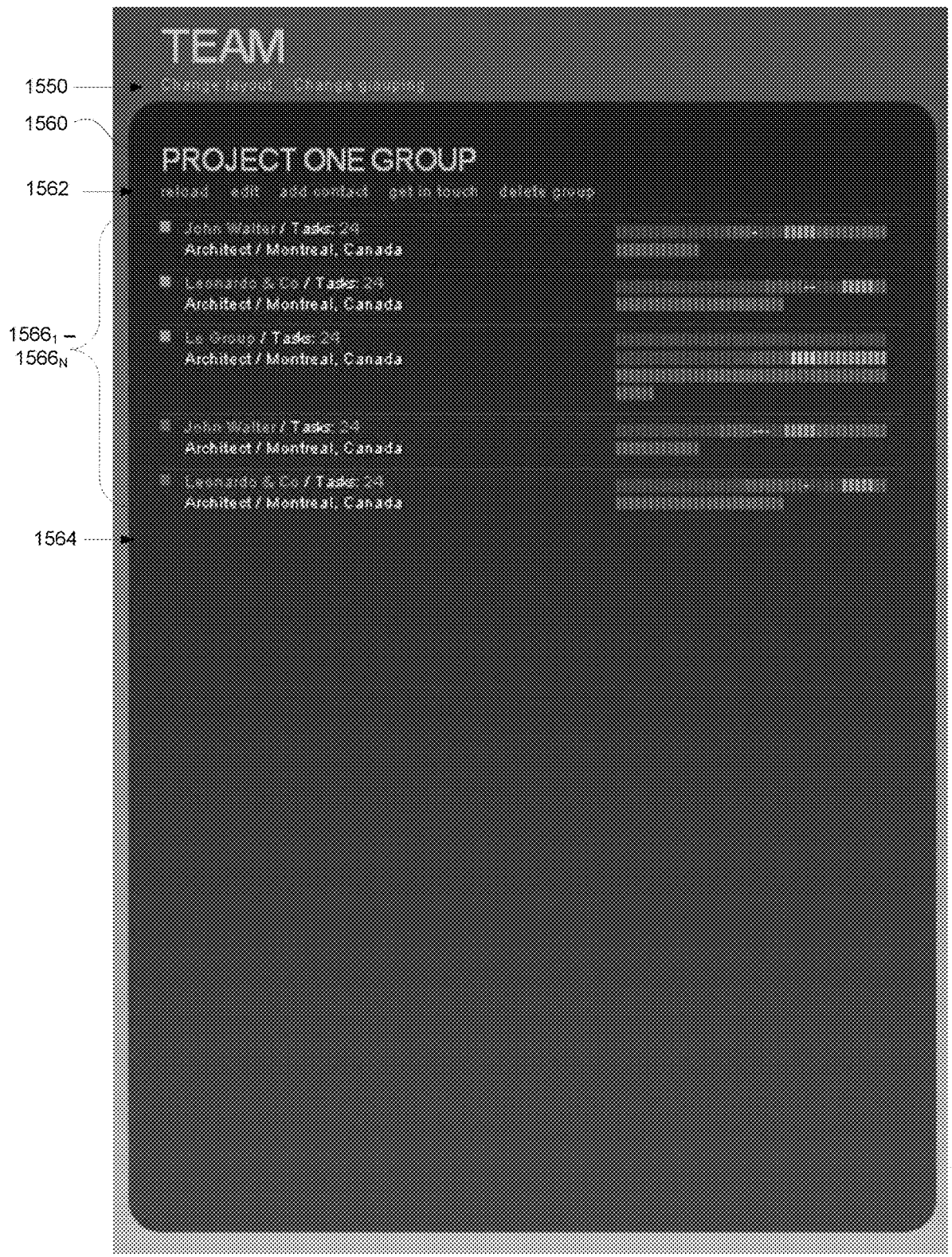

FIG. 15C shows a non-limiting embodiment of the (project) team UI element 1460 comprised within the UI 1430. The team UI 1460 is comprised of a menu 1550 and a team area 1560 that includes a sub-menu 1562 and a team member summary area 1564 that lists a set of users $1566_1$ to $1566_N$ that comprise the members of one or more project teams in which the user is also participating.

By default, the team UI 1460 displays all users for all project teams in which the current user is also a participant. As a result, the set of users $1566_1$ to $1566_N$ that are displayed in the team member summary area 1564 may be considerable, especially if the current user is a member of a plurality of projects. Therefore, certain controls may need to be provided in the UI 1460 in order to allow the current user to organize the summary area 1564 so that a subset of the users $1566_1$ to $1566_N$ is displayed in which the user is interested.

The menu 1550 is substantially similar to the menus 1510 and 1530 introduced earlier and will be described in more detail below.

It may be appreciated that information related to each user in the set of users $1566_1$ to $1566_N$ displayed in the team member summary area 1564 of the team area 1560. In particular, information regarding each displayed user may include, among others:
- an indication of whether a user is logged into the system 10, such as through a colored icon;
- an indication of each user's current role and/or their current location (e.g., "architect/Montreal, Canada");
- an indication of the estimated workload of a user, which may be provided either textually (e.g., "Tasks: 24") or in a graphical nature, such as a chart showing different colors for completed, upcoming and late tasks.

The sub-menu 1562 may provide certain context-sensitive functionality to a user that is related to the subset of the users $1566_1$ to $1566_N$ displayed in the team member summary area 1564. For example, the sub-menu 1562 may provide a clickable control (e.g., a button or hyperlink) that may allow the current user to reload the contents of the summary area 1564.

The sub-menu 1562 may also allow the current user to contact one or more of the displayed users in the summary area 1564, such as via an internal message, email, SMS text message or VoIP phone call. Moreover, the indication of whether a user is logged on in the team member summary area 1564 may also provide an indication to the current user of the likely success of a particular mode of communication.

For example, a user may choose to send an email or text message to a user in the summary area 1564 who is listed as being offline (i.e., not logged in) rather than attempt to send a message or place a VoIP phone call.

The sub-menu 1562 may also provide the current user with the ability to search for users not listed in the users $1566_1$ to $1566_N$, which includes users in the user community 14 who are not currently part of any project team on which the current user is a participant. For example, a user may use this functionality to identify prospective candidates for a project role that was filled but has become available due to turnover. In this case, the sub-menu 1562 could display the associated search interface 13C100 that was described in relation to FIG. 13C previously.

It will be appreciated that the list of users $1566_1$ to $1566_N$ in the team member summary area 1564 may itself be comprised of clickable elements that display certain information about the user. For example, clicking the name of a user in the summary 1564 may display certain information about the user from his or her user profile $340_i$ in the user profile database 314. Such information may include his or her contact details (if publicly available), details about the user's skills and experience, a portfolio of the user's past projects (which may be generated by the portfolio interface 1060) and/or a photograph of the user. This information may be displayed in an associated interface (or 'foldout') that is substantially similar to the associated search interface 13C100 described previously with regard to FIG. 13C.

Figure 15D:

FIG. 15D shows a non-limiting embodiment of the media/messaging UI element 1470 comprised within the UI 1430. The media/messaging UI 1470 is comprised of a menu 1570 and a message area 1580. The message area 1580 is further comprised by a sub-menu 1582 and a set of messages $1584_1$ to $1584_N$.

The set of messages $1584_1$ to $1584_N$ in the message area 1580 shows all messages sent to or received by the current user from users within the system 10 (i.e., those users within the user community 14), as well as possibly by users outside of the system 10.

It may be appreciated one or more messages within the set of messages $1584_1$ to $1584_N$ may include messages sent or received in a variety of media, including:
- text messages, such as internal messages (which may be similar to messages sent via "instant messaging"), email messages or SMS text messages sent between two or more users;
- audio messages, such as voicemail messages, telephone calls or conference calls conducted over a VoIP system (e.g., Skype) between two or more users, or audio recordings saved as digital audio clips (e.g., in MPEG-layer 3 recordings); and/or
- video messages, such as video conference calls between two or more users or recordings of avatar conversations that took place within a virtual world (e.g., a seminar conducted within the world of Second Life).

It will be appreciated that the set of messages $1584_1$ to $1584_N$ displayed in the messaging area 1580 may be substantial, especially if a user is involved in a plurality of projects where communication and collaboration are implemented via the system 10. Therefore, it is important that the media/messaging UI 1470 provide a user with the ability to organize and manage their messages in a variety of ways.

The menu 1570 may be substantially similar to the menus 1510, 1530 and 1550 introduced earlier and will be described in more detail below.media/messaging UI 1470

The sub-menu 1582 within the messaging area 1580 typically provides context-sensitive functionality related to the messages displayed in the area 1580. For example, the user may use the sub-menu 1582 to group projects according to certain criteria, including (among others):

- the type of message (e.g., voicemails, emails, text messages or video conference recordings);
- the user or named group from which the message was sent (or received);
- the date when the message was sent or received; and/or
- the status of any task related to the message (e.g., task started or task completed).

In another alternative embodiment, the sub-menu 1582 may also allow the current user to view certain statistics relating to their messages, such as the percentage of received (or sent) messages relating to any particular project, team, named group or particular user. Such statistics may allow the current user to identify particular projects, project teams (or individual users) that require substantially more communications to ensure collaboration occurs.

The sub-menu 1582 may also allow the current user to organize and search through the message subset to identify messages of importance or relevance. For example, the sub-menu 1582 may allow the user to switch between sent messages and received messages (or vice-versa) so that the user can view prior communication between himself or herself and others regarding a particular project. Alternatively, the sub-menu 1582 may allow the generation of so-called 'threaded' email discussions that display all messages in chronological order that are considered related to a subject.

The sub-menu 1582 may also allow the user to search through the subset of messages in the messaging area 1580. For example, the sub-menu 1582 may provide a 'search messages' option that displays a foldout substantially similar to the associated search interface 13C100 described previously with regard to FIG. 13C to allow the user to search his or her message subset. Using this functionality, the user could search the displayed messages that contain certain text strings and/or were sent within a particular timeframe.

Each message within the set of messages $1584_1$ to $1584_N$ includes a sender, a receiver, a subject line, a sent date/time stamp, a received date/time stamp, message content and possibly an attachment (e.g., a file or audio message). Certain of this information (or a summary thereof, in the case of message content) can be displayed in the messaging area 1580 to allow the user to quickly review the list of messages and identify those of interest, importance and/or relevance.

In another non-limiting embodiment, the sub-menu 1582 may also allow the user to customize the information that is displayed in the message area 1580. For example, a user could use the sub-menu 1582 to show or hide certain information, such as the date/time stamps that indicate when a message was sent and/or received.

Regardless of what information is chosen by a user to appear for each message in the message area 1580, clicking on that information may cause related information to appear in an associated interface. For example, clicking on the subject title for a message may cause the message contents to appear in an associated interface for easier reading. Alternatively, clicking on the attachment for a message may cause the attachment to be opened in its associated application (e.g., an MP3 file is opened in an audio player)

In another non-limiting embodiment, clicking on the sender's (or receiver's) name listed for a particular message may cause an associated interface to appear that shows certain information from his or her user profile. FIG. 15D shows a non-limiting sample of a foldout that displays information extracted from the user profile of Jean Gagliardi in an associated interface.

By displaying such information in associated interfaces/foldouts, the messages displayed within the messaging area 1580 remain available for review, rather than being covered by other windows or frames containing related content. This may simplify navigation between messages (as well as associated message content, information about the sender/receiver and possibly message attachments) for the user.

Figure 15E:
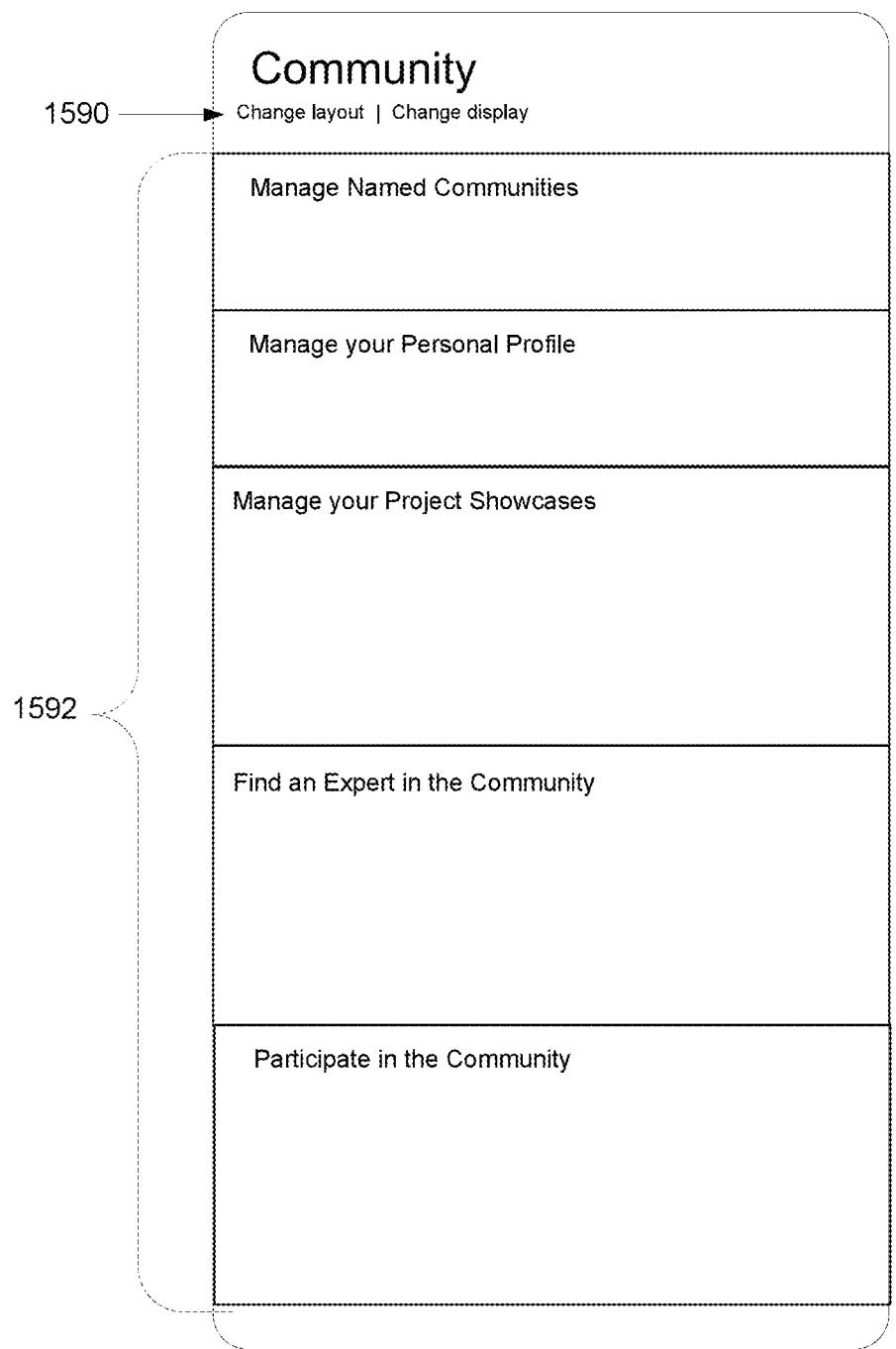

FIG. 15E shows a non-limiting embodiment of the community UI element 1480 comprised within the UI 1430. The community UI 1480 is comprised of a menu 1590 and a community activities area 1592.

The menu 1590 is substantially similar to the menus 1510, 1530, 1550 and 1570 introduced previously and will be collectively described below.

The community activities area 1592 provides the user with access to a set of community activities $1594_1$ to $1594_N$ that may or may not be related to one of the projects that he or she is currently working on. Activities that could be included in the set of community activities $1594_1$ to $1594_N$ may include, among others:

- managing his or her activity in one or more named groups;
- managing the information in his or her user profile $340_1$;
- managing the information provided to the user community 14 regarding one or more projects in which the user is currently participating;
- finding a user in the user community 14 who possesses a certain expertise, skill or qualification; and/or
- providing some means whereby the user can share his or her knowledge with the community, such as through so-called 'Communities of Practice'.

Of course, it will be appreciated that the above list of community activities is non-exhaustive as other possibilities exist and would fall within the scope of the present invention.

Of the set of community activities $1594_1$ to $1594_N$, it will be appreciated that certain of these activities allow the user a degree of management regarding information provided to the user community 14 regarding themselves (via their user profile $340_i$) and/or the projects they are working on. For example, a user may wish to provide the user community 14 at large with a first communication method of communicating with him or her (e.g., his or her a publicly available email address), while project team members may be provided with a second set of communication methods for communicating with the user, such as work or cellular telephone numbers. By restricting the second set of communication methods to those who are working with the user directly on his or her projects, the user can maintain a degree of privacy from the user community 14.

In a similar manner, the user may wish to provide the user community 14 with certain first set of information regarding the projects that he or she is working on, while those working on the project may be provided with a second set of information that is more detailed than the first. For example, the first set of information provided by the user may include the project's name, type (i.e., whether it is a commercial, industrial or residential development) and his or her role in the project. However, the second set of information may include much more detailed (and likely confidential) information about the project, such as its exact location, the overall budget, the list of project team members (which may include suppliers) and the detailed timeline for the project. By restricting the second set of information to only those people who are working with the user on his or her projects, the user can ensure that sensitive and/or confidential information can be restricted from potential competitors.

The set of community activities $1594_1$ to $1594_N$ may also provide a user with the ability to find an expert in the community. In a non-limiting embodiment, this activity may provide many of the same search controls 13C110 discussed previously in the context of the targeted invitation. However, these controls would allow the user to identify other members in the user community 14 who possess certain expertise without necessarily inviting them to accept a role in a project.

One use for the search controls in the set of community activities $1594_1$ to $1594_N$ may be to find people who are interested in participating in sharing their knowledge about a particular domain of knowledge. Such members may form a 'community of practice' whereby knowledge and experience is pooled among its members to assist those with questions and problems regarding a particular domain. For example, assume that a community of practice emerges regarding a certain LEED credit regarding public-transportation. A landscape architect who is trying to achieve this credit for a new development can ask for advice and/or help from its participants when it comes to deciding how to connect a building or residential development to the public-transportation network.

In a non-limiting embodiment, the menus 1510, 1530, 1550, 1570 and 1590 comprised within the UI elements of the UI 1430 allow a user to adjust various informational aspects of their associated display area. For example, the menu 1510 may adjust information displayed in the projects area 1520, the menu 1530 may adjust information displayed in the events area 1540, and so on.

Each menu in the set of menus 1510, 1530, 1550, 1570 and 1590 comprise a set of controls (e.g., clickable buttons or hyperlinks) that allow certain aspects of the information presented in the associated area to be adjusted. Aspects that may be adjusted via these menus may include:
- the content (i.e., amount of information) in the associated area;
- the layout the information in the associated area;
- the amount of information displayed in the associated area; and/or
- certain groupings of information in the associated area.

It will be appreciated that the above list is non-exhaustive as other information aspects exist and would fall within the scope of the present invention.

In a first non-limiting example, the set of menus 1510, 1530, 1550, 1570 and 1590 may provide one or more controls to allow a user to filter the type of content within the associated area in its respective UI element. For example, the menu 1570 in the media/messaging UI element 1470 may provide a user with the ability to view messages corresponding to a certain event type, such as tasks versus document events. In this case, the type of content that subsequently appears in the associated area (i.e., the messages areas 1580) depends on the menu selection made by the user.

Because this type of functionality is typically used to view different type of content, each control in this regard may be termed a 'view'. For example, the menu 1530 in the time UI 1450 may provide controls to view a "Tasks view", a "Documents view", a "To-Do view", and a "Milestone view" (among others) that would display task events, document events, to-do events and milestone events respectively in the events area 1540. By providing the ability to switch between such views, the menu 1530 allows the user to quickly filter his or her events in the events area 1540 to correspond to a particular type of event. This may save time for the user who may otherwise be forced to review all of his or her events to identify a particular one.

In a second non-limiting example, the set of menus 1510, 1530, 1550, 1570 and 1590 may provide one or more controls that allow a user to control the layout of content within the associated area of its respective UI element. Such controls may allow the user to see the content in a different format and/or adjust the amount of content displayed.

For example, the menu 1510 in the projects UI 1440 could allow a user to view projects in the time pod 1520 in different layouts, including:
- as a list, where the project title 1524, summary information area 1526 and/or graphic information area 1528 for each project $1522_1$-$1522_N$ are organized generally vertically; and/or
- as a table, where the project title 1524, summary information area 1526 and/or graphic information area 1528 for each project $1522_1$-$1522_N$ are organized generally horizontally (i.e., in a row).

It will be appreciated that type of layouts provided by controls in the menus 1510, 1530, 1550, 1570 and/or 1590 are typically determined by the type of information in each menu's respective associated area. For example, although it makes sense that projects, tasks and messages in the UI elements 1440, 1450 and 1470 could be laid out as lists and/or tables, the same may not hold true for the team members and/or community activities in the UI elements 1460 and 1480 respectively. As a result, the layouts provided in the menus 1550 and 1590 may provide different layouts that those in the menus 1510, 1530 and 1570.

Regardless of the differences in specific layouts provided by the menus 1510, 1530, 1550, 1570 and 1590, it will be appreciated that allowing a user to switch layouts may allow a user to realize certain efficiencies that may enhance his or her productivity. For example, assume that a particular user is currently involved with 27 projects. Further assume that by default, the time pod 1520 in the projects UI 1440 can only show five (5) of these projects at a time in a list view but that it can show 12 projects in a table view. By allowing a user to switch the layout of the time pod 1520 from the list to the table layout, the user may be able to view a summary of 12 of his or her projects at a time, which may allow him or her to identify those projects that need attention more quickly.

In a third non-limiting example, the set of menus 1510, 1530, 1550, 1570 and 1590 may provide one or more controls that allow a user to adjust the amount of information displayed in the within the associated area of its respective UI element. This may allow a user to show more or less content for each entry in the associated area.

For example, the menu 1570 in the media/messaging UI 1470 may allow a user to show or hide certain information associated with each message (e.g., an email or text message), such as:
- the identification of the sender and/or receiver;
- the subject;
- the time and date stamps for when the message was sent and/or received;
- any header information (e.g., IP address of the sending email server); and/or
- a summary of the message, such as a 50-word précis.

Like the second non-limiting example above, adjusting the amount of content displayed in the associated area allows the menus 1510, 1530, 1550, 1570 and 1590 to be used to realize certain efficiencies. For example, a user may choose to hide the time/date stamps, header information and/or summary of the message to view more email messages within the messages area 1580. This may allow the user to scan the entirety of his or her emails to more quickly identify a certain email from the list.

In a fourth non-limiting example, the set of menus 1510, 1530, 1550, 1570 and 1590 may provide one or more controls that allow a user to group information displayed within the associated area of its respective UI element. This may allow a user to view relationships between content in the associated area based on certain criteria. For example, the relationships between certain projects that constitute a portfolio in the time pod 1520 may be identified through the menu 1510 that displays projects in this area in groups indicating that there is a relationship between them. A control in the menu 1510 may allow the user to view the projects within a (previously described) tree-branch format that would indicate at a glance which projects were, and were not, members of a portfolio, for instance.

Similar grouping strategies could be applied to the content in each associated area for the UI elements 1440 to 1480. For example, messages in the messages area 1580 may be grouped by their date/time stamp (default) as well as by their respective sender, receiver, subject or related project and/or event (e.g., task or document). Events in the events area 1540 could be grouped by their related project (default), as well as by their type (e.g., task, document or milestone), status (e.g., starting soon, in progress, completed) and/or related role (e.g., landscape architect, public-transportation evangelist or bike rack consultant).

The ability to group content using the menus 1510, 1530, 1550, 1570 and 1590 may allow a user to organize content according to a certain type, as well as help him or her identify certain relationships that may not have been evident before. In this way, the menus 1510, 1530, 1550, 1570 and 1590 may allow a user to improve their efficiency, as well as explore options suggested by newly discovered relationships between entities in the UI elements 1440 to 1480.

While the above description of the menus 1510, 1530, 1550, 1570 and 1590 described several informational aspects that could be adjusted using a menu's constituent controls in detail, it will be appreciated that not every menu in this set provides all of these abilities. In particular, the controls for each menu in the set of menus 1510, 1530, 1550, 1570 and 1590 may be customized for the type of information displayed in its associated UI element. As a result, the set of controls available from any two given menus in this set of menus (e.g., the menus 1510 and 1550) may differ from each other.

Respectfully returning to FIG. 14B, it may be seen that the UI 1430 also includes controls 1495 and 1497 that are independent of the UI elements 1440 to 1490 discussed above. These controls may be provided in the form of clickable elements (e.g., buttons or hypertext) that when clicked, provide certain functionality that will be described below In particular, these controls provide functionality by which a user can perform certain activities including:
  viewing a set of tags and their associated content;
  performing a search of the content of the system 10 and more specifically, of the projects database 312 and/or user profile database 314;
  saving and re-applying performed searches of the system 10;
  viewing new messages received by the user;
  ensuring that unfinished messages, tasks or events that were started by a user in the UI 1430 are either completed or discarded; and ending the user's session with system 10 and the UI 1430.

In particular, all of the activities except for the last activity may be handled by the control 1495, which are described below. The last activity (i.e., logging out of the system 10) may be handled by the control 1497, which is hereafter termed the 'logout control'. Since the purpose of this control is self-evident, further details about its use need not be provided here.

With reference to FIG. 14B, functionality provided by the control 1495 may be sub-divided according to the following categories:
  a search/history/tag control 1495A provided by a clickable interface element labeled S/T/S in this figure;
  an "unfinished messages, tasks and documents" control 1495B provided by a clickable interface element labeled UM/T/D in this figure; and
  a new events control 1495C provided by a clickable interface element labeled NE in this figure.

The functionality of each element in the control 1495 will be described in detail below.

The search/tag/history (S/T/S) control 1495A may allow a user to perform certain actions, including:
  view a set of tags associated with content in the system 10 relating to their projects;
  create and perform a search of the system 10 in order to find content of interest; and/or
  save, manage and re-submit searches to the system 10 in order to find new content that may be of interest since the last time the search was submitted.

Figure 15F:
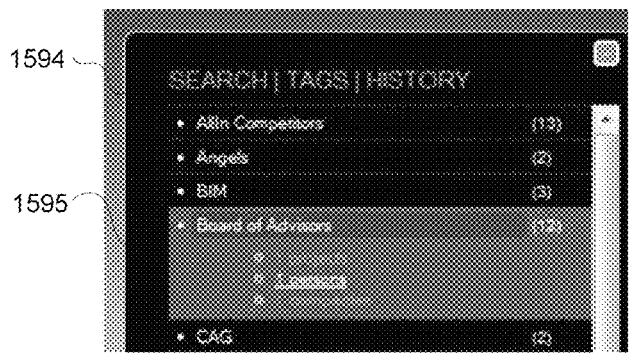

FIG. 15F shows one non-limiting example of an interface 1594 that could be used to access the tag functionality provided by the S/T/S control 1495A. In this example, the interface 1594 is populated by a list of tags associated with the user, which may be provided by the tagging sub-module 650 described previously. In particular, the list of tags displayed in this interface may include individual-user tags, project tags and/or system-level tags for related content in the system 10.

It will be appreciated that each tag in the list of tags displayed in the interface 1594 is a clickable element, which may be represented by a clickable button, an icon or (as in this example) text. The clickable element may also provide an indication of the amount of associated content (e.g., a numeric value) as well as an indication of when this content has changed (e.g., a "NEW" icon). This indication may be used by the user to confirm that his or her suspicions regarding relevant content in a topic (i.e., higher numbers being associated with broad topics versus lower numbers being associated specific topics) and/or to identify tags with new content.

When a user clicks on a tag title in the interface 1594, it expands to show content associated with the tag, which is typically provided by the tagging sub-module 650. This content may be grouped or organized by the sub-module 650 for the user's convenience. For example, a tag 1595 titled 'Board of Advisors' was clicked and is showing that its tagged content is grouped into projects, people and companies categories, each of which are a clickable link.

Although the tags shown in the interface 1594 appear to apply to be generally business-related subjects, it will be appreciated that any item deemed relevant and subsequently by the user (and/or by others in the system) could appear in this list. For example, the user could tag certain building supply items, such as various types of windows that were used in his or her projects. These may be tagged with a generic term, (e.g., 'windows') or a term with certain technical specifications, such as "windows, double-pane glazed" or "windows, ¾-inch, triple-pane glazed, Energy-Star compliant". By tagging these building materials so that references to them are stored as tag titles in the interface 1594, a user can refer to them in later projects where information regarding such building materials may be needed.

The use of such information may be augmented if the tag-building exercise described above is extended beyond a single user to the system 10 and/or the user community 14 in general. For example, the system 10 may review and collect user-contributed information contained in projects and events relating to a particular defined set of terms in a knowledge domain, such as building materials for the construction industry in general. Alternatively, the system 10 may be able to discern and tag more specific building materials, such as ¾-inch, triple-glazed Energy-Star certified windows.

In one non-limiting embodiment, the system 10 may identify and tag this information based on user input using a knowledge-building process that will be described below. In another non-limiting embodiment, the user community 14 may identify and tag this information based on a set of terms and/or taxonomy that is provided to and/or defined by members in the community 14. In yet another non-limiting embodiment, certain tagging activities may be performed automatically by the system 10 while other activities (or alternatively, review of the automated tagging activities to correct mistakes and ensure quality) may be performed by members of the user community 14.

By grouping this information into categories, the mental load placed on the user to identify relevant information associated with the tag is advantageously reduced. Such a reduction may allow a user to select the category that she or he feels is most representative of the type of tagged content that is needed at the time.

For example, assume that instead of three (3) items being associated with the tag 1595, there were 300 items, including 25 projects, 119 people, 98 building components/supplies and 58 companies. By breaking the tagged items into these three categories, the user has a chance to decide whether the associated information that he or she is looking for is related to a project, a person, a particular building component/supply or a company. Otherwise, the user may be forced to navigate through all 300 items in the attempt to find the information of interest, which may be impractical for the user.

As presented above, the S/T/S control 1495A is used to find content associated with a particular tag, such as the tag 1595 in FIG. 15F. Alternatively, the control 1495, and more specifically elements in the interface 1594 could also be used to apply a tag to content in the UI 1430. For example, if a new message in the messaging area 1580 relates to the Board of Advisors tag 1595, the tag (or a representative icon thereof) could be dragged onto the relevant message in this area in order to create an association between the tag and the message. Thus, when the Board of Advisors tag 1595 is subsequently opened, it may show four (4) items, including a project, a person, a company and the new message that was tagged in the media/messaging UI element 1470.

In another non-limiting embodiment, the S/T/S control 1495A may also provide search functionality that allows the user to search the system 10 based on certain user-supplied keywords or criteria. For example, a user could use the S/T/S control 1495A to search for all messages, events, projects, rankings and/or community-related postings related to a particular member of the user community 14. Such a search may be done to identify whether the member is an active participant in the user community 14 and/or what projects he or she has worked on in the past.

In another non-limiting example, the search functionality provided in the S/T/S control 1595A may allow a user to search for project templates, rather than for projects themselves. For example, assume a user is developing a project whose approach will be based on the integrated design process (IDP) rather than a design-bid-build (or design-tender) process. In addition, assume that the user is unfamiliar with the IDP process as she has only worked previously on design-bid-build and design-build approach projects. As a result, the user would likely prefer to build her project based on an existing template for IDP-based projects but has no such past projects to base her design upon.

In order to find an IDP-related template, the user may use the search functionality provided through the S/T/S control 1495A. In particular, she may choose to search for a term or keyword such as "IDP" or "Integrated Design Process" among the project templates 750 using this control. The user's search request may be passed by the control 1495A to the projects module 302, which may then search through the project templates 750 to identify those that have the related search term or characteristic. For example, the module 302 may find four (4) project templates, two of which are for commercial developments using the IDP process, an IDP template for an residential development project and an unrelated template that used IDP as an acronym for "Indiana Department of Probation". The user may then review the three relevant IDP-related project templates to see which best suits her development project, purchase the template if necessary and then create her project using this template.

In another non-limiting example, the search functionality may allow a user to filter events based on criteria supplied by himself or herself. For example, assume a first user is responsible for submitting all documentation needed to initiate a process whereby a project may be reviewed and certified by a reviewing body, such as the International Standards Organization (ISO) (e.g., documentation for an ISO 9000 quality certification process). Further assume that the first user has set up the project in the system 10 such that the drafting of each piece of documentation required for the certification process by another project team member is a documentation event.

As team members file their documentation and thus complete their documentation events, the first user needs to identify how close (or far) he or she is from having a complete documentation set. To do this, the first user uses the search functionality provided by the control 1495A to filter the events related the project to see how many of the documentation are completed and how many remain outstanding.

It will be appreciated that the ability to filter events in this way may save a user time in reviewing the status of the required documentation set. Otherwise, the first user would have been forced to review all events in the project to manually identify those that are documentation events, and then view the status of these events to see if they are still outstanding. The time required for such a manual review (especially if repeated several times over the life of the project, as is typical for ISO 9000 certification and re-certification processes) may delay the submission of the documentation set to the certifying body and increase the resulting cost of the certification process.

The S/T/S control 1495A may also provide functionality that allows the user to build a search query based on multiple criteria rather than on single criteria or simple keywords. As a result, a user could build a complex query to answer very particular questions regarding their project, such as the status of particular portions of the project (e.g., the progress of the electricians in wiring the 7th floor of a building with CAT-5E network cables) or particular people/project roles.

Figure 15G:
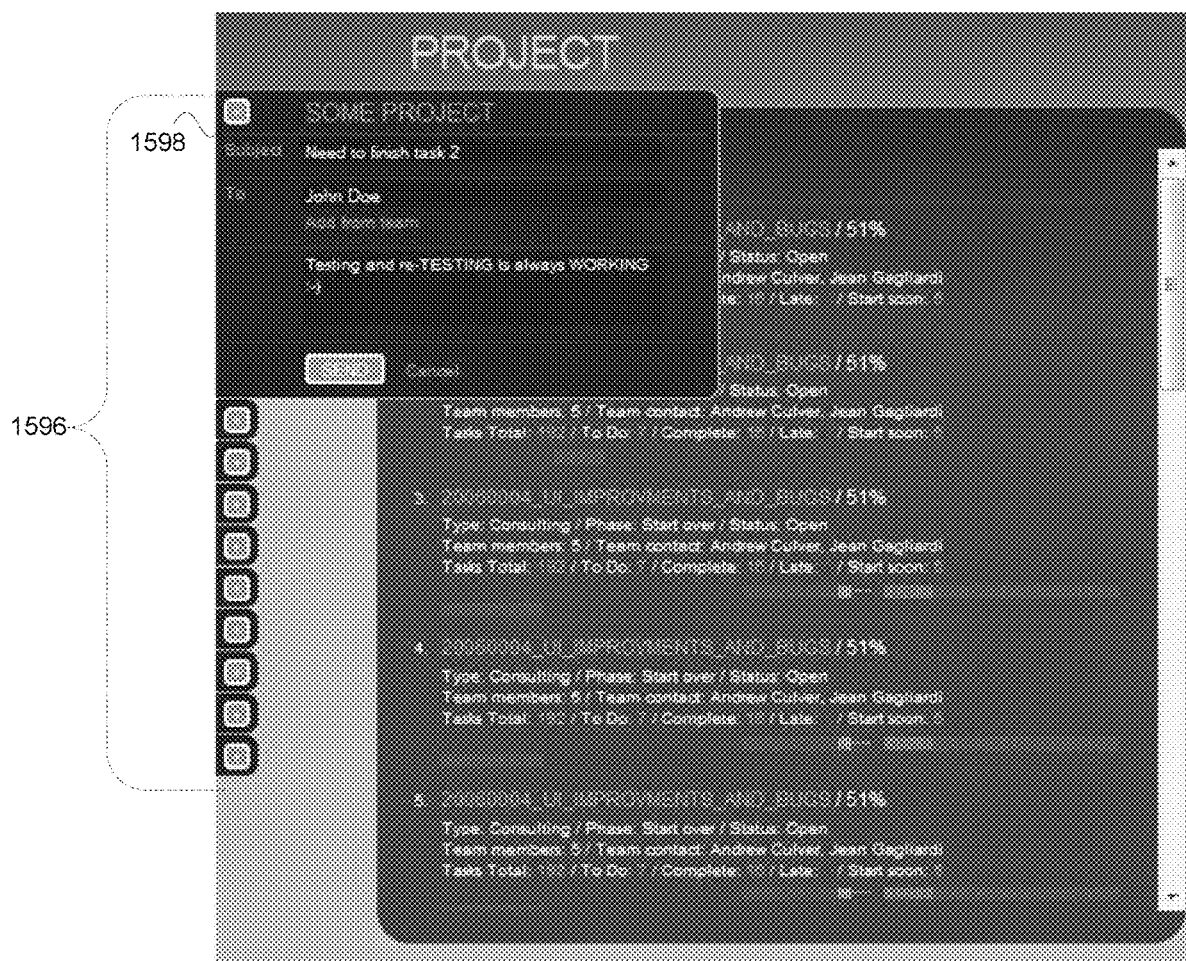
Figure 15H:
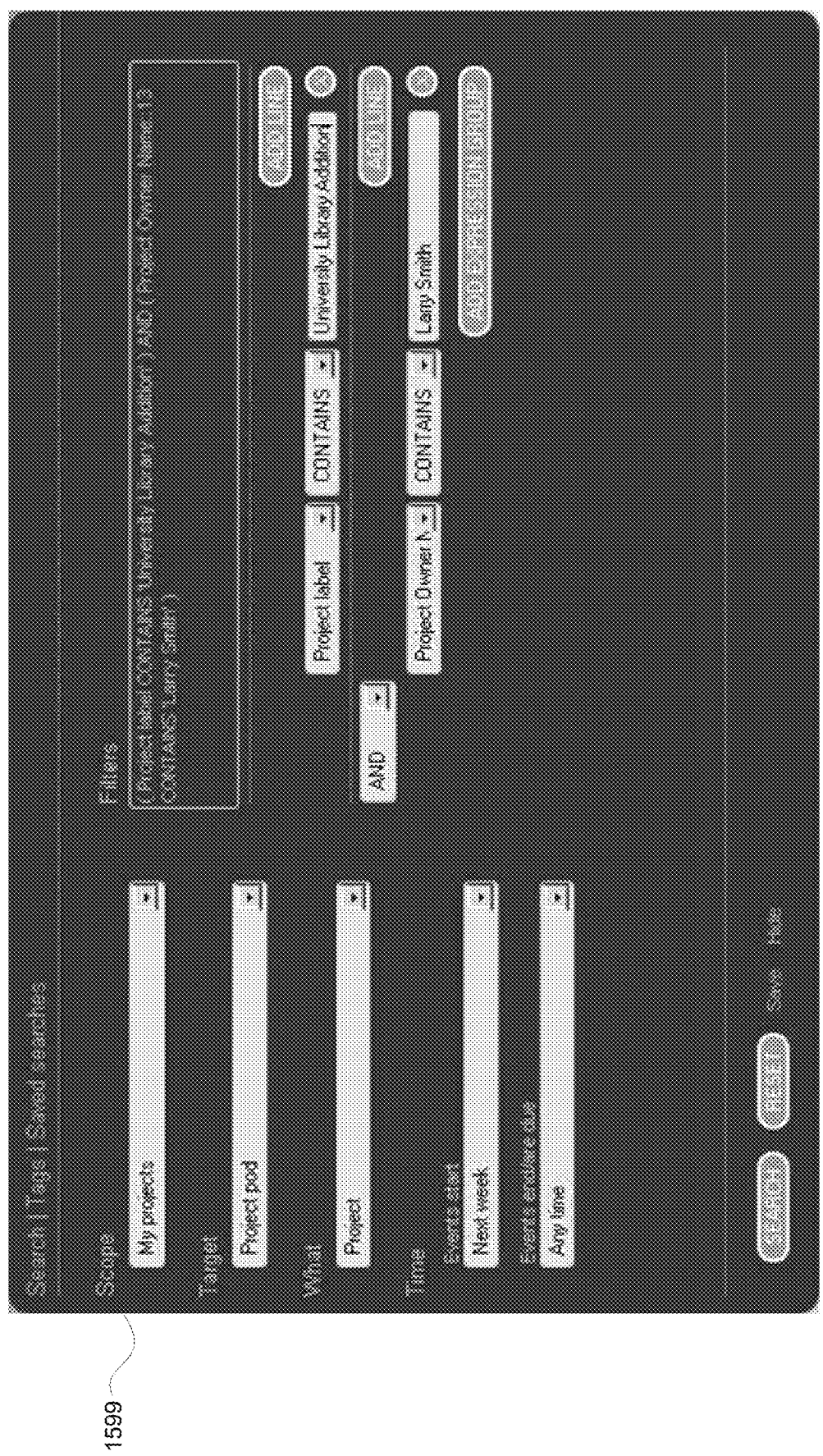

FIG. 15H shows one possible non-limiting embodiment of a search query builder 1599 that could be used by a user to build and run a search query. A set of controls is provided along the left-hand side of the query builder 1599 that allow the user to quickly build a query using certain pre-defined criteria. Non-limiting examples of such criteria may include project scope (i.e., search only the current project or all projects in which the user is participating), a particular UI element (e.g., the projects UI element 1440), an event within the selected UI element (e.g., a timeline or project) and/or a time period when events are due to start and/or end.

It is worth noting that the user options provided by certain controls in this area of the search query builder 1599 may be dynamically populated based on user selections in other controls. For example, the UI element selected by the user for the Target control may cause particular event types to be populated in the "What" (i.e., UI element) control. Alternatively, a user's choice to build a search tailored for only certain project type (such as LEED certification projects) may result in other controls in the query builder 1599 being pre-populated with timelines, roles and/or events relating only to the user's selected project type. In this way, the query builder 1599 can interact with the user to help him or her build a better query.

Another set of controls that allow the user to build a query using more specialized criteria is provided along the right side. In particular, the user is provided with the ability to create individual conditions for a query based on particular terms, values and/or keywords. For example, the first condition of the query illustrated in FIG. 15H requires the project label contain the phrase "University Library Addition", while the second condition requires the name of the project owner be "Larry Smith".

Those skilled in the art will see that the two query conditions described above are connected by a Boolean operator (AND) that requires that events found by the query must match both conditions (i.e., the event's project label includes "University Library Addition" and the owner is Larry Smith), although other Boolean operators (such as OR and/or NOT) could also be used. As Boolean operators are believed to be known in the art, no further description regarding them need be provided here.

As the user builds and adds conditions for her or her query, a textual representation of the resulting query appears in search query builder 1599, which may be seen in FIG. 15H as the area marked 'Filters'. Providing a textual representation of the query may allow a user to troubleshoot a query that is not working as expected. For example, if a query is supposed to include certain events that are in fact being excluded from the set of results, the user can review the text of the query in the Filter area to see if the query is being interpreted by the system 10 differently than expected.

In addition, each of the conditions described above require that a prospective event found by the query includes keywords, values or terms specified by the user. However, it is also possible that a user could specify keywords, values or terms to be excluded from search results, such as finding all events that do not include the terms "University Library Addition" and "Larry Smith".

Furthermore, it is possible that a user could create a query with the query builder 1599 that includes more than one specialized criteria for each condition. For example, a user could add a second line to the second condition in the query builder 1599 illustrated in FIG. 15H to identify a second project owner (i.e., someone other than Larry Smith) whose events should be included in the search results. When this query is executed, events for Larry Smith and this specified individual that belong to the University Library Addition project will be included in the search results.

Although the main function of the search query builder 1599 is to allow a user to build relevant queries for his or her own work, the builder 1599 also provides the user with the ability to save and retrieve queries in order to re-run them later. For example, once the user creates the query, he or she would use a Save control within the builder 1599 (which may be represented by a button or a hyperlink) to save the query within the system 10 with a particular name or designation. The saved query could then be retrieved by the user at a future date, which would reload that query's particular criteria and/or conditions into the builder 1599.

The save functionality of the search query builder 1599 described above may allow a user to save the query for his or her own use. However, it will be appreciated that this is not an absolute requirement for saved queries. More specifically, a query created within the builder 1599 may be saved at several different levels within the system, including at an individual level, at a group level (i.e., a query for a specified group of users within the user community 14), at a project level (i.e., a query for all users working on a project) and at the community level (i.e., a query that is made available to the entire user community 14).

Furthermore, the search query builder 1599 may also allow queries to be saved (i.e., associated) with certain events in the system 10. As a non-limiting example, an individual may use the query builder 1599 to generate a query to extract information from a standard timeline event that he or she uses in each project. The user could then 'save' the query with the timeline so that when he or she uses this timeline for the next project, the query will be automatically available for use.

The search query builder 1599 also allows saved queries to be transferred between and/or reassigned to particular users of the system 10. For example, assume that a first user (e.g., a senior project manager) creates the query illustrated in FIG. 15H in order to collect and review the tasks and events associated with Larry Smith's contribution on the University Library Addition project. This first user saves the query as "L Smith—Status Query" and assigns it to a second user (e.g., a junior project manager) who is responsible for Larry Smith's work. As a result, the second user can recall and re-execute the query designed by the first user in order to monitor the status of Larry Smith's tasks on the project, even if this user's knowledge of query creation the query builder 1599 is either limited or non-existent.

In addition, the query assignee can use the assigned query as a template for creating more specialized queries that may not have occurred to the query assigner. For example, the project manager responsible for Larry Smith's work on the University Library Addition project may adjust the query in order to see certain types of tasks assigned to Larry Smith so that he or she can ascertain whether this employee/contractor/sub-contractor is being overworked.

The result set generated by a query (such as one developed using the aforementioned search query builder 1599) displays a list of events that can be used for the basis of a report. For example, a user can quickly create a report showing his or her project-related tasks for the next day, week and month in order to keep himself or her-self on track with regards to the project. Alternatively, the user can generate a report showing completed events to submit with an invoice to be paid for their work.

The flexibility of the search query builder 1599 allows a user considerable latitude in the information that can be extracted from the system 10 for a report. However, the generation of reports from the system 10, and more specifically from the Project database 302 and the User Profile database 314, is not altogether dissimilar from the reporting functionality provided by other database systems. Because it is believed that such reporting functionality is well-known in the art, further description and/or examples need not be provided here.

In addition, reports that are generated by a single person may be shared with and reviewed by a group of people, not all of whom may be users of the system 10. For example, the project manager for an office building may generate a weekly status report showing completed events for the general contractor and the bank executive responsible for the project's financing. Although the general contractor may be a user of the system 10, the bank executive might not be.

To allow the distribution of reports to users outside of the system 10, reports generated via query results can be exported in other file formats, such as Microsoft Word or Excel files. In this case, the project manager and/or general contractor could generate the weekly status report as an Excel spreadsheet that is sent to the bank executive.

The S/T/S control 1495A may also provide a history feature that records all searches performed by a user, as well as provides the user with the ability to save and re-submit searches to the system 10. For example, assume that a user create a search using the search functionality in the S/T/S control 1495A that shows him only a certain type of event (e.g., tasks) which will be due in the coming week (7 days). Rather than having to recreate this search in the S/T/S control 1495A every week, the user may save the search in the history feature with a descriptive title (e.g., "My coming week tasks") that allow him to simply resubmit the search on a weekly basis. Being able to save searches in this way allows a user to save time as he or she does not need to recreate the search criteria each time.

Alternatively, the history feature in the S/T/S control 1495A may also be used in an auditing context. For example, certain events performed by the user in the system 10, such as the acceptance of a role, completion of a task, sending of a message or accessing of a file for a document event may be recorded by the system 10. In certain cases, this information may be provided by the S/T/S control 1495A to allow a first user to review the activities performed by the same user, or more likely, by another user who reports to the first user.

During normal use of the system, a user may perform a variety of activities via the UI elements 1440 to 1490 described above. For example, the user may review his or her projects in the projects UI element 1440, identify and/or update certain tasks or events in the Time UI element 1450, create and/or respond to messages in the media/messaging UI element 1470, and contribute his or her knowledge to a community of practice in the Community UI element 1480.

Although the user may perform a plurality of activities, it is possible that work on certain of these activities may be interrupted or postponed as a result of a planned or unplanned interruption. For example, a user may be working on creating sub-tasks for a task when he or she is interrupted by a telephone call. Alternatively, the user may begin work drafting an email to a project team member when he or she is called away to a meeting or site visit. In such cases, there is a likelihood that the user will forget that he or she started on such an task or activity before being interrupted or called away.

To protect the user against such interruptions to his or her work, the system 10 provides the so-called 'Unfinished Messages, Tasks and Documents' (UM/T/D) control 1495B in the control 1495. In general, the UM/T/D control 1495B displays the number of unfinished tasks messages or documents that the user has started in the system 10 but has not completed, such as marking a task as being 'DONE' via the adjustment controls 1546.

Like the S/T/S control 1495A, the UM/T/D control 1495B is a clickable element (such a button or hyperlink) that displays an interface when used. FIG. 15G shows a non-limiting example of an interface displayed by use of this control.

In particular when the UM/T/D control 1495B is used, an interface is displayed that shows a set of expandable event indicators 1596. Each indicator in this set represents one task, event or message that the user begun or opened that has not yet closed or sent. The indicators in the set 1596 may be presented as icons, as shown in the FIG. 15G. Clicking one such icon displays an interface 1598 that is broadly similar to the interface used in the UI element for the task, event or message. For example, the unfinished message represented in the interface 1598 includes a subject heading, a field for the recipient (i.e., the "To:" field), a field for the entry of text and a Send button to send the message (and subsequently remove it from the number of unfinished tasks, events and/or messages represented by the value associated with the UM/T/D control 1495B)

In the non-limiting example shown in FIG. 15G, each unfinished task, event and/or message in the interface 1596 was represented by a clickable icon. However, alternative ways of representing these items may be associated with the UM/T/D control 1495B, including text entries in a so-called 'crawl' that would appear along the top, bottom or side of the UI 1430.

The New Events (NE) control 1495C may be used to indicate to the user any newly arrived messages, which may include recently assigned tasks and/or events. As with the UM/T/D control 1495B, the NE control 1495C is a clickable element (such a button or hyperlink) that displays an interface when used. In particular, the use of this control may display an interface that is broadly similar to the interface 1596 illustrated in FIG. 15G. However, this interface would display new events, such as unread messages, timelines and/or tasks, rather than those which are currently considered unfinished or not completed. Since the interface 1596 has already been described in the context of the UM/T/D control 1495B, no further discussion of this interface need be provided here.

As described above, use of the controls 1495A, 1495B and 1495C each control the display of a particular interface, non-limiting examples of which are respectively illustrated in FIGS. 15F and 15G. It will be appreciated that the interfaces displayed through the use of these controls are relatively independent of the other UI elements in the UI 1430, namely the projects UI element 1440 through the community UI element 1480.

In one non-limiting embodiment of the controls 1495 (and more specifically the three controls comprised within the above), the use of this control may dictate the placement of the associated interface relative to the UI 1430 in addition to displaying the interface. For example, clicking the S/T/S control 1495A may display the interface 1594 described previously, as well as identify where relative to the UI 1430 this interface appears.

In a non-limiting example, the first click of the S/T/S control 1495A may display the interface 1594 at or around the left-side of the UI 1430, a second click of this control may display the interface 1594 at or around the right-side of the UI 1430, while a third click of the same control may hide the interface 1594 altogether. Controlling the display of the associated interface in this way allows the user to quickly learn and control the display and placement of the interface associated with any of the controls 1495A, 1495B and/or 1495C.

For example, the user may choose to display the interface 1594 associated with the S/T/S control 1495A along the left-hand side of the UI 1430 while displaying the interface 1596 for the UM/T/D control 1495B along the right-hand side of the UI 1430. Furthermore, the user could choose to keep the interface (not shown) associated with the NE control 1495C hidden until such time that he or she is ready to review these new events.

Those skilled in the art will also appreciate that the cycling action described above could apply to any associated interface that is displayed relative to the UI 1430, including alternative embodiments. For example, if the unfinished messages were initially displayed in a crawl, clicking the UM/T/D control 1495B a first time may cause the crawl to appear along the top of the UI 1430 (such as between the controls 1495 and 1497), while a second click of the same control may cause the crawl to appear along the bottom, below the UI elements. A third click of the same control may cause the crawl to disappear entirely from the UI 1430. By combining the display of the interface associated with the control with the ability to place this interface on the UI, the user is relieved of having to perform these actions separately (i.e., display the control and then place the resulting interface on the UI), which may improve the overall efficiency and productivity of the user.

Figure 16:
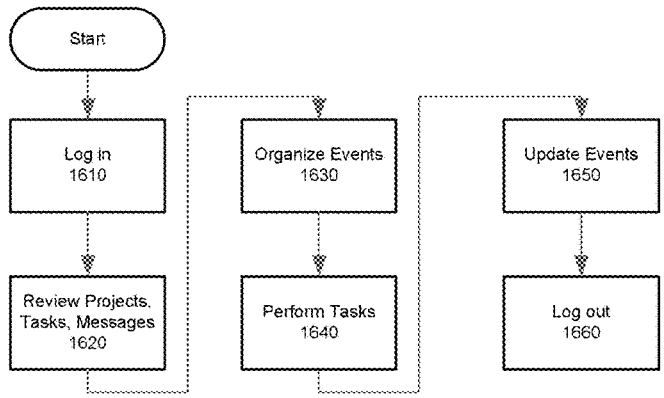
FIG. 16 is a flowchart of a process showing one possible method of use of the system.

FIG. 16 shows a flowchart that provides a non-limiting example of a process by which the system 10 may be used to perform tasks related to projects, as well as to allow communication and collaboration between users in the user community 14.

At step 1610, the user logs into the system 10 via the authentication UI 1410. In particular, the user enters his or her authentication credentials (e.g., email address and password) in the fields 1412 and 1414 described previously and then clicks the login control 1416.

The system 10, and more specifically, the community management module 304 compares the user's supplied authentication credentials against those stored in the user profile 340' for the user. If these match, the user is logged into the system 10. Otherwise, the user is prompted to re-enter his or her credentials in the fields 1412 and 1414.

Once the user is logged into the system 10, the user interface 1430 is typically displayed with the previously described UI elements 1440 to 1490 available to the user within this interface. The UI 1430 generally remains available until the user chooses to log out of the system at step 1660, which is described below.

Although the intermediate steps between these two terminal points are presented in sequential order, it will be appreciated that this sequence only represents one non-limiting process showing how the system 10 may be used by a user. In other possible processes, the actions represented by these steps may occur in a different sequence and/or occur simultaneously, and certain steps may be omitted altogether.

At step 1620, the user reviews his or her projects, scheduled events and/or messages using the relevant UI elements in the user interface 1430. In particular, the user's review may include (among others):

- a review of the current status of his or her projects in the projects UI element 1440;
- a review of his or her scheduled events and tasks in the time UI element 1450; and/or
- a review of communications from (or to) other users or named groups (e.g., those on project teams or in the user community 14).

Since use of the UI elements 1440, 1450 and 1460 has been discussed previously, further details of how a user may perform this step using these elements need not be provided here.

Based on this review, the user can assess what work identified by the system 10 (which may include tasks, meetings, communications, travel or other events) he or she can and/or should work on. In addition, the user may also determine what work identified by the system 10 that can and/or should be postponed or reassigned to another user.

At step 1630, the user organizes his or her work using the elements in the user interface 1430. For example, the user may choose to jog the date for certain tasks ahead by a week to allow certain other (potentially inter-dependent) tasks to be completed. For example, if a task for a user includes producing a three-dimensional animated walkthrough of a building but the computer-assisted design (CAD) files are not completed, the user may choose to jog the date for this task to after the estimated completion date for the CAD files.

During this step, the organization of events by the user may impact the schedule of other users in the system 10 thus affecting their ability to collaborate on shared work. For example, the jogging of the date to produce the animated 3D walkthrough may affect other users that may not be immediately known to the user. Examples of such users may include the video producer who is scheduled to use the animation in a TV commercial for the building project, as well as the voiceover talent who is scheduled to record the narration for the commercial.

As a result, the user can consider alternative possibilities for doing the work represented by the events and/or make the necessary arrangements with other users to allow the events to be moved. For example, the user may simply contact (i.e., send a message via the message UI 1480) to the video producer and voiceover talent asking them if it would be OK to delay their work for a few days.

At step 1640, the user performs the work that was identified by the system 10 and which the user organized in the previous step. It will be appreciated that the execution of this work may occur through the functionality the system 10 (such as by composing and/or replying to a message via the message UI element 1480) or may occur outside of the system 10 altogether (e.g., an HVAC technician travelling to a client site to maintain the filters in an air conditioning unit).

Regardless of whether the user's work is performed through the system 10 or outside of it, it will nonetheless be appreciated that the system 10 allows the user to identify his or her work to be performed (and/or work which can be postponed), as well as provide a platform to allow the work to be performed collaboratively with other users of the user community 14.

At step 1650, the user reports on the work that he or she performed through the system 10. For example, the user may update the status of certain tasks in the time messaging UI to 'Task Complete' by using the Done button in the adjustment controls 1546 described previously. By reporting to the system 10 on the work that he or she performed, the user may produce results that include:

- establishing responsibility and accountability for work performed by the user;
- allowing tasks for other users that are dependent on the user performing his or her work to proceed; and/or
- identifying to a second-party (e.g., the company or organization employing the user) or a third-party (e.g., a certification body) that a certain required task was performed by the user.

It will be appreciated that use of the system 10 by the user to record the performance of his or her work frees the user from having to record this work himself or herself with a second- or third-party (although such recording may still be necessary). In addition, any work scheduled for other users that is dependent on the current user can be allowed to proceed by the system 10 instead of having to wait for the user to alert the other users of this fact.

Moreover, the recording of work performed by all of the users working on a project team allows the generation of a general audit trail for the project itself. The provision of such an audit trail may be necessary for a project to achieve and/or maintain a particular certification or certification level.

For example, the maintenance of LEED certification for a building may require the maintenance company to submit documentation showing the performance of certain work tasks to a third-party certification body on a regular basis (e.g., annually or semi-annually). By recording the performance of this work with the system 10, the needed documentation can be generated from the system 10 in order to maintain the LEED certification of the building with the third-party certification body.

At step 1660, the user logs out of the system. In one non-limiting embodiment, the user may use a clickable control such as the logout control 1497 that indicates to the system 10 when the user is finished.

Alternatively, the system 10 may log the user out after a defined period of inactivity, such as after 15 minutes of inactivity. In such an alternate embodiment, the user may simply close the user interface 1430 (or the associated application used to display this interface, such as a web browser or smartphone application) without having to indicate to the system 10 that he or she is finished beforehand.

The collaboration system 10 may also be provided with certain functionality that allows it to review and/or learn from user actions taken and/or contributions made during a project. More specifically, the system 10 may be provided with a learning facility that analyzes and identifies certain best practices (or certain lessons to avoid) based upon contributions made by user in the user community 14 as they work on projects and/or perform tasks. In certain cases, this facility may allow the system 10 to refine its existing workflow with such best practices to benefit the users in the user community 14 who might otherwise not be aware of and/or implement such practices.

Figure 17:
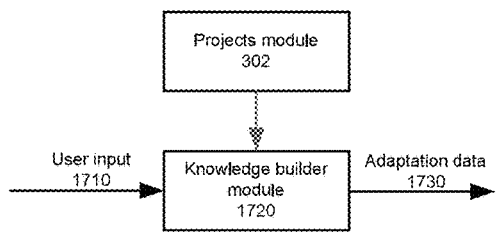
FIG. 17 is a block diagram of a variant of the building project module, including a knowledge builder module.

FIG. 17 shows the general process by which the system may employ such a learning facility. The learning facility includes a set of user input 1710, a knowledge builder module 1720 and a set of adaptation data 1730.

The set of user input 1710 may represent data generated by users in the user community 14 as they use the system 10. In this regard, the input 1710 may include data generated by users of the community 14 during:

- use of the projects module 302 and of the projects databases 312, such as those actions described earlier in relation to FIG. 13;
- use of the community management module 304 and the user profile database 314 the user community 14, such as those actions described earlier in relation to FIGS. 6 and 12;
- use of the user interfaces provided by the user interface sub-module 910 and the associated UIs described earlier in relation to FIGS. 9, 10 and 11, 14B and 15A to 15G; and/or
- use of the associated controls 1495 in the UI 1430, such as the tagging interface 1594 that may be used to apply certain tags to projects, events or messages (among other possibilities) in the UI elements 1440 to 1480.

The knowledge builder module 1720 may be invoked by the projects module 302 to analyze the set of user input 1710 and generate the set of adaptation data 1710. Typically, this module comprises certain logic that allows the input 1710 to review and analyze the data comprised within this dataset to identify certain relevant or noteworthy events that may indicate a best practice (or lesson learned) that can be captured and/or integrated within a workflow to improve the development and/or management of future projects within the system 10. The composition and operation of the knowledge builder module 1720 will be described in more detail below.

The set of adaptation data 1730 represents the output of the knowledge builder module 1720 after it has reviewed and analyzed the data from the set of user input 1710. The adaptation data 1730 may include best practices and/or lessons learned that were identified and/or extracted by the module 1720 during its analysis. The set of adaptation data 1730 may be used by the system 10 (and more specifically, by the building project module 302) to refine and improve future projects initiated by members of the user community 14.

Figure 18:
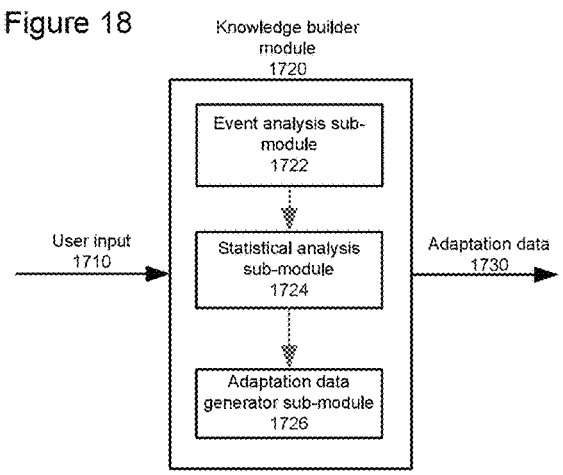
FIG. 18 is a more detailed block diagram of the knowledge builder module.

FIG. 18 shows the composition of the knowledge builder module 1720. In particular, the module 1720 comprises an event analysis sub-module 1722, a statistical analysis sub-module 1724 and an adaptation data generator sub-module 1726. The function and operation of these sub-modules will be described with respect to the knowledge builder module 1720 will be described below.

The event analysis sub-module 1722 can be used to review and sort through the set of user input 1720 in order to identify certain known events or occurrences from this incoming dataset. In a non-limiting embodiment, the sub-module 1722 may be configured with a predefined 'watch list' of certain events that need to be identified within the input 1720, such as that indicating the completion of a particular task. For example, the sub-module may be instructed via its watch list to identify the completion of a milestone (task) signifying the end of the design phase events 810 in the projects database 312. As a result, when the milestone identifying the completion of all design phase events 810$_i$ for the project 710$_i$ is reached, the event analysis sub-module 1722 can identify this task from the set of user input 1720 that may include other information.

Alternatively, the event analysis sub-module 1722 may be provided with certain functionality to filter and/or classify events in the set of user input 1710 based on a hierarchy or taxonomy that allows their relative importance to be judged. For example, assume that the sub-module 1722 is configured to identify the completion of following events from the input 1710 and rank them based on the following hierarchy:

1. milestones:
   a. completion of a milestone;
   b. establishment of a milestone;
2. timelines:
   a. completion of a timeline;
   b. change in the status of a timeline;
   c. establishment of a timeline;
3. Messages:
   a. change in accompanying task status (e.g., from received to accepted);
   b. sending of a message with an associated task from one user to another;
   c. forwarding of a message with an associated task from one user to another;
4. Documents; and
5. To-dos.

Based on the above classification system, the event analysis sub-module 1722 is able to classify events comprised within the set of user input 1710 to identify only those events included in the hierarchy. In addition, the sub-module 1722 is able to rank identified events according to their hierarchy level in order to determine their relative importance. Having the ability to perform such a ranking operation may allow the knowledge builder module 1720 to more efficiently process events in the set of user input 1710, since the event analysis sub-module 1722 will know which events in the incoming dataset are of relatively higher and lower priority.

The statistical analysis sub-module 1724 can be used to perform statistical analyses upon particular events in the set of user input 1710 identified by (and/or extracted from) by the event analysis sub-module 1722. The sub-module 1724 may perform certain mathematical and statistical calculations on the values represented in the identified events to compare them against known values for similar events in the projects database 312 in order to determine whether they may represent a best practice (or a lesson learned).

For example, assume that the event analysis sub-module 1722 identifies and extracts tasks relating to the completion of construction phase events 820' for a particular project in the projects database 312 from the set of user input 1720. These extracted events are then provided to the statistical analysis sub-module 1724 for analysis and comparison to known completed construction phase events in the projects database 312 for similar projects. The sub-module 1724 may then perform statistical analysis upon the values in these tasks, such as determining the variation between each event in the construction phase events 820' and similar instances of the construction phase events 820 for other projects. Analysis performed by the sub-module 1724 upon the events may include calculations of standard deviation, analysis of variance (ANOVA) and/or determination of confidence levels, among others.

For example, assume that the statistical analysis sub-module 1724 analyzes the construction phase events 820$_i$ against those events in the existing projects database 312 via an ANOVA variance analysis. The results of the ANOVA analysis indicate that the actual duration of the tasks in the construction phase events 820$_i$ are significantly less than those for similar events 820 known in the database 312. Assume that further analysis of the events 820$_i$ by the sub-module 1724 indicate that the source of the efficiency gain is the reordering of certain tasks in the events that remove a key dependency and therefore mitigate a particular bottleneck that is known to affect projects of this type.

Those skilled in the art will appreciate that the statistical analysis sub-module 1724 could perform any calculation (statistical or not) that allows the determination of whether one or more extracted events represent a significant variance or deviation from those already known to the knowledge builder module 1720 and to the system 10 in general. It will be further appreciated that the analysis performed by this sub-module can allow the determination of whether the significant variance or deviation is positive in nature (i.e., represents a realized improvement in efficiency and/or cost-savings) or is negative in nature (i.e., represents a mistake, an inefficiency and/or a cost overrun).

Typically, events analyzed by the statistical analysis sub-module 1724 whose deviation or variance from the established norm in the project database 312 are positive in nature may represent a 'best practice' that could be adopted in other projects to realize similar efficiencies and/or cost-savings. Likewise, events analyzed by the sub-module 1724 that are negative in nature may represent a 'lesson learned' that should be avoided in other projects to prevent similar mistakes, inefficiencies and/or cost-overruns from occurring. In the example mentioned above, the analysis of the events by the sub-module 1724 indicated that a reordering of certain tasks in the construction phase events 820 may mitigate a bottleneck and result in improved efficiency (i.e., a best practice).

While the identification of best practices and/or lessons learned by the event analysis and statistical analysis sub-modules 1722 and 1724 may be of interest, the information gleaned from such events need to be integrated as within the workflow provided by the system 10 in order to be of use to the user community 14. Through such integration, users in the community 14 may be provided with so-called 'actionable intelligence' that allows a user to make better decisions regarding his or her project(s).

In this regard, the adaptation data generator sub-module 1726 can be used to convert the results from the statistical analysis sub-module 1724 into data that can be integrated into the system 10, and more specifically into the events, tasks and workflows of the projects module 302. As an example, assume the analysis of the statistical analysis sub-module 1724 that reordering certain tasks in the construction phase events 820 results in the realization of improved efficiencies is determined to be a useful enough best practice that it should be incorporated in all future projects of a similar type.

Once such a determination is made (which may be automatic or manually performed), the adaptation data generator sub-module 1726 may generate data that will cause the projects module 302 to reorder the sequence of the construction phase events 820 for all future projects of a similar type. This data is output from the knowledge builder module 1720 as adaptation data 1730.

It may be appreciated that the output adaptation data generator sub-module 1726 (and of the knowledge builder module 1720 in general) may not cause the best practice(s) and/or lesson(s) learned to be immediately adopted by the system 10. For example, it is possible that certain best practices and/or lessons learned generated by the module 1720 may apply to situations that are very specific to particular rare projects. For example, the analysis by the knowledge builder module 1720 of events relating to the construction, operation and/or maintenance of a heavily customized geothermal heating and cooling system used to maintain volcanology equipment in a observation center that is located close to an active Icelandic volcano may be so specialized that it could not be applied to or used by other projects.

In the above embodiment, the adaptation data 1730 generated by the adaptation data sub-module 1726 may be used by the system 10, and more specifically by the projects module 302. In particular, the data 1730 may be used to improve certain features related to the project templates 750, such as the composition and/or ordering of events in one or more templates within the project templates 750.

However, it is conceivable that the adaptation data 1730 generated by the knowledge builder module 1720 is not used by the system 10, but rather by a user in order to make a decision regarding a project in the system 10. In this case, the implementation of the adaptation data 1730 is likely left up to the user's discretion.

For example, assume that several projects in the projects database 312 included green roofs that were constructed on top of commercial and office developments in hot, semi-arid environments in the American southwest region. In addition, assume the knowledge builder module 1720 analyzed the user input 1710 from events related to the green roof construction for these projects.

The analysis (which was encoded as the adaptation data 1730) suggested that events in the construction phase events 820 related to installation of the green roof in this environment took an average of 4 days to complete, which may be 25-33% longer than the average for green roofs elsewhere in the United States.

Further assume that a user who has assumed the role of 'Green Roof Consultant' for an office development project located in a suburb of Santa Fe, New Mexico is adjusting the duration of events related the construction of the green roof for this project in the time UI element 1450. Because the user may be more familiar with constructing green roofs in other, more temperate parts of the United States, she sets the duration of the timeline for the construction of the green roof in this project to 2 days, which conforms to average amount of time needed for the construction of such a roof in her experience.

When the user enters this duration for the construction phase events 820 related to the green roof, the projects module 302 may identify that this duration is actually 50% lower than the average amount of time needed to construct a green roof in this area of the U.S. (One non-limiting process that the project module 302 could use to determine this discrepancy may be to compare the overall duration of the 'green roof' timeline event in the construction phase events for this project to the aforementioned adaptation data, which may be stored in the module 302 or within the projects database 312, among other storage options.) When the module 302 identifies this discrepancy, it may prompt the user to revisit her original construction estimate by providing the adaptation data 1730 in a user-friendly format. For example, the projects module may send the user a message containing a suggestion that might be similar to the following:

"TIP: You have estimated TWO (2) days to build a green roof. Prior data shows that building a green roof in this environment take FOUR (4) days on average. Please consider increasing your estimate for this event."

Based on the above suggestion, the user may decide to extend the duration of the timeline based on the information related to the adaptation data 1730 or she may decide to leave her estimate as-is. Regardless of her decision, it will be appreciated that by providing the adaptation data 1730 to the user in this format, the system 10 allows her to make the final decision regarding the duration of events related to the construction of the green roof in this project.

This use of the adaptation data 1730 may cause the system 10 (and/or the projects module 302) to appear to function similarly to a decision-support system. However, it will be appreciated that the collaborative features of the system 10 (such as functionality provided by the community UI element 1480) allow the Green Roof consultant to verify and validate the system's suggestion with other members of the user community 14. The ability to draw on collective knowledge of others in the user community 14 via the system 10 may be of considerable benefit to this user in deciding how she interprets and/or implements the adaptation data in her project.

Figure 19:
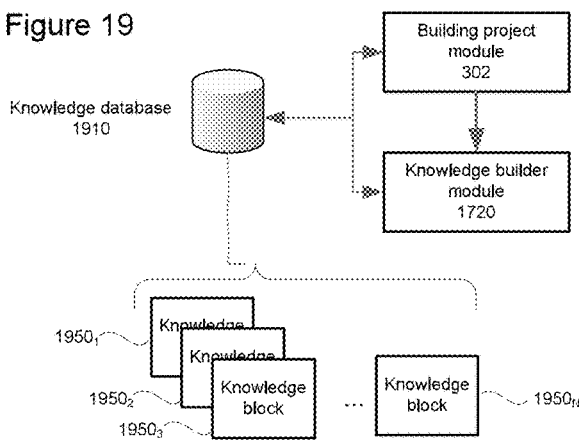
FIG. 19 is a block diagram of a knowledge database.

Regardless of the estimated relevance and impact of the best practices and/or lessons learned generated by the knowledge builder module 1720, it may be useful to store such findings for later review. FIG. 19 shows a knowledge database 1910 that may be accessed by the knowledge builder module 1720 and/or used to store information by this module.

The knowledge database 1910 may be comprised within the building projects database 312. In this case, the database 1910 may be seen as including a table or set of tables within the database 312 that is accessible to knowledge builder module 1720. Alternatively, the knowledge database 1910 may comprise a database that is separate to the building projects database 312 but which is available to the projects module 302, the knowledge builder module 1720 and/or the building projects database 312. As with the other databases 312 and 314, the knowledge database 1910 may be co-located at the same geographic location or distributed geographically. In the latter case, the databases 312, 314 and/or 1910 (and their associated modules) may be interconnected via a public network (such as the network 100) or a private network (not shown) such as a dedicated local- or wide-area network described previously with respect to FIG. 2A.

The knowledge database 1910 may be thought of as comprising of a set of knowledge blocks $1950_1$ to $1950_N$. Each of these knowledge blocks may represent a particular result that was generated by the knowledge builder module 1720, such as a best practice and/or lesson learned.

Each instance of the knowledge block $1950_i$ may comprise information relating to the result that caused the module 1720 to create the block $1950_i$ in the first place. In one non-limiting embodiment, the information saved within the knowledge block $1950_i$ could include the particular best practice or lesson learned, which may be represented by its adaptation data generated by the adaptation data generator sub-module 1726.

Alternatively, the knowledge block $1950_i$ may include related information that would allow the knowledge builder module 1720 to recreate or regenerate the result, including (among others):

a list (or a copy) of the events extracted by the event analysis sub-module 1722 from the set of user input 1910;

the statistical functions and/or other calculations performed on the events by the statistical analysis sub-module 1724;

the result(s) determined by the statistical analysis sub-module 1724 that determined the need for adaptation data to be generated; and/or the adaptation data 1730 generated by the adaptation data generator sub-module 1726.

Regardless of the exact contents comprised within each of the information blocks $1950_1$ to $1950_N$, it will be appreciated that the knowledge database 1910 provides a means of storage for the results of the knowledge builder module 1720. This allows the system 10 to store all of the best practices and/or lessons learned generated through the contributions of its users, rather than only those which have been converted into actionable intelligence and integrated into the tasks, timelines and other events provided by the projects module 302.

Although the objective of the knowledge building module 1720 is to identify best practices and/or lessons learned from the set of user input 1710 that can be converted to actionable intelligence and implemented via the adaptation data 1730, the storage of less relevant and implementable knowledge in the knowledge database 1910 may provide certain ancillary benefits to the system 10, and in particular, the user community 14.

For example, each of the knowledge blocks $1950_i$ within the knowledge database 1910 could include a summary of the best practice and/or lesson learned in a user-friendly format (e.g., text comprising a brief description). In this way, users within the community 14 could consult the database 1910 in order to learn from past experiences of other users and projects via their best practices and/or lessons learned. This may allow a user who has not yet participated in a project to learn from the collective experience of those in the community 14.

Of course, it will be understood that consultation of the knowledge database 1910 by the members of the user community 14 at large may require that certain operations be applied to the contents of each knowledge block $1950_i$ to ensure that the privacy of the participants is respected. For example, the inclusion of user names may be replaced with their generic role, such that any mention of "Bob Smith, landscape architect" is replaced with "Landscape architect". Alternatively, privacy restrictions may be placed on certain knowledge blocks such that the full contents of (i.e., events and information relating to) any particular block may only be viewed by those who worked on that project; all others may only see a summary of the results represented by the block $1950_i$.

Figure 20:
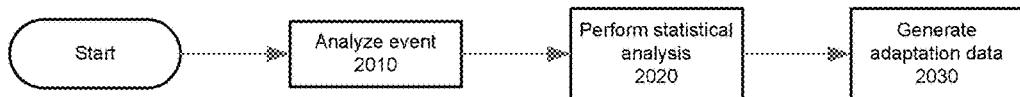
FIG. 20 is a flowchart of a process for analyzing project events and updating the knowledge module.

FIG. 20 illustrates a flowchart that represents one non-limiting embodiment of a method by which events generated and acted upon by users in the user community 14 can be analyzed by the system 10 to generate the adaptation data 1730.

At step 2010, one or more events (such as those within the set of user input 1710) may be analyzed in order to identify and extract events of importance within the incoming dataset. This step is typically performed by the knowledge builder module 1720, and in particular, the event analysis sub-module 1722. Since the operation of this sub-module has already been described, further details regarding this step need not be provided here.

At step 2020, one or more of the events identified and/or extracted during the previous step is analyzed using statistical analysis. This step would typically be performed by the knowledge builder module 1720, and in particular, the statistical analysis sub-module 1724. Since the operation of this sub-module has already been described, further details regarding this step need not be provided here.

At step 2030, the events analyzed (or the results of the analysis) performed in the previous step are used to generate adaptation data. As before, this step would typically be performed by the knowledge builder module 1720, and in particular, the adaptation data generator sub-module 1726. Since the operation of this sub-module has already been described, further details regarding this step need not be provided here.

The adaptation data generated during step 2030 may result in the integration of this data (i.e., implementation of the adaptation data 1730) within the system 10, and in particular, the projects module 302. In addition, the performance of this step may also result in the generation of a new instance of the knowledge block $1950_i$ that is subsequently stored within the knowledge database 1910. In this regard, the results of the process can be stored for later review, consultation and use by either the system 10 or by members of the user community 14.

The non-limiting embodiment(s) described above in relation to the collaboration system 10 and its components have so far been presented from the perspective of a human user of the system who is accessing the system 10 from a client 16. However, it will be appreciated that the user of the system 10 need not be human and in fact, clients of the system 10 may be other computer systems similar to the computing device 110 described above.

For example, a company who uses the collaboration system 10 may use their own software application to access and interact with this system programmatically, rather than through the UI 1430 and its elements. To provide such programmatic access to the system 10 to other external computer systems, an Application Programming Interface (or API) may be provided to external organizations. The API includes certain programmatic commands that may be passed from an external computing system to the collaboration system 10 via the network 100 that allow the system 10 to respond as if a human user was performing certain actions via the UI 1430. For example, the API may allow an external computing system to access the projects module 302 and create a new project $710_i$ within the projects database 312 based on commands rather than through the various interfaces provided through user interface sub-module 910.

The provision of such an API may allow the organization to use their own in-house applications for certain activities while also deriving advantages provided through use of the collaboration system 10. For example, assume a particular architectural firm has developed a comprehensive energy calculator application based on their experience. Further assume that this calculator application may use certain inputs that are available for a project in the projects database 312 to perform its calculations. By using the API for the system 10, the company may continue to use its in-house energy calculator application while using the collaboration system 10 to manage its building projects and participate in the user community 14.

In the above non-limiting example of the API, the API was used by a client 16 in order to retrieve information from the system 10 for an in-house application. However, it is conceivable that the same API may also be used to send information from the system 10 to a client 16 that is non-human and is similar to computing device 110 described previously. More specifically, the API may allow the system 10 to establish a communications link with a client 16 that could provide a means of sharing information (which may include messages, computer files (such as documents) and/or computing processes between these two computing devices.

In one non-limiting implementation, the API could provide an external computer system with authentication information or data that would allow a user in the system 10 to access information stored within that external system. For example, assume that through an agreement, the system 10 is able to provide the members of the user community 14 with access to certain resources of a library of a private association, such as scanned or electronic copies of relevant books and conference materials relating to the construction industry, as well as electronic databases containing news and journal articles on construction-related topics.

The library belongs to the private association and likely has legal agreements with other organizations against the general redistribution of its materials. As a result, the library content system responsible for the provision of these resources must somehow verify that each user requesting access is a user who is in fact allowed to access these resources. To provide such validation for a user of the system 10 who is trying to access these resources, the system 10 (and more specifically, the registration/authentication sub-module 610 of the community management module 304) may provide certain authentication data to the library content system via the API.

Such authentication data could be in the form of an encrypted general username and password provided for users of the system 10, such that a single username and password would work for the entire user community 14. Alternatively, the authentication data could be provided in the form of an encrypted 'handshake' based on a mathematical formula that allows the user of the system 10 to appear to the library content system as an authenticated user. Since it is believed that the methods for deriving, transferring and validating authentication data are well known in the art, further details need not be provided here.

It is worth noting in the above example, the entirety of the user community 14 was assumed to have access to the external resources. However, it is possible that only certain users in the community 14 may have access to these resources, such as by purchasing a package that allows such access. Alternatively, a user may achieve access to these resources by freely contributing their knowledge to the community 14 in such a way that they achieve a particular ranking or rating in the opinion of other users (e.g., a 'Guru' or 'MVP' status).

If a member of the user community 14 who does access to these external resources attempts to access them (e.g., via the library content server), the system 10 provides authentication data as described above via the API. However, if a member of the community 14 who does not have access to these external resources attempts to access them, the system 10 (via the API) may either not provide any authentication data at all, or may provide certain data to the external system that indicates where the user originated. In the latter case, the receiving system (e.g., the library content server) may provide the member with a certain restricted level of access or provide the member with an opportunity to purchase access at a certain price.

Although the above non-limiting implementation described how the system 10 could authenticate a user to an external resource via the API, it will be appreciated that other methods could also be used to provide such authentication. For example, at the time the user indicates that he or she wishes to access the external resource, the system 10 could send a message (such as an email message) to a pre-defined address for the external resource. The contents of this message may provide the external resource with the authentication details for the user (such as the username and password indicated above). Upon receipt of such an email, the external resource will be made aware of the user's connection to it, and will thus be ready to allow the user access even though such authentication was not performed via the API.

In another non-limiting implementation of the API, the API could be used to link a project of a first user of the system 10 with some project-related resource provided for use by a second user of the system 10. For example, assume that a user who is a software developer has developed a software application that opens the files representing the architectural design of a building (e.g., Autodesk® Revit® gbXML files), reviews and determines the building's energy efficiency and makes certain suggestions as to how its efficiency could be increased. Further assume that the application is being offered to users in the user community 14 via the system 10. Because the application is proprietary, however, it is maintained on a server (much like the server 22) that is external to the system 10 (and more specifically, the central node 18) but is accessible via the network 100.

Next, assume that a user who is an architect wishes to submit her building designs to this energy-efficiency application to see if the latest iteration of the building is more energy-efficient that the last. Further assume that the user has saved the gbXML files representing her building with a document event, and these files are likely available from the projects database 312. When the user indicates that she wishes to use the energy-efficiency application via the system 10 (i.e., from an interface provided by the user interface sub-module 910 and/or in the UI 1430), the projects module 302 retrieves the gbXML files for the project from the database 312. The module 302 may then package these files according to some file format dictated by the API, such as in a compressed file (i.e. Zip or Stuff-It file) with an XML header that describes the file contents.

The system 10 may then send the compressed file containing the user's building gbXML files to the external software application server via the API. Because the external software application was likely coded with the system's 10 API in mind, it is able to retrieve and confirm that the file was received correctly. (This action may also result in a message being sent by the system 10 to the user to inform her that her latest design iteration was submitted successfully.) The software application extracts the user's gbXML files, reviews and determines this iteration's energy efficiency and makes certain suggestions (e.g., in a Word or Excel file) as to how its efficiency could be increased. The resulting files are recompressed into a single compressed file and sent back to the system 10 by the external server via its API.

When the system 10 receives the compressed file from the external server, it may alert the user (e.g., via a message) that her energy efficiency results have returned and are available for her review. In addition, the system 10 may also charge the user a certain amount of money for the service of using the external energy-efficiency application, as well as for preparing, sending and receiving the files associated with this review.

In the example above, the API of the system 10 allows the user to send his or her gbXML files to the external software application server and receive results from the energy-efficiency application. It will be appreciated that if the developer of the energy-efficiency application charged a fee for use of this application, the system 10 would likely assess the associated fee and charge the user accordingly on behalf of the developer. At the same time, the system 10 may reserve a portion of this fee for facilitating the connection between the user and the energy-efficiency application.

In an alternative embodiment, the API may also allow external access to certain data within the system 10, and more specifically, data within the projects database 312 and the user profiles database 314. The use of this data may be provided to aid external developers in developing or refining their templates and/or applications.

For example, assume that many users of the system 10 submit their building gbXML files to the energy-efficiency application on the external server via the API. Further assume that the developer of the application has knowledge of the type of buildings being submitted to the application, the results generated for each user by the application as well as the recommendations provided to the user as to how to adjust their building design to improve its energy-efficiency.

However, the developer likely has no knowledge regarding any adjustments to a particular building's design after the results and recommendations from the application were returned to the user. In particular, the developer may want to know if the user ended up adjusting his or her building's design to implement any of the recommendations, and if so, in what way.

This information is stored within the system 10, likely within the project database 312. In particular, the database 312 would contain events (and associated communications) related to the design of each evaluated building that would show adjustments or changes caused by the results/recommendations delivered by the energy-efficiency application. Having this knowledge could help the developer of the energy-efficiency application improve the application and make it more useful.

To facilitate a flow of this information back to external template and/or application developers, the API may be provided to allow access to certain data within the projects database 312 and user profile database 314. It is likely that data to which an external user would have access would be a) anonymized to protect user privacy and b) aggregated to indicate general trends.

As a non-limiting example, assume that the API allows the developer of the external energy-efficiency application access to data in the projects database 312, and more specifically, data related to each building project for which gbXML files were sent to the developer's server. The data that may be provided to the developer would likely be aggregate data, such as the average number of events representing design-related changes made to the project before the building design was submitted and the number of design-related changes made after the design was submitted.

Having such an aggregate before-and-after view of projects would allow the developer to see if the number of design changes after the building design was submitted was generally greater than those before submission. If the average number of design changes after submission is greater than those beforehand, the developer may infer that the results and/or recommendations of the energy-efficiency application indeed caused some changes to generally be made to a building's design.

In yet another non-limiting embodiment, the collaboration system 10 may be used to help certify the results of a project (e.g., houses in a residential development, an industrial factory, an office building, or a suburban strip mall among others) with a particular certification by a certifying body. In certain cases, the system 10 may not be used help certify a project's results, but rather may be used to initiate and support the certification process. Certifying bodies include the aforementioned ISO, the Underwriter's Laboratory (UL), the Green Building Certification Institute (GBCI) and the United States Patent and Trademark Office (USPTO), among others.

In many cases, being certified by a certifying body for a particular certification (e.g., a building being LEED certified or a quality-assurance process being certified as ISO 9000 compliant) is only a first step in a larger process involving the retention (and/or improvement) of the recognized certification. For example, once a building becomes LEED-certified, its certification may be reviewed on a regular basis. During such a review, the building may maintain its current certification level, improve on its previous level or even lose its certification altogether.

Since the work required to achieve certification by a certifying body (such as being LEED-certified or achieving ISO 9001 status) typically represents a considerable investment of time, money and other resources, users who are responsible for an accredited project would generally like to ensure that the result (i.e., a building) at least retains its current level of certification, if not improve upon it to move to the next level up.

Certain functionality of the collaboration system 10 may be used to help the project, and more specifically, the result of the project (which may include a building or other physical construction) achieve certification from a certifying body. In addition, certain functionality of the system 10 may also help the project retain its certification if the certification process includes periodic reviews.

Figure 21:
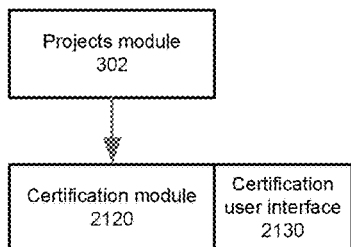
FIG. 21 a block diagram of a variant of the building project software module, including a certification software module.

FIG. 21 shows how the building projects module 302 may be in communication with certain functionality of the system 10 that may provide certain certification functionality to a user. In particular, the certification functionality may be provided by a certification module 2120 that is communication with a certification user interface (UI) 2130.

The certification module 2120 may be invoked by the projects module 302 to analyze the certain information in a project to collect and/or determine certain information related to certification by a certifying body, such as those described above. Typically this module comprises certain logic that allows input from the projects module 302 to review and analyze information stored in the projects database 312 related to certification and certification.

Information that may be reviewed and analyzed for a given project in the database 312 by the certification module 2120 may include, among others:
 the existence of particular events related to achieving certification, such as tasks or documentation events;
 the status of certification events identified above; and
 the existence of certain roles in the project related to certification; and/or
 the existence of certain documents related to the document events identified previously.

Although the certification module 2120 and the building projects module 302 have been presented as separate entities, this division was done for illustrative purposes. The functionality of the certification module 2120 described above may be provided through the projects module 302.

As a result, users who are involved with the certifying body (such as the Green Building Council (GBE) for LEED certification or International Standards Organization (ISO) for ISO 9000/14000 certification) can use the same system 10 that is being used by those who are managing and working on the project that is being certified. Centralization around the system 10 in this way may allow certain efficiencies to be realized, further details about which are provided below.

The certification UI 2130 is a graphical user interface that may be generated by the user interface sub-module 910 and may appear similar to certain of the interfaces previously discussed, such as the UI 1430. For example, when displayed the certification UI 2130 may appear similar to the UI elements 1440 to 1480 in that it may have a menu (e.g., similar to the menu 1510) and/or an associated area (e.g., similar to the projects area 1520). Alternatively, the certification UI 2130 may appear as a foldout associated with one of the UI elements 1440 to 1480 in a manner to similar to the associated interface 13C100 discussed respectively in FIG. 13C.

The certification UI 2130 may provide a user with a means of interacting with the certification module 2120. This UI may be comprised of a set of clickable controls including buttons, drop-down lists, checkboxes, radio buttons and/or text fields, among others. By using these controls, the user can interact with the certification module 2120. For example, assume that the certification module 2120 requires a form containing a notarized copy of the certificate of incorporation for a company so that that a request for a certification review can be submitted to the certifying body. Further assume that due to certain legislation, the system 10 was only allowed to hold a so-called placeholder (or 'dummy') version of this form while the final version of this form was stored elsewhere. Now, however, the final version of the form has been prepared and certified by a notary public and may therefore be submitted with the request.

Because the system 10 only holds the dummy copy in the projects database 312, the certification module 2120 cannot use this copy of the form. Instead, the user configures the certification UI 2130 to direct the module 2120 to the location of the final version of this form containing the notarized copy of the company's certificate of incorporation. In this way, the user can interact with and verify the activity of the certification module 2120 during its certification-related activities.

Figure 22:
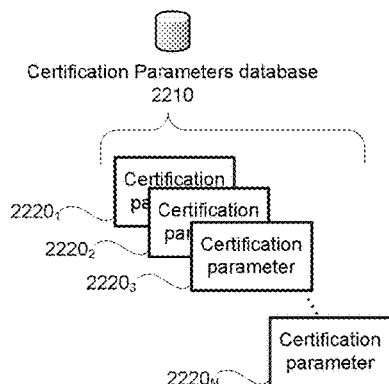
FIG. 22 is a block diagram of a certification parameters database.

FIG. 22 shows a certification parameters database 2210 that may also be included in the collaboration system 10 to assist with certain of its certification certification-related activities. The database 2210 is comprised of a set of certification parameters $2220_1$-$2220_N$ that generally represent certain information regarding or necessary for a project to be accredited by a certifying body.

Each parameter in the set of certification parameters $2220_1$-$2220_N$ likely corresponds to a certain aspect or component of the certification process. For example, in the process wherein a home, building or other construction is accredited as being LEED-certified, this set of parameters may represent the various environmental and other 'credits' that the project must earn in order to achieve this certification. In this case, the set of certification parameters $2220_1$-$2220_N$ may include the information provided by the certification body related to each credit.

For example, assume that a LEED credit for a commercial or industrial construction project may be earned by installing secure bicycle storage and changing rooms in a facility for at least 5% of the building's expected occupants. Therefore, one or more parameters in the set of certification parameters $2220_1$-$2220_N$ may represent information related to this credit, such as the LEED credit value (i.e., 1 credit) and/or the documentation required by the certifying body to allow this credit, such as site drawings indicating the location of the secure bicycle storage area and changing facilities.

In certain cases, the certification database 2210 and the set of certification parameters $2220_1$-$2220_N$ may comprise information for one or a plurality of available certification programs that may be available for a project in the system 10. For example, the database 2210 may contain certain parameters in the set of certification parameters $2220_1$-$2220_N$ related to the LEED-certification program that is managed by the GBCI, while other parameters may relate to various ISO certification programs (e.g., ISO 9000 or ISO 14001) that are managed by the International Standards Association. In this way, the certification database 2210 may support and assist the project in achieving multiple certification objectives, which otherwise would likely occur independently of each other and possibly require extra time and resources.

It will be appreciated that the set of certification parameters $2220_1$-$2220_N$ may also include other information related to each credit in the certification process that is not supplied by the certifying body. In particular, these parameters may include certain information derived from user-generated or contributed information (such as from the user input 1710 described earlier) that relates to the credit. Using the example of the secure LEED credit from bicycle storage and changing rooms mentioned previously, it may be possible that one of more of the parameters $2220_1$-$2220_N$ may provide user-contributed information regarding this credit, including but not limited to:

suggestions and/or links to products and equipment manufacturers that provide bicycle storage and have qualified as 'secure bicycle storage' in the past;
questions and/or answers regarding the design of changing facilities (e.g., is a shower is needed to qualify for the credit or would a sink and bench be enough?);
links to external software applications (which could be accessed via the API) that would analyze a site's design for a project and determine whether it would qualify for this credit; and/or
a list of members in the user community 14 who are known to be familiar with this credit (e.g., public-transportation and/or bicycle credit consultants) and may be available to assist the project team with this credit.

It will be appreciated that user-contributed information in the set of certification parameters $2220_1$-$2220_N$, such as that described in the non-exhaustive list described above, may or may not be provided by the certification module 2120. In one non-limiting implementation, the knowledge builder module 1720 during its analysis of the user input 1710 may identify user-contributed information relating to one or more parameters in the set of certification parameters $2220_1$-$2220_N$ and subsequently update (or cause the update of) these parameters with this information. In this way, the system 10 may be able to review, update and maintain the certification database 2210.

Alternatively, this information may be contributed by the user community 14 via the tagging interface 1594 that was described previously with regards to the S/T/S control 1495A. For example, a user may tag certain content in the UI interface elements 1440 to 1480 with a tag such as "LEED bicycle storage/changeroom credit". When the user tags this content, the system 10 may update the set of certification parameters $2220_1$-$2220_N$ in the certification database 2210 accordingly. In this way, the user community 14 may be able to review, maintain and update the certification database 2210.

Figure 23:
FIG. 23 is a flowchart of a process for determining if a project meets certification criteria.

FIG. 23 shows a non-limiting embodiment of a process by which the collaboration system 10 may support and assist a project in obtaining certification or certification from a certifying body.

At step 2310, certain certification parameters in the set of certification parameters $2220_1$-$2220_N$ are retrieved from the certification database 2210 for a particular project. For example, a user may initiate the retrieval of these parameters by the certification module 2120 via controls in the certification UI 2130. Alternatively, the certification module 2120 may retrieve these parameters independently of the user in response to certain information or commands being received from the projects module 302, such as the indication that a certain event in a project has been completed.

The certification parameters retrieved from the set of certification parameters $2220_1$-$2220_N$ at this step generally relate to the certification or certification that the project is trying to achieve, which may be defined by the project's type stored in the projects database 312. For example, if a project represents a new office building development that is intended to be LEED-certified, the certification parameters retrieved would typically be related to achieving LEED certification for a new commercial development, rather than for a residential development or for modifications to an existing commercial structure.

An indication of what parameters are retrieved from the certification database 2210 may also be provided by the inclusion of certain templates from the project templates 750 in the project. For example, if the events in a project for a residential development were built using a project template that indicates that it is compliant with a certain LEED certification level (e.g., the LEED Canada for Homes Green Building Rating System), the parameters from the set of certification parameters $2220_1$-$2220_N$ retrieved at this step will be related to this certification level.

At step 2320, the certification parameters retrieved from the certification database 2210 during the last step are compared to existing events in the project. This may allow the certification module 2120 to identify whether the project is at a state where the certifying body can review it to determine whether certification can be granted (or re-granted in the case of recertification).

In a non-limiting embodiment, the certification module 2120 may compare the status of project events with those indicated in the retrieved certification parameters. For example, assume that certain tasks are indicated by the parameters as needing to be completed before the certification review may begin. However, assume that upon review of the project events by the module 2120, these tasks are identified as incomplete. In this way, the module 2120 may become aware that the project is not at a state where the certification process can begin.

Alternatively, the certification module 2120 may compare the files (or the state of the files) associated with project events against those identified as being required by the certification parameters to see if the project would qualify for certification. For example, assume that a commercial project is attempting to obtain the LEED credit for the secure bicycle storage and changing facilities identified earlier. Further assume that in order to obtain this credit, the certification parameter indicates that project team must include the architectural drawings (which may be scanned blueprints or Autodesk gbXML files) that indicate the location of the bicycle storage and changing facilities.

As a result, the certification module 2120 looks for files associated with the documentation event(s) related to the site design to identify if these files exist, and if so, what state they are in. Assume that the module 2120 finds that these files are associated with a documentation event but are not listed as being 'final' (i.e., they may still be changed) and that he location of the bicycle storage and changing facilities are not indicated. This comparison may allow the certification module 2120 to determine that the project would not yet qualify for this LEED credit.

It will be appreciated that the above comparison may be performed by the certification module 2120 on a subset of related project events (e.g., only those related to a certain LEED credit) or on all related project events (e.g., those related to the entire certification process). Based on such a comparison, the module 2120 may be able to infer certain conclusions, including:

if the project is generally ready to undergo a review process by the certifying body;

what events (e.g., tasks and documentation) is ready to be compiled for the certifying body so it can begin its review and what events are still outstanding;

whether the project is likely to be accredited (or re-accredited) by the certifying body; and/or if the project is likely to achieve certification, at what level is certification likely to be provided (e.g., LEED Silver, LEED Gold or LEED Platinum).

This information may help the project team decide whether to contact the certifying body and initiate a review of the project. For example, if the certification module 2120 identifies certain documentation events that are still outstanding (such as the architectural design files that were not finalized), the team may reorganize its work to complete these events. As a result, the step 2320 may incorporate several iterations of the comparison process described above.

It will be appreciated that at a certain iteration of the comparison process described in the previous step, the certification module 2120 may indicate (e.g., via the certification UI 2130) that the events in the project seem to indicate that the project is ready for review by the certifying body. At this time, the project team may alert the certifying body that it may commence a review of the project (and more specifically, the results of the project).

It will be appreciated that the review process may be communicated through the transfer of certain information between the project team and the certifying body, including:

forms that indicate the project to be reviewed, as well as the members of the project team who may be contacted by the reviewers from the certifying body;

supporting documentation for the project to be reviewed, such as site plans, invoices for equipment purchases and statements regarding the installation of certain equipment; and/or fees paid by the project team to the certifying body in order to commence the review.

The information listed above is referred to here as 'compliance data', in that it generally allows the certifying body (and more specifically, the reviewers to be involved in the review process) to ensure that the project is indeed ready to be reviewed. It will be appreciated that the compliance data listed above constitutes a non-exhaustive list as other information may exist that falls within the scope of the present invention.

At step 2330, compliance data for the project is generated. In a non-limiting embodiment, the certification module 2120 may generate this data based on information associated with the project events compared at the previous step. For example, assume that the compliance data includes a set of required documentation. In this case, the module 2120 may collect (i.e., make copies of) all required documentation files from the documentation events involved at step 2320 and store them in a certain location. Alternatively, the module 2120 may confirm from the event that the documentation exists and compile a checklist of documentation to be generated.

During this step, members of the project team may use the certification UI 2130 to help direct the module 2120 in certain aspects of the preparation of the compliance data. For example, if certain required forms are not stored with documentation events in the system 10 but are available elsewhere (such as the notarized copy of the company's certificate of incorporation mentioned previously), the certification UI 2130 can be used to identify the location of these forms.

At step 2340, the compliance data is submitted to the certifying body in order that the review of the project by the body may begin. It will be appreciated that in most instances, such compliance data is generally electronic in nature and thus may be transmitted electronically by the system 10, such as via its API. In this case, generation and submission of the compliance data described in steps 2330 and 2340 may occur roughly concurrently.

In an alternative embodiment, the certifying body may have access to the collaboration system 10, such as via the previously described API. In such a case, the electronic compliance data that is generated and submitted during the steps 2330 and 2340 may comprise programmatic messages or commands that adjusts certain permissions applied to certain events in the system 10, which in turn make them available to the certifying body.

For example, assume that the compliance data typically includes a PDF copy of a report that may be hundreds of pages long, which is typically stored with a document event in the system. Rather than sending a copy of the PDF file to the certifying body, the system 10 may (via the compliance data transferred using API) simply provide members of the certifying body with permissions to the document event that is associated with the report. In this way, the size of the compliance data submitted to the certifying body may be reduced considerably, as only the code required to provide the certifying body with the necessary permission(s) to access the report need be transmitted.

In other embodiments, the compliance data is partially electronic and partially physical in nature (e.g., so-called 'hard copies' of forms, statements, invoices and/or equipment manuals). In such cases, the data that is electronic is prepared by the certification module 2120 and transmitted by the system, while a list of physical compliance data required may be provided to the project team such that hard-copies of the needed forms and other documentation can be prepared and shipped to the certifying body. In this case, the generation and submission of the compliance data described in steps 2330 and 2340 may occur sequentially.

It will be appreciated that the certifying body may itself be using a collaboration system similar to the system 10 to organize its work. In such a case, the compliance data submitted during this step may be sent using the API associated with the system 10 such that when the collaboration system of the certifying body receives this data, its API (which may know of, if not be coded in a similar way to the API of the system 10) may cause certain activities to be performed automatically. Such activities may mirror those performed in the system 10, including:

- project creation (i.e., the addition of the project to a list of projects to be reviewed);
- event and role generation (i.e., the generation of review events and roles for reviewers for the newly-added project, which may be based on one or more project templates);
- project team assembly (i.e., the invitation of reviewers to take responsibility for certain events associated with the project); and/or
- event monitoring (i.e., the monitoring of events associated with the review of the project).

It will be appreciated that the above list of mirrored activities is non-exhaustive, as other activities could be included and would fall within the scope of the present invention.

In another non-limiting embodiment, the collaboration system of the project team and of the certifying body may be one and the same (i.e., both groups use the collaboration system 10 described above). In this case, the performance of step 2340 may simply trigger a new set of events related to the certification review of the existing project in the projects database 312, rather than involve the performance of the mirrored activities described above.

In such a case, processes similar to those processes previously described with respect to FIGS. 13A and 13B may occur, albeit for the certification review process. A brief synopsis of such a review process may involve the creation of a review project that may be based on one or more review templates that involve reviewer roles. The review team may be assembled (i.e., the reviewer roles are filled) via issuing open or targeted invitations and the project file may be stored in the projects database 312.

Furthermore, the process by which the reviewer conducts the certification review of the project may itself be substantially similar to the process described with respect to FIG. 16. More specifically, the review may log into the system 10 (using an authentication interface substantially similar, if not identical, to the interface 1410), review his or her review projects, events and messages to be completed and then organize his or her review events and tasks. The reviewer may then perform the review tasks and update the related events using a user interface that may be substantially similar to that described in FIG. 14B. Once the reviewer has completed his or her work, he or she may log out of the system 10 using a logout control that may be substantially similar, if not identical to, the logout control 1497 described previously.

It will be appreciated that because the project team and the reviewers are using the same components of the collaboration system 10 (namely, the projects module and database 302 and 312, as well as the community management module 304 and the user profile database 314, among others) the reviewer only needs to be granted permission to access the project in order to begin his or her review process. Once such permission is granted, the reviewer may be seen as becoming a de-facto member of the project team, with similar rights to access the events associated with the project as other team members.

It may be recalled that in a previous non-limiting example, such permission(s) were provided via the generation and/or submission of compliance data between the system 10 and the system of the certifying body. In this case, however, the compliance data represents the granting of certain permissions for accessing project events to the reviewers from the certifying body. Therefore, simply generating the compliance data may be sufficient for the reviewers to begin the review process and submission of such data to the certifying body becomes moot.

It is possible that the non-limiting scenario discussed above may allow the reviewer to collaborate with the one or more members of project team during the review process. For example, if the reviewer did not understand a how a certain task event was performed or validated, he or she could send a message (e.g., via the media/messaging UI 1470) to the project team member who was responsible for this event. In this way, the time of the reviewer (who is likely responsible for a plurality of projects) may be better used and the certification process may be made more efficient overall.

The above non-limiting embodiments show how both the project team and review team may use the system 10 in substantially similar ways and to achieve similar objectives. In this way, the process by which a project is designed, organized and maintained, as well as by which it is reviewed and receives certification, may be simplified and made more efficient. Since the amount of time, money and other resources devoted to such processes are not inconsequential, the realization of such efficiencies will likely produce cost reductions in these projects.

For example, use of the system 10 by both the project team and the certifying body may help the latter information may assist the project team in identifying tasks or events that require additional attention and/or resources before the certification process may begin. At the same time, this information may also assist the certification body in predicting which of the projects in the projects database 312 are close to entering the certification process. By allowing the certification body to identify projects that are close to entering the certification process, a more accurately prediction when certain resources (such as project reviewers in general, or certain specialized reviewers in particular) may be needed, as well as when and where certain bottlenecks may appear, can be made.

In a non-limiting example, assume that a certification process requires the activities of a civil engineer with certain specialized knowledge, such as that regarding the efficient and environmentally-friendly disposal of wastewater and storm water from a development. Further assume that the certifying body has only two (2) such civil engineers as reviewers on its permanent staff but may be able to hire another two (2) such engineers on contract as the need arises. If the certification body can identify from the system 10 those project that are close to entering the certification process, then the workload of the existing civil engineers can be estimated beforehand. Such information may also allow the certifying body to determine whether the services of the two (2) additional contract engineers will be needed to deal with the expected increased workload, and if so, for how long.

Although various embodiments have been illustrated, this was for the purpose of describing, but not limiting, the invention. Various modifications will become apparent to those skilled in the art and are within the scope of this invention.

What is claimed is:

1. A method of operating one or more processors of a computing device having a display and a user input device, the method comprising:
    generating a user interface of which a portion is presented on the display, wherein the user interface comprises a plurality of laterally arranged user interface (UI) elements;
    providing a navigation control in the user interface and presented on the display, the navigation control being responsive to user input received via the user input device to navigate laterally within the user interface so as to control which portion of the user interface and which of the laterally arranged UI elements are presented on the display;
    providing each of the UI elements with graphical elements that are selectable by user input received via the user input device; and
    responding to user selection of a particular graphical element in a particular one of the UI elements based on user input received via the user input device by creating an associated interface element in the user interface in lateral proximity to a lateral side of the particular UI element such that the associated interface element is located laterally adjacent to the lateral side of the particular UI element without covering the graphical elements in the particular UI element presented on the display,
    wherein the associated interface element is laterally between the particular UI element and a next one of the laterally adjacent UI elements to the lateral side of the particular UI element, and wherein creating the associated interface element comprises increasing a lateral distance between the particular UI element and the next one of the laterally adjacent UI elements to accommodate the associated interface element.

2. The method defined in claim 1, wherein the associated interface element conveying information relating to the particular graphical element that was selected.

3. The method defined in claim 2, wherein the associated interface element provides additional graphical elements that are selectable by user input received via the user input device.

4. The method defined in claim 1, further comprising rendering the navigation control so as to indicate the portion of the user interface being presented on the display in relation to the entirety of the user interface.

5. The method defined in claim 4, at least one of the UI elements in the portion of the user interface that is presented on the display being a primary UI element and at least one of the UI elements in the portion of the user interface that is not presented on the display being a secondary UI element, wherein the method comprises responding to user interaction with the navigation control to switch which of the UI elements are primary and which of the UI elements are secondary.

6. The method defined in claim 1, further comprising rendering the navigation control so as to indicate a current location of the user within the user interface.

7. The method defined in claim 1, further comprising rendering the navigation control so as to show a currently visible portion of the user interface in a first shade of a first color and a currently non-visible position of the user interface in a second shade of a second color, wherein at least one of the shade and the color are different.

8. The method defined in claim 1, wherein the navigation control comprises a plurality of graphical elements that are selectable by user input received via the user input device, each graphical element of the plurality of graphical elements of the navigation control corresponding to a respective one of the plurality of laterally arranged UI elements in the user interface, wherein the method comprises switching from the particular UI element in the portion of the user interface that is presented on the display to another one of the laterally arranged UI elements in the user interface responsive to user selection of the respective graphical element of the navigation control corresponding to the other one of the laterally arranged UI elements in the user interface.

9. The method defined in claim 1, wherein the user input received via the user input device comprises a mouse click, keyboard input, stylus tap or screen touch.

10. The method defined in claim 1, wherein the UI elements include a first UI element providing a selectable list of projects and a second UI element implementing a role invitation function for inviting a selected individual from a predetermined list of individuals to take over responsibilities of a role for a selected project in the selectable list of projects.

11. The method defined in claim 1, further comprising storing in memory associations between projects and tasks, tasks and roles, and roles and users, wherein the UI elements include a first UI element providing a list of projects and a second UI element implementing a list of tasks for the user to carry out, each of the tasks being associated with a project in the list of projects and being assigned to a role associated with the user.

12. The method defined in claim 1, wherein creating the associated interface element comprises creating the associated interface element such that the associated interface element appears to emerge from and become attached in lateral proximity to the lateral side of the particular UI element.

13. The method defined in claim 1, wherein a lateral spacing between the lateral side edge of the particular UI element and the associated interface element is less than a lateral spacing between any two adjacent UI elements of the plurality of laterally adjacent UI elements.

14. The method defined in claim 1, wherein the associated interface element for the particular UI element provides a search interface that includes a set of search controls, the set of search controls being responsive to user input received via the user input device to define search criteria.

15. The method defined in claim 1, wherein the associated interface element provides a set of one or more information display controls for the particular UI element, the set of one or more information display controls being responsive to user input received via the user input device to adjust at least one of: an amount of information displayed in the particular UI element; or a format of information displayed in the particular UI element.

16. The method defined in claim 1, wherein the particular graphical element is a first particular graphical element in the particular UI element, and the associated interface element is a first associated interface element for the particular UI element, the method further comprising:
    responding to user selection of a second particular graphical element in the particular one of the UI elements based on user input received via the user input device by creating a second associated interface element in the user interface in lateral proximity to a lateral side of the first associated interface element for the particular UI element.

17. The method defined in claim 16, wherein each of the first and second associated interface elements is provided with a hierarchy-related control that is selectable by user input received via the user input device to establish a hierarchy within the displayed first and second associated interfaces for the particular UI element, the method further comprising:
    responding to user selection of the hierarchy-related control in a particular one of the first and second associated interfaces for the particular UI element that is laterally further from the particular UI element by elevating the particular one of the first and second associated interfaces in the hierarchy and moving the particular one of the first and second associated interfaces laterally closer to the particular UI element in accordance with its elevated position in the hierarchy.

18. A non-transitory computer-readable storage medium storing computer-readable instructions which, when executed by one or more processors of a computing device having a display and a user input device, cause the one or more processors to carry out a method that comprises:
    generating a user interface of which a portion is presented on the display, wherein the user interface comprises a plurality of laterally arranged user interface (UI) elements;
    providing a navigation control in the user interface and presented on the display, the navigation control being responsive to user input received via the user input device to navigate laterally within the user interface so as to control which portion of the user interface and which of the laterally arranged UI elements are presented on the display;
    providing each of the UI elements with graphical elements that are selectable by user input received via the user input device; and
    responding to user selection of a particular graphical element in a particular one of the UI elements based on user input received via the user input device by creating an associated interface element in the user interface in lateral proximity to a lateral side of the particular UI element such that the associated interface element is located laterally adjacent to the lateral side of the particular UI element without covering the graphical elements in the particular UI element presented on the display,
    wherein the associated interface element is laterally between the particular UI element and a next one of the laterally adjacent UI elements to the lateral side of the particular UI element, and wherein creating the associated interface element comprises increasing a lateral distance between the particular UI element and the next one of the laterally adjacent UI elements to accommodate the associated interface element.

19. A method of operating one or more processors of a computing device having a display and a user input device, the method comprising:
    generating a user interface of which a portion is presented on the display, wherein the user interface comprises a plurality of laterally arranged user interface (UI) elements;
    providing a navigation control in the user interface and presented on the display, the navigation control being responsive to user input received via the user input device to navigate laterally within the user interface so as to control which portion of the user interface and which of the laterally arranged UI elements are presented on the display;
    providing each of the UI elements with graphical elements that are selectable by user input received via the user input device; and
    responding to user selection of a particular graphical element in a particular one of the UI elements based on user input received via the user input device by creating an associated interface element in the user interface in lateral proximity to a lateral side of the particular UI element such that the associated interface element is located laterally adjacent to the lateral side of the particular UI element without covering the graphical elements in the particular UI element presented on the display,
    wherein the particular graphical element is a first particular graphical element in the particular UI element, and the associated interface element is a first associated interface element for the particular UI element, the method further comprising:

responding to user selection of a second particular graphical element in the particular one of the UI elements based on user input received via the user input device by creating a second associated interface element in the user interface in lateral proximity to a lateral side of the first associated interface element for the particular UI element.

20. The method defined in claim 19, wherein each of the first and second associated interface elements is provided with a hierarchy-related control that is selectable by user input received via the user input device to establish a hierarchy within the displayed first and second associated interfaces for the particular UI element, the method further comprising:

responding to user selection of the hierarchy-related control in a particular one of the first and second associated interfaces for the particular UI element that is laterally further from the particular UI element by elevating the particular one of the first and second associated interfaces in the hierarchy and moving the particular one of the first and second associated interfaces laterally closer to the particular UI element in accordance with its elevated position in the hierarchy.

* * * * *